(12) United States Patent
Kim et al.

(10) Patent No.: US 7,721,179 B2
(45) Date of Patent: May 18, 2010

(54) METHOD AND APPARATUS FOR ENCODING/DECODING TRANSMISSION INFORMATION IN MOBILE TELECOMMUNICATION SYSTEM

(75) Inventors: Young-Bum Kim, Seoul (KR); Seung-Hoon Choi, Gyeonggi-do (KR); Sung-Eun Park, Suwon-si (KR); Ju-Ho Lee, Suwon-si (KR); Jae-Yoel Kim, Gunpo-si (KR); Joon-Young Cho, Suwon-si (KR); Dong-Seek Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 875 days.

(21) Appl. No.: 11/226,385

(22) Filed: Sep. 15, 2005

(65) Prior Publication Data
US 2006/0077947 A1   Apr. 13, 2006

(30) Foreign Application Priority Data

| Sep. 15, 2004 | (KR) | ............... 10-2004-0073874 |
| Sep. 15, 2004 | (KR) | ............... 10-2004-0073974 |
| Sep. 15, 2004 | (KR) | ............... 10-2004-0073975 |
| Sep. 20, 2004 | (KR) | ............... 10-2004-0075245 |
| Oct. 8, 2004  | (KR) | ............... 10-2004-0080619 |

(51) Int. Cl.
*H03M 13/00* (2006.01)
(52) U.S. Cl. .................. 714/755; 714/776; 714/781
(58) Field of Classification Search .................. 714/755, 714/776, 781
See application file for complete search history.

(56) References Cited

U.S. PATENT DOCUMENTS

| 3,818,442 | A  | * | 6/1974  | Solomon ............... 714/781 |
| 6,341,125 | B1 | * | 1/2002  | Hong et al. .............. 370/335 |
| 6,813,506 | B1 | * | 11/2004 | Song ..................... 455/466 |
| 6,851,085 | B2 | * | 2/2005  | Kim et al. ............... 714/779 |
| 7,020,126 | B2 | * | 3/2006  | Choi et al. .............. 370/342 |
| 7,068,638 | B2 | * | 6/2006  | Choi et al. .............. 370/342 |
| 7,088,700 | B2 | * | 8/2006  | Lee et al. ............... 370/342 |
| 7,388,856 | B2 | * | 6/2008  | Kim et al. .............. 370/342 |
| 7,404,138 | B2 | * | 7/2008  | Kim et al. .............. 714/776 |
| 7,426,680 | B2 | * | 9/2008  | Hwang et al. ............ 714/790 |
| 7,436,806 | B2 | * | 10/2008 | Hwang et al. ............ 370/335 |
| 2002/0013926 | A1 | * | 1/2002 | Kim et al. .............. 714/781 |
| 2002/0075811 | A1 | * | 6/2002 | Lee et al. ............... 370/252 |
| 2002/0075838 | A1 | * | 6/2002 | Choi et al. .............. 370/342 |

(Continued)

FOREIGN PATENT DOCUMENTS

| JP | 2001-211144 | 8/2001 |
| JP | 2001-345713 | 12/2001 |
| JP | 2004-514320 | 5/2004 |

*Primary Examiner*—Joseph D Torres
(74) *Attorney, Agent, or Firm*—Roylance, Abrams, Berdo and Goodman, LLP

(57) ABSTRACT

A method and apparatus is provided to improve an error correction capability for transmitted information, thereby reducing bit error rate and block error rate, and improving the reliability. The method and apparatus can generate error correcting codes having a good minimum distance characteristic, and which can achieve soft decision decoding and reduce the quantity of calculations for the decoding by using an IFHT decoder. Also, the method and apparatus can perform decoding while improving the error correcting capability of particular bits.

30 Claims, 28 Drawing Sheets

U.S. PATENT DOCUMENTS

| | | | |
|---|---|---|---|
| 2002/0162073 A1* | 10/2002 | Choi et al. | 714/779 |
| 2003/0072290 A1* | 4/2003 | Hwang et al. | 370/342 |
| 2003/0118119 A1* | 6/2003 | Hwang et al. | 375/259 |
| 2004/0140914 A1* | 7/2004 | Aldridge et al. | 341/50 |
| 2004/0193995 A1 | 9/2004 | Park et al. | |
| 2006/0077947 A1* | 4/2006 | Kim et al. | 370/349 |

* cited by examiner

| | | | | | | | | | | | | | | | | |
|---|---|---|---|---|---|---|---|---|---|---|---|---|---|---|---|---|
| W1  | 0 | 0 | 0 | 0 | 0 | 0 | 0 | 0 | 0 | 0 | 0 | 0 | 0 | 0 | 0 | 0 |
| W2  | 0 | 1 | 0 | 1 | 0 | 1 | 0 | 1 | 0 | 1 | 0 | 1 | 0 | 1 | 0 | 1 |
| W3  | 0 | 0 | 1 | 1 | 0 | 0 | 1 | 1 | 0 | 0 | 1 | 1 | 0 | 0 | 1 | 1 |
| W4  | 0 | 1 | 1 | 0 | 0 | 1 | 1 | 0 | 0 | 1 | 1 | 0 | 0 | 1 | 1 | 0 |
| W5  | 0 | 0 | 0 | 0 | 1 | 1 | 1 | 1 | 0 | 0 | 0 | 0 | 1 | 1 | 1 | 1 |
| W6  | 0 | 1 | 0 | 1 | 1 | 0 | 1 | 0 | 0 | 1 | 0 | 1 | 1 | 0 | 1 | 0 |
| W7  | 0 | 0 | 1 | 1 | 1 | 1 | 0 | 0 | 0 | 0 | 1 | 1 | 1 | 1 | 0 | 0 |
| W8  | 0 | 1 | 1 | 0 | 1 | 0 | 0 | 1 | 0 | 1 | 1 | 0 | 1 | 0 | 0 | 1 |
| W9  | 0 | 0 | 0 | 0 | 0 | 0 | 0 | 0 | 1 | 1 | 1 | 1 | 1 | 1 | 1 | 1 |
| W10 | 0 | 1 | 0 | 1 | 0 | 1 | 0 | 1 | 1 | 0 | 1 | 0 | 1 | 0 | 1 | 0 |
| W11 | 0 | 0 | 1 | 1 | 0 | 0 | 1 | 1 | 1 | 1 | 0 | 0 | 1 | 1 | 0 | 0 |
| W12 | 0 | 1 | 1 | 0 | 0 | 1 | 1 | 0 | 1 | 0 | 0 | 1 | 1 | 0 | 0 | 1 |
| W13 | 0 | 0 | 0 | 0 | 1 | 1 | 1 | 1 | 1 | 1 | 1 | 1 | 0 | 0 | 0 | 0 |
| W14 | 0 | 1 | 0 | 1 | 1 | 0 | 1 | 0 | 1 | 0 | 1 | 0 | 0 | 1 | 0 | 1 |
| W15 | 0 | 0 | 1 | 1 | 1 | 1 | 0 | 0 | 1 | 1 | 0 | 0 | 0 | 0 | 1 | 1 |
| W16 | 0 | 1 | 1 | 0 | 1 | 0 | 0 | 1 | 1 | 0 | 0 | 1 | 0 | 1 | 1 | 0 |
| W17 | 1 | 1 | 1 | 1 | 1 | 1 | 1 | 1 | 1 | 1 | 1 | 1 | 1 | 1 | 1 | 1 |
| W18 | 1 | 0 | 1 | 0 | 1 | 0 | 1 | 0 | 1 | 0 | 1 | 0 | 1 | 0 | 1 | 0 |
| W19 | 1 | 1 | 0 | 0 | 1 | 1 | 0 | 0 | 1 | 1 | 0 | 0 | 1 | 1 | 0 | 0 |
| W20 | 1 | 0 | 0 | 1 | 1 | 0 | 0 | 1 | 1 | 0 | 0 | 1 | 1 | 0 | 0 | 1 |
| W21 | 1 | 1 | 1 | 1 | 0 | 0 | 0 | 0 | 1 | 1 | 1 | 1 | 0 | 0 | 0 | 0 |
| W22 | 1 | 0 | 1 | 0 | 0 | 1 | 0 | 1 | 1 | 0 | 1 | 0 | 0 | 1 | 0 | 1 |
| W23 | 1 | 1 | 0 | 0 | 0 | 0 | 1 | 1 | 1 | 1 | 0 | 0 | 0 | 0 | 1 | 1 |
| W24 | 1 | 0 | 0 | 1 | 0 | 1 | 1 | 0 | 1 | 0 | 0 | 1 | 0 | 1 | 1 | 0 |
| W25 | 1 | 1 | 1 | 1 | 1 | 1 | 1 | 1 | 0 | 0 | 0 | 0 | 0 | 0 | 0 | 0 |
| W26 | 1 | 0 | 1 | 0 | 1 | 0 | 1 | 0 | 0 | 1 | 0 | 1 | 0 | 1 | 0 | 1 |
| W27 | 1 | 1 | 0 | 0 | 1 | 1 | 0 | 0 | 0 | 0 | 1 | 1 | 0 | 0 | 1 | 1 |
| W28 | 1 | 0 | 0 | 1 | 1 | 0 | 0 | 1 | 0 | 1 | 1 | 0 | 0 | 1 | 1 | 0 |
| W29 | 1 | 1 | 1 | 1 | 0 | 0 | 0 | 0 | 0 | 0 | 0 | 0 | 1 | 1 | 1 | 1 |
| W30 | 1 | 0 | 1 | 0 | 0 | 1 | 0 | 1 | 0 | 1 | 0 | 1 | 1 | 0 | 1 | 0 |
| W31 | 1 | 1 | 0 | 0 | 0 | 0 | 1 | 1 | 0 | 0 | 1 | 1 | 1 | 1 | 0 | 0 |
| W32 | 1 | 0 | 0 | 1 | 0 | 1 | 1 | 0 | 0 | 1 | 1 | 0 | 1 | 0 | 0 | 1 |

FIG.24

METHOD AND APPARATUS FOR ENCODING/DECODING TRANSMISSION INFORMATION IN MOBILE TELECOMMUNICATION SYSTEM

CROSS-REFERENCE TO RELATED APPLICATIONS

This application claims the benefit under 35 U.S.C. §119 (a) of Korean Patent Application No. 10-2004-0073874, entitled "Method And Apparatus For Encoding/Decoding Transmission Information In Mobile Telecommunication System" filed in the Korean Intellectual Property Office on Sep. 15, 2004, Korean Patent Application No. 10-2004-0073974 filed in the Korean Intellectual Property Office on Sep. 15, 2004, Korean Patent Application No. 10-2004-0073975 filed in the Korean Intellectual Property Office on Sep. 15, 2004, Korean Patent Application No. 10-2004-0075245 filed in the Korean Intellectual Property Office on Sep. 20, 2004, and Korean Patent Application No. 10-2004-0080619 filed in the Korean Intellectual Property Office on Oct. 8, 2004, the entire disclosure of each is hereby incorporated by reference.

BACKGROUND OF THE INVENTION

1. Field of the Invention

The present invention relates to a cellular Code Division Multiple Access (CDMA) communication terminal. More particularly, the present invention relates to a method and an apparatus for encoding/decoding transmission information.

2. Description of the Related Art

A Universal Mobile Telecommunication Service (UMTS) is a third generation (3G) mobile communication system which uses a Wideband Code Division Multiple Access (W-CDMA) scheme and is based on Global System for Mobile communication (GSM) and General Packet Radio Services (GPRS), which are European mobile communication systems. The UMTS provides a consistent service by which users of mobile phones or computers can transmit packet-based data and digitalized voice, video and multimedia data at a high speed of at least 2 Mbps anywhere throughout the globe.

The UMTS system uses an Enhanced Uplink Dedicated Channel (EUDCH or E-DCH) as a transmission channel in order to improve performance of packet transmission in the uplink, that is, in a transmission from a User Equipment (UE) to a Base Station (BS or node B). In order to support more stable high speed data transmission, the E-DCH supports technologies such as Adaptive Modulation and Coding (AMC), Hybrid Automatic Retransmission Request (HARQ), shorter Transmission Time Interval (TTI), and so forth.

The AMC is a technology which improves the efficiency in the use of resources by determining the modulation scheme and coding scheme of a data channel according to the channel state between a node B and a UE. A Modulation and Coding Scheme (MCS) is a combination of the modulation scheme and coding scheme, and various MCSs can be defined according to the supportable modulation schemes and coding schemes. The AMC adaptively determines the MCS level according to the channel state between the UE and the node B, thereby improving the efficiency in the use of the resources.

The HARQ is a technology of re-transmitting a packet in order to compensate for an erroneous data packet when an initially transmitted data packet comprises erroneous data packet. The HARQ scheme can be classified into a Chase Combining (CC) scheme by which packets in the same format as that of the erroneous initial packets are retransmitted, and an Incremental Redundancy (IR) scheme by which packets in a format different from that of the erroneous initial packets are retransmitted.

Further, the E-DCH permits a TTI shorter than 10 ms, which is the minimum TTI length presented by Release 5 (Rel 5) of the $3^{rd}$ Generation Partnership Project (3GPP), thereby reducing the retransmission delay time and achieving a high system throughput.

A node B control scheduling is a scheme for data transmission using the E-DCH, in which a node B determines whether to transmit uplink data, an upper limit for an available data rate, and so forth, and transmits the determined information as a scheduling command to a UE, and the UE determines the data rate of the uplink E-DCH with reference to the scheduling command and transmits data by the determined data rate.

According to the node B control scheduling, a lower data rate is allocated to UEs located away from a node B within a range capable of preventing a value of noise rise or Rise over Thermal (RoT) measured by the node B from exceeding a target value, and a higher data rate is allocated to UEs located near the node B, in order to improve the performance of the entire system. The RoT represents radio resources used in the uplink by the node B and is defined by Equation (1) below.

$$RoT=I_o/N_o \tag{1}$$

In Equation (1), $I_o$ denotes a power spectral density for the entire reception band of a node B, which corresponds to the quantity of all uplink signals received by the node B, and $N_o$ denotes a thermal noise power spectral density of the node B. Therefore, the maximum allowable RoT represents the entire radio resources which the node B can use in the uplink.

FIG. 1 is a flow diagram of transmission and reception that is achieved through a typical E-DCH.

First, in step 102, the node B and the UE set up an E-DCH. The setup step 102 comprises the transmission of messages through a dedicated transport channel. When the setup of the E-DCH has been completed, the UE reports scheduling information to the node B in step 104. The scheduling information comprises UE transmission power information representing uplink channel state, information of extra power transmissible by the UE, the quantity of data accumulated for transmission in a buffer of the UE, and so forth.

After receiving scheduling information from a plurality of UEs during communication, the node B monitors the scheduling information of the UEs, so as to schedule data transmission of each of the UEs in step 106. Then, the node B determines to allow uplink packet transmission of the UE and transmits a scheduling allocation command to the UE in step 108. The scheduling allocation command comprises scheduling allocation information which instructs the increase/maintenance/decrease of the maximum allowable data rate to the UE, or instructs the maximum allowable data rate or the timing for allowed transmission to the UE.

The UE determines the Transport Format (TF) of the E-DCH to be transmitted through uplink based on the scheduling allocation command in step 110, and transmits TF-related information in step 112 and uplink packet data through the E-DCH to the node B in step 114. The TF-related information comprises Enhanced Transport Format Indicator (E-TFI) which represents information of resources necessary in demodulating the packet data of the E-DCH. In step 114, the UE selects an MCS level in consideration of the channel state and the maximum allowable data rate allocated by the node B and transmits the uplink packet data by the MCS level.

In step 116, the node B determines if there is an error in the TF-related information and the packet data. In step 118, the node B transmits through an ACK/NACK channel to the UE, a Negative Acknowledgement (NACK) when any of the packet data has an error and an Acknowledgement (ACK) when none of the packet data has an error. When the node B has transmitted an ACK, which means completion of the packet data transmission, the UE transmits a new user data through the E-DCH. However, when the UE has received a NACK, the UE retransmits a packet data having the same content through the E-DCH.

In the environment as described above, in order to perform efficient scheduling, the node B allocates a low data rate to a UE farther away from the node B or a UE in a bad channel condition or a UE for receiving a service having a low priority, and allocates a high data rate to a UE near the node B or a UE in a good channel condition or a UE for receiving a service having a high priority, in consideration of the buffer state and power state of the UE and the RoT, and so forth, thereby improving the performance of the entire system.

In order to support the E-DCH operated as described above, the UE must report the scheduling information to the node B as performed in step 104. As described above, the scheduling information comprises UE transmission power information representing the uplink channel state, information of extra power transmissible by the UE, the quantity of data accumulated for transmission in a buffer of the UE, and so forth.

Accordingly, there is a need for a system and method to provide a specific channel encoding scheme for transmitting and receiving information having a predetermined size such as the scheduling information and the TF-related information.

SUMMARY OF THE INVENTION

Accordingly, the present invention has been made to substantially solve the above-mentioned and other problems occurring in the prior art, and an object of the present invention is to provide a method and an apparatus for improving an error correction capability for transmitted information, thereby reducing bit error rate and block error rate, and improving reliability.

It is another object of the present invention to provide a method and an apparatus which can generate error correcting codes having a good minimum distance characteristic, which can achieve soft decision decoding, and which can reduce the quantity of calculations for the decoding by using an Inverse Fast Hadamard Transform (IFHT) decoder.

It is another object of the present invention to provide a method and an apparatus which can perform decoding while improving the error correcting capability of particular bits.

In order to accomplish these and other objects, a method is provided for encoding N bits of information for a packet data service in a mobile communication system supporting the packet data service, wherein N is a positive integer larger than 6, the method comprising the steps of encoding the N bits of information by using a [32, N] second order Reed Muller code, encoding (N−6) bits of information from among the N bits of information by using a [8, N−6] first order Reed Muller code, and concatenating symbols encoded by the [32, N] second order Reed Muller code with symbols encoded by the [8, N−6] first order Reed Muller code, thereby outputting a [40, N] codeword including 40 encoded symbols, wherein the [32, N] second order Reed Muller code includes an N number of higher [32, N] basis sequences from among 10 basis sequences each having a length of 32, as shown below.

```
0 1 0 1 0 1 0 1 0 1 0 1 0 1 0 1 0 1 0 1 0 1 0 1 0 1 0 1 0 1 0 1
0 0 1 1 0 0 1 1 0 0 1 1 0 0 1 1 0 0 1 1 0 0 1 1 0 0 1 1 0 0 1 1
0 0 0 0 1 1 1 1 0 0 0 0 1 1 1 1 0 0 0 0 1 1 1 1 0 0 0 0 1 1 1 1
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
0 0 1 0 1 0 0 0 0 1 1 0 0 0 1 1 1 1 1 0 0 0 0 0 1 1 1 0 1 1 1
0 0 0 0 0 0 0 1 1 1 0 0 1 1 0 1 0 1 1 0 1 1 0 1 1 1 0 0 0 1 1 1
0 0 0 0 1 0 1 0 1 1 1 1 1 0 0 1 0 0 0 1 1 0 1 1 0 0 1 0 1 0 1 1
0 0 0 1 1 1 0 0 0 0 1 1 0 1 1 1 0 0 1 0 1 1 1 1 0 1 0 1 0 0 0 1
```

In accordance with another aspect of the present invention, an apparatus is provided for encoding N bits of information for a packet data service in a mobile communication system supporting the packet data service, wherein N is a positive integer larger than 6, the apparatus comprising: a [32, N] second order Reed Muller encoder for encoding the N bits of information by using a [32, N] second order Reed Muller code, a [8, N−6] first order Reed Muller encoder for encoding (N−6) bits of information from among the N bits of information by using a [8, N−6] first order Reed Muller code, and a multiplexer for concatenating symbols encoded by the [32, N] second order Reed Muller code with symbols encoded by the [8, N−6] first order Reed Muller code, thereby outputting a [40, N] codeword including 40 encoded symbols, wherein the [32, N] second order Reed Muller code includes an N number of higher [32, N] basis sequences from among 10 basis sequences each having a length of 32, as shown below.

```
0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1

0 0 0 0 0 0 0 0 0 0 0 0 0 0 0 0 1 1 1 1 1 1 1 1 1 1 1 1 1 1 1 1

1 1 1 1 1 1 1 1 1 1 1 1 1 1 1 1 1 1 1 1 1 1 1 1 1 1 1 1 1 1 1 1

0 0 1 0 1 0 0 0 0 1 1 0 0 0 1 1 1 1 1 1 0 0 0 0 0 1 1 1 0 1 1 1

0 0 0 0 0 0 0 1 1 1 0 0 1 1 0 1 0 1 1 0 1 1 0 1 1 1 0 0 0 1 1 1

0 0 0 0 1 0 1 0 1 1 1 1 1 0 0 1 0 0 0 1 1 0 1 1 0 0 1 0 1 0 1 1

0 0 0 1 1 1 0 0 0 0 1 1 0 1 1 1 0 0 1 0 1 1 1 1 0 1 0 1 0 0 0 1
```

In accordance with another aspect of the present invention, a method is provided for encoding N bits of information for a packet data service in a mobile communication system supporting the packet data service, wherein N is a positive integer, the method comprising the steps of encoding the N bits of information by using a [32, N] second order Reed Muller code, encoding M bits of information requiring an enhanced error correcting capability from among the N bits of information by using a [8, M] unequal protection code, wherein M is a positive integer smaller than N, and concatenating symbols encoded by the [32, N] second order Reed Muller code with symbols encoded by the [8, M] unequal protection code, thereby outputting a [40, N] codeword including 40 encoded symbols, wherein the [32, N] second order Reed Muller code includes an N number of [32, N] basis sequences from among seven basis sequences each having a length of 32, as shown below.

```
0 0 1 0 1 0 0 0 0 1 1 0 0 0 1 1 1 1 1 1 0 0 0 0 0 1 1 1 0 1 1 1

0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
```

In accordance with another aspect of the present invention, an apparatus is provided for encoding N bits of information for a packet data service in a mobile communication system supporting the packet data service, wherein N is a positive integer, the apparatus comprising a [32, N] second order Reed Muller encoder for encoding the N bits of information by using a [32, N] second order Reed Muller code, a [8, M] unequal protection encoder for encoding M bits of information requiring an enhanced error correcting capability from among the N bits of information by using a [8, M] unequal protection code, wherein M is a positive integer smaller than N, and a multiplexer for concatenating symbols encoded by the [32, N] second order Reed Muller code with symbols encoded by the [8, M] unequal protection code, thereby outputting a [40, N] codeword including 40 encoded symbols, wherein the [32, N] second order Reed Muller code includes an N number of [32, N] basis sequences from among seven basis sequences each having a length of 32, as shown below.

0 0 1 0 1 0 0 0 0 1 1 0 0 0 1 1 1 1 1 1 1 0 0 0 0 0 1 1 1 0 1 1 1

0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1

0 0 0 0 0 0 0 0 0 0 0 0 0 0 0 0 1 1 1 1 1 1 1 1 1 1 1 1 1 1 1 1

1 1 1 1 1 1 1 1 1 1 1 1 1 1 1 1 1 1 1 1 1 1 1 1 1 1 1 1 1 1 1 1

In accordance with another aspect of the present invention, a method is provided for encoding N bits of information for a packet data service in a mobile communication system supporting the packet data service, wherein N is a positive integer larger than 5, the method comprising the steps of encoding the N bits of information by using a [16, N] second order Reed Muller code, encoding (N–5) bits of information from among the N bits of information by using a [4, N–5] code, and concatenating symbols encoded by the [16, N] second order Reed Muller code with symbols encoded by the [4, N–5] code, thereby outputting a [20, N] codeword including 20 encoded symbols, wherein the [16, N] second order Reed Muller code includes an N number of [16, N] basis sequences from among seven basis sequences each having a length of 16, as shown below.

0 1 1 0 0 0 1 1 1 1 1 1 0 1 0 1

0 1 1 1 1 1 1 0 0 0 1 0 1 0 1 1

1 1 1 1 1 1 1 1 1 1 1 1 1 1 1 1

0 0 0 0 0 0 0 0 1 1 1 1 1 1 1 1

0 0 0 0 1 1 1 1 0 0 0 0 1 1 1 1

0 0 1 1 0 0 1 1 0 0 1 1 0 0 1 1

0 1 0 1 0 1 0 1 0 1 0 1 0 1 0 1

In accordance with another aspect of the present invention, an apparatus is provided for encoding N bits of information for a packet data service in a mobile communication system supporting the packet data service, wherein N is a positive integer larger than 5, the apparatus comprising a [16, N] second order Reed Muller encoder for encoding the N bits of information by using a [16, N] second order Reed Muller code, a [4, N–5] encoder for encoding (N–5) bits of information from among the N bits of information by using a [4, N–5] code, and a multiplexer for concatenating symbols encoded by the [16, N] second order Reed Muller code with symbols encoded by the [4, N–5] code, thereby outputting a [20, N] codeword including 20 encoded symbols, wherein the [16, N] second order Reed Muller code includes an N number of [16, N] basis sequences from among seven basis sequences each having a length of 16, as shown below.

0 1 1 0 0 0 1 1 1 1 1 1 0 1 0 1

0 1 1 1 1 1 1 0 0 0 1 0 1 0 1 1

-continued 1 1 1 1 1 1 1 1 1 1 1 1 1 1 1 1

0 0 0 0 0 0 0 0 1 1 1 1 1 1 1 1

0 0 0 0 1 1 1 1 0 0 0 0 1 1 1 1

0 0 1 1 0 0 1 1 0 0 1 1 0 0 1 1

0 1 0 1 0 1 0 1 0 1 0 1 0 1 0 1

In accordance with another aspect of the present invention, a method is provided for encoding N bits of information for a packet data service in a mobile communication system supporting the packet data service, wherein N is a positive integer, the method comprising the steps of encoding the N bits of information by using a [16, N] second order Reed Muller code, encoding M bits of information requiring an enhanced error correcting capability from among the N bits of information by using a [4, M] unequal protection code, wherein M is a positive integer smaller than N, and concatenating symbols encoded by the [16, N] second order Reed Muller code with symbols encoded by the [4, M] unequal protection code, thereby outputting a [20, N] codeword including 20 encoded symbols, wherein the [16, N] second order Reed Muller code includes an N number of [16, N] basis sequences from among seven basis sequences each having a length of 16, as shown below.

1 1 1 1 1 0 0 0 1 0 1 0 1 1 0

1 1 0 0 0 1 1 1 1 1 1 0 1 0 1 0

-continued

```
1 0 1 0 1 0 1 0 1 0 1 0 1 0 1 0

0 1 1 0 0 1 1 0 0 1 1 0 0 1 1 0

0 0 0 1 1 1 1 0 0 0 0 1 1 1 1 0

0 0 0 0 0 0 0 1 1 1 1 1 1 1 1 0

1 1 1 1 1 1 1 1 1 1 1 1 1 1 1 1
```

In accordance with another aspect of the present invention, an apparatus is provided for encoding N bits of information for a packet data service in a mobile communication system supporting the packet data service, wherein N is a positive integer, the apparatus comprising a [16, N] second order Reed Muller encoder for encoding the N bits of information by using a [16, N] second order Reed Muller code, a [4, M] encoder for encoding M bits of information requiring an enhanced error correcting capability from among the N bits of information by using a [4, M] unequal protection code, wherein M is a positive integer smaller than N, and a multiplexer for concatenating symbols encoded by the [16, N] second order Reed Muller code with symbols encoded by the [4, M] unequal protection code, thereby outputting a [20, N] codeword including 20 encoded symbols, wherein the [16, N] second order Reed Muller code includes an N number of [16, N] basis sequences from among seven basis sequences each having a length of 16, as shown below.

```
1 1 1 1 1 1 0 0 0 1 0 1 0 1 1 0

1 1 0 0 0 1 1 1 1 1 0 1 0 1 0

1 0 1 0 1 0 1 0 1 0 1 0 1 0 1 0

0 1 1 0 0 1 1 0 0 1 1 0 0 1 1 0

0 0 0 1 1 1 1 0 0 0 0 1 1 1 1 0

0 0 0 0 0 0 0 1 1 1 1 1 1 1 1 0

1 1 1 1 1 1 1 1 1 1 1 1 1 1 1 1
```

In accordance with another aspect of the present invention, a method is provided for decoding encoded symbols for a packet data service in a mobile communication system supporting the packet data service, the method comprising the steps of separating a received signal including a plurality of encoded symbols into a higher symbol sequence and a lower symbol sequence, calculating first correlation values by correlating the higher symbol sequence and at least one unmasked symbol sequence with a W number of bi-orthogonal Walsh codes, the at least unmasked symbol sequence being generated by adding at least one mask sequence generated based on a second order Reed Muller code used in generating the higher symbol sequence to the higher symbol sequence, calculating second correlation values by correlating the lower symbol sequence with codewords generated based on a Reed Muller code used in generating the lower symbol sequence, calculating added correlation values for each of the W number of bi-orthogonal Walsh codes by adding the corresponding second correlation values to each of a W number of first correlation values from among the first correlation values, and generating decoded information bits by concatenating mask sequence indexes with bi-orthogonal Walsh code indexes corresponding to a maximum correlation value from among the added correlation values.

In accordance with another aspect of the present invention, there is provided an apparatus for decoding encoded symbols for a packet data service in a mobile communication system supporting the packet data service, the apparatus comprising a demultiplexer for separating a received signal including a plurality of encoded symbols into a higher symbol sequence and a lower symbol sequence, a first device for calculating first correlation values by correlating the higher symbol sequence and at least one unmasked symbol sequence with a W number of bi-orthogonal Walsh codes, wherein the at least one unmasked symbol sequence is generated by adding at least one mask sequence generated based on a second order Reed Muller code used in generating the higher symbol sequence to the higher symbol sequence, a second device for calculating second correlation values by correlating the lower symbol sequence with codewords generated based on a Reed Muller code used in generating the lower symbol sequence, summers for calculating added correlation values for each of the W number of bi-orthogonal Walsh codes by adding the corresponding second correlation values to each of a W number of first correlation values from among the first correlation values, and a correlation comparator for generating decoded information bits by concatenating mask sequence indexes with bi-orthogonal Walsh code indexes corresponding to a maximum correlation value from among the added correlation values.

BRIEF DESCRIPTION OF THE DRAWINGS

The above and other objects, features and advantages of the present invention will become more apparent from the following detailed description taken in conjunction with the accompanying drawings, in which:

FIGS. 8A and 8B show 64 Walsh codes used in calculation of the correlation values according to an embodiment of the present invention;

FIG. 18 is a table showing 32 Walsh codes used for calculation of correlation values according to an embodiment of the present invention;

FIG. 24 is a table showing 32 Walsh codes used for calculation of correlation values according to an embodiment of the present invention;

Throughout the drawings, like reference numerals will be understood to refer to like parts, components and structures.

DETAILED DESCRIPTION OF THE EXEMPLARY EMBODIMENTS

Figure 1:
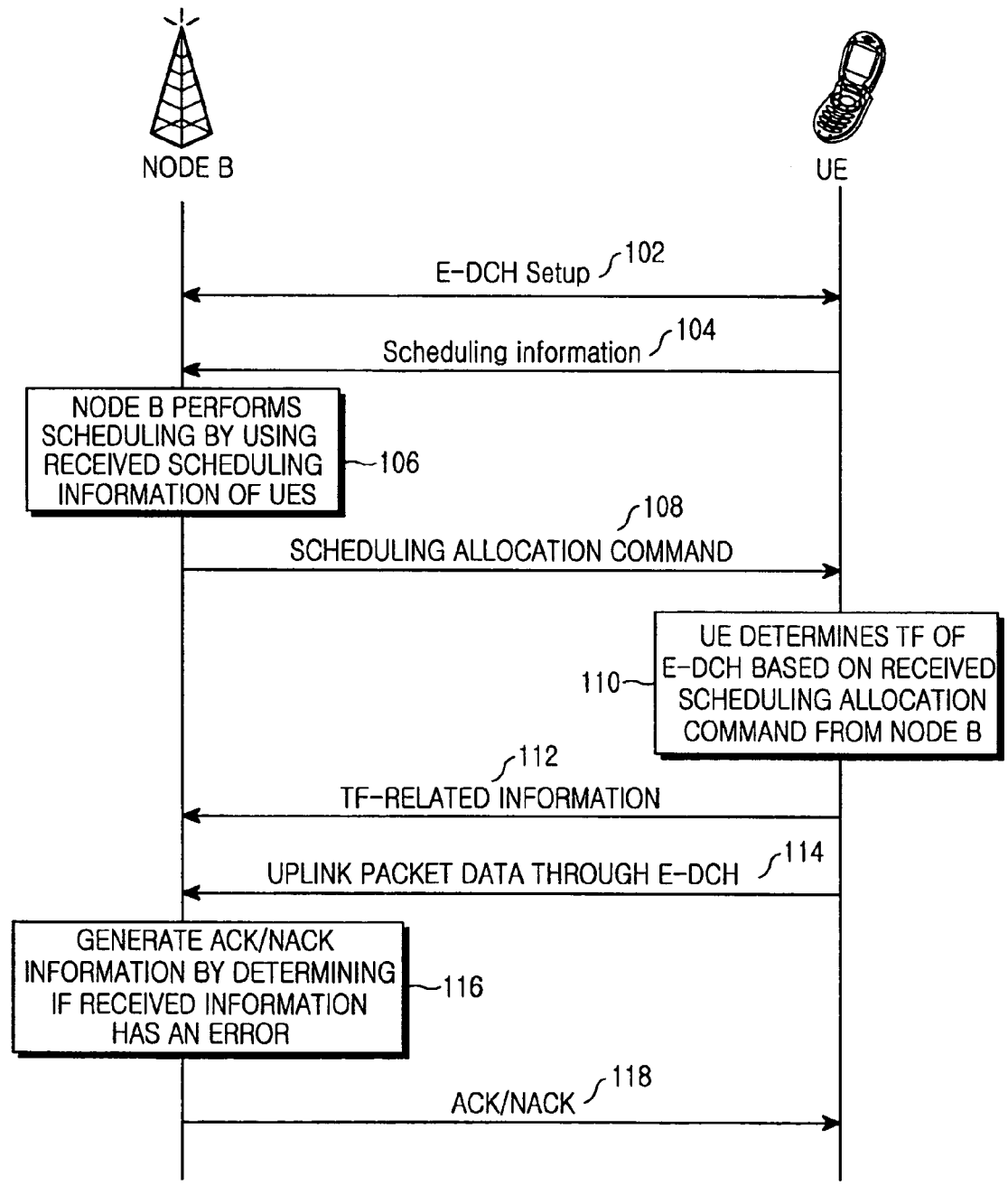
FIG. 1 is a flow diagram of transmission and reception through a typical E-DCH.

Hereinafter, a number of exemplary embodiments of the present invention will be described with reference to the accompanying drawings. Further, various specific definitions found in the following description, such as specific values of packet identifications, contents of displayed information, and so forth, are exemplary and provided to help in the general understanding of the present invention, and it is apparent to those skilled in the art that the present invention can be implemented without such definitions. Further, in the following description of embodiments of the present invention, a detailed description of functions and configurations incorporated herein that are well known to those skilled in the art are omitted for clarity and conciseness.

The present specification presents exemplary embodiments for uplink control information of an Enhanced Uplink Dedicated Channel (E-DCH) of a Universal Mobile Telecommunication Service (UMTS), which is a third generation (3G) mobile communication system.

Specifically, an exemplary channel encoding scheme proposed by the present invention can be applied to the uplink control information and the uplink scheduling information necessary for supporting the E-DCH. The control information comprises E-TFI information and HARQ-related information, and the scheduling information may comprise transmission power information of the UE, information of extra power transmissible by the UE, the quantity of data accumulated for transmission in a buffer of the UE, and so forth.

The E-TFI information requires about 5 bits in order to indicate the size of the E-DCH packet data to be transmitted, and the HARQ-related information requires about 3 bits in order to indicate information for controlling the HARQ soft buffer and Redundancy Version (RV) representing a puncturing or repetition pattern applied to the E-DCH packet data. Moreover, the E-TIF information may require an additional 2 bits in order to indicate the power offset value for the transmission power increase/decrease. Therefore, the E-TIF information requires about 10 bits for the E-DCH uplink control information.

From among the scheduling information, the quantity of data accumulated in the buffer of the UE can be reported through the upper layer signaling in consideration of the signaling overhead, and the extra power transmissible by the UE can be calculated by the node B by taking the transmission power information and the power class of the UE into consideration. Therefore, the scheduling information actually transmitted through the physical channel may comprise only the transmission power information of the UE. In consideration of the range of the transmission power which can be transmitted by the UE, the size of the transmission power information of the UE requires about 7 bits.

Hereinafter, an exemplary channel encoding scheme applicable when the control information and the scheduling information are transmitted will be described in greater detail.

As a measure for indicating the performance of a linear error correcting code, a hamming distance distribution between codewords in the error correcting code is usually used. The hamming distance corresponds to the number of different symbols between two particular codewords. For example, in the two codewords of '0111' and '1101', the first symbols and the third symbols in the two codewords are different. Therefore, the hamming distance between the two codewords is '2'. The smallest hamming distance between all codewords in the linear error correcting code is defined as a 'minimum distance' $d_{min}$. In a linear error correcting code, the larger the minimum distance, the better the error correcting performance. Additional information is disclosed in "The Theory of Error-Correcting Codes" by F. J. MacWilliams, N. J. A. Sloane, North-Holland, the applicable content of which is incorporated herein by reference.

The second order Reed Muller code which can be used as an error correcting code, can be derived from a sequence set which is a set of sequences including a sum of elements of an m-sequence and certain other sequences. In using the sequence set including the sum of sequences as the linear error correcting code, the larger the minimum distance of the sequence set, the more advantageous. Such advantageous sequence sets include the Kasami sequence set, the Gold sequence set and the Kerdock sequence set. In the sequences, the minimum distance $d_{min}$ is defined as:

$d_{min} = (2^{2m} - 2^m)/2$ when the entire length $L = 2^{2m}$, and $d_{min} = (2^{2m+1} - 2^{2m})/2$ when $L = 2^{2m+1}$ The minimum distance $d_{min}$ of the first order Reed Muller code is $2^{k-1}$ for an encoding rate of $[2^k, k]$. When the first order Reed Muller code is extended to the bi-orthogonal code, the encoding rate changes to $[2^k, k+1]$, but the minimum distance remains $2^{k-1}$. However, when the first order Reed Muller code is extended to the second order Reed Muller code, the number of basis codes increases, so that the encoding rate changes to $[2^k, k+1+{}_kC_2]$, and the minimum distance is reduced to one-half, that is, $2^{k-2}$.

It is preferable to generate an error correcting code which has a good minimum distance and includes an increased number of basis codes. Therefore, embodiments of the present invention provide error correcting codes which have a better minimum distance characteristic than the existing second order Reed Muller code, and which include a larger number of basis codes than the first order Reed Muller code. Such an error correcting code is advantageous in the aspect of the encoding rate. Further, according to embodiments of the present invention, bits at specific locations are empowered with a larger error correcting capability by reflecting the transmission characteristics. Hereinafter, error correcting codes for empowering all bits with the same error correcting capability, and error correcting codes for empowering higher bits with higher error correcting capabilities, will be described as different exemplary embodiments.

Hereinafter, a transmitter of a UE employing a channel coding scheme according to an exemplary embodiment of the present invention will be described in greater detail with reference to FIG. 2. For the purposes of simplicity and clarity in explaining embodiments of the present invention, description of channels having no relation to the E-DCH will be omitted.

Figure 2:
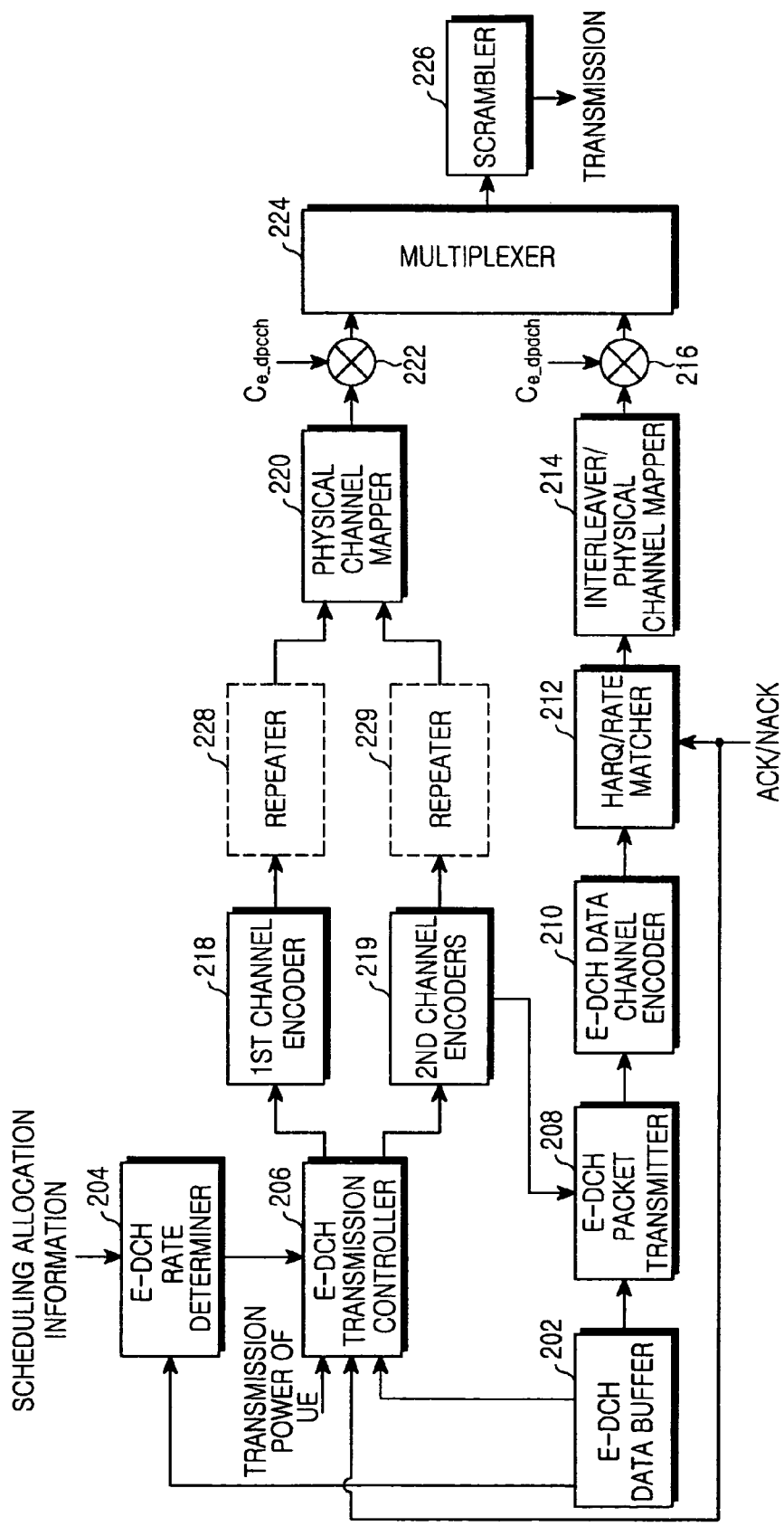
FIG. 2 is a block diagram of a transmitter of a UE employing a channel coding scheme according to an embodiment of the present invention.

FIG. 2 is a block diagram of a transmitter of a UE employing a channel coding scheme according to an embodiment of the present invention. The UE receives the scheduling allocation information and uses it in determining the transfer rate of the E-DCH. The scheduling allocation information instructs an increase/maintenance/decrease (UP/KEEP/DOWN) of the maximum allowable data rate to the UE, or indicates an absolute value for the maximum allowable data rate and the timing for allowed transmission, and so forth.

Referring to FIG. 2, an E-DCH transfer rate determiner 204 determines the E-DCH transfer rate with reference to the scheduling allocation information from the node B and the quantity of the E-DCH data stored in an E-DCH data buffer 202. When the E-DCH transfer rate has been determined, an E-DCH transmission controller 206 determines the E-DCH transport format and applies the determined format to the E-DCH packet transmitter 208. In this case, the E-DCH transmission controller 206 refers to the ACK/NACK signal from the node B, and determines to transmit the current E-DCH data when it has received an ACK signal, and to retransmit the previously transmitted E-DCH data when it has received a NACK signal.

The E-DCH packet transmitter 208 takes a predetermined quantity of data from the E-DCH data buffer 202 according to the E-DCH transport format. The E-DCH data channel encoder 210 channel-encodes the data taken by the E-DCH packet transmitter 208 and applies the encoded data to the HARQ/rate matcher 212. The HARQ/rate matcher 212 performs rate matching for the channel-encoded E-DCH data. In this case, the HARQ/rate matcher 212 refers to the ACK/NACK signal in order to determine if the transmission is an initial transmission or a retransmission, and performs the rate matching in accordance with the puncturing/repetition pattern defined in advance based on the initial transmission or retransmission. The bits generated through the HARQ and rate matching are interleaved and mapped by an interleaver/physical channel mapper 214 to an Enhanced Dedicated Physical Data Channel (E-DPDCH) frame, which is then spread by a channelization code $C_{e\_dpdch}$ allocated for the E-DPDCH in the spreader 216.

The E-DCH transmission controller 206 generates E-TFI information corresponding to the E-DCH transfer rate determined by the E-DCH transfer rate determiner 204, and generates HARQ-related information of the E-DCH packet data to be transmitted and information representing the power offset of the E-DCH by referring to the ACK/NACK signal. Further, the E-DCH transmission controller 206 generates scheduling information including transmission power information of the UE, which comprises control information of the E-DCH for the scheduling.

The E-TFI information, HARQ-related information and E-DCH power offset information generated by the E-DCH transmission controller 206 are encoded by the schemes according to embodiments of the present invention in the first channel encoder 218, and are then mapped in the physical channel mapper 220 to a frame of the Enhanced Dedicated Physical Control Channel (E-DPCCH) which is a physical control channel for the E-DCH. Similarly, the scheduling information generated by the E-DCH transmission controller 206 is encoded by the schemes according to embodiments of the present invention in the second channel encoder 219 and is then mapped in the physical channel mapper 220 to a frame of the E-DPCCH which is a physical control channel for the E-DCH.

The output operation of the first and second channel encoders 218 and 219 may be repeated several times by the first and second repeaters 228 and 229, respectively, according to the E-DPCCH subframe or frame structure, and the physical channel mapper 220 maps the outputs of the first and second channel encoders 218 and 219 to the E-DPCCH data according to the E-DPCCH frame structure. Structures of the first and second repeaters 228 and 229 according to embodiments of the present invention are described in greater detail below. Although two channel encoders 218 and 219 and two repeaters 228 and 229 are illustrated in FIG. 2, the E-TFI information, HARQ-related information and E-DCH power offset information may be encoded by the same single channel encoder. In the latter case, only one channel encoder and only one repeater are used.

The E-DPCCH data is spread by a channelization code $C_{e\_dpcch}$ allocated for the E-DPCCH in the spreader 222. The spread E-DPDCH frame and spread E-DPCCH data are multiplexed by the multiplexer 224, scrambled in the scrambler 226, and are then transmitted.

Exemplary Receiver in Accordance with an Embodiment of the Present Invention

Hereinafter, a receiver of a node B employing a channel coding scheme according to an exemplary embodiment of the present invention will be described in greater detail with reference to FIG. 3, which shows only the structure corresponding to the transmitter of FIG. 2, but is not limited thereto.

Figure 3:
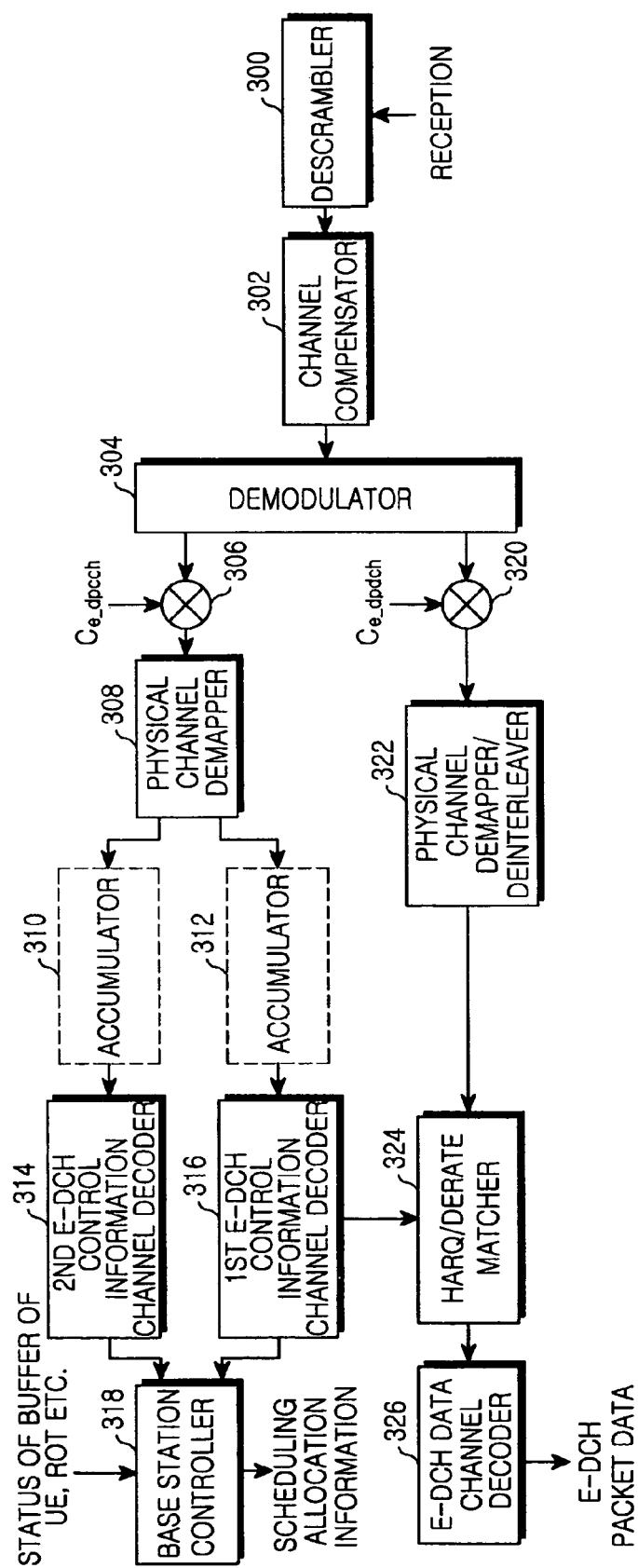
FIG. 3 is a block diagram of a receiver of a node B employing a channel coding scheme according to an embodiment of the present invention.

Referring to FIG. 3, the signal received in the node B is de-scrambled and channel-compensated by the de-scrambler 300 and the channel compensator 302, and is then divided into I/Q-branch signals by the demodulator 304. The E-DPCCH and E-DPDCH data can be obtained by de-spreading the I/Q-branch signals in the de-spreaders 306 and 320 by using channelization codes $C_{e\_dpcch}$ and $C_{e\_dpdch}$, respectively, of the physical channels to be decoded.

First, in order to decode the E-DCH packet data, the E-DPDCH data de-spread by the de-spreader 320 is physical channel de-mapped and de-interleaved by the physical channel de-mapper/de-interleaver 322, and is then de-rate matched by the de-rate matcher 324 including the HARQ functionality. In performing the de-rate matching, the de-rate matcher 324 refers to the E-TFI information and HARQ related information obtained from the first channel decoder 316. The de-rate matched data is decoded by the E-DCH data channel decoder 326, thereby producing an E-DCH packet data.

The de-spreader 306 de-spreads the E-DPCCH data, and the physical channel de-mapper 308 separates and extracts transmission power information of the UE, including the E-TFI and HARQ related information and scheduling information from the de-spread data. The extracted E-TFI information and HARQ related information of the UE are accumulated by the first accumulator 312 as many times as the number of repetitions by the first repeater 228 of the transmitter (of FIG. 2), and the accumulated information is then decoded by the first channel decoder 316 by using a channel decoding scheme corresponding to the channel encoding scheme used by the first channel encoder 218 of the transmitter (of FIG. 2) according to an embodiment of the present invention.

The E-TFI information and HARQ related information obtained by the first channel decoder 316 are transferred to the de-rate matcher 324 for use in the de-rate matching and decoding of the E-DCH packet data and are transferred to the base station controller, or scheduler 318 for use in the scheduling.

The scheduling information extracted by the physical channel de-mapper 308 are accumulated by the second accumulator 310 as many times as the number of repetitions by the second repeater 229 of the transmitter (of FIG. 2), and the accumulated information is then decoded by the second channel decoder 314 by using a channel decoding scheme corresponding to the channel encoding scheme used by the second channel encoder 219 of the transmitter (of FIG. 2) according to an embodiment of the present invention. The scheduling information obtained by the second channel decoder 314 is transferred to the base station scheduler 318.

The base station scheduler 318 generates scheduling allocation information for the UE in consideration of the information transferred from the first and second channel decoder 316 and 314, respectively, together with the buffer state of the UE, the RoT, and so forth.

Although two channel decoders 314 and 316 and two accumulators 310 and 312 are illustrated in FIG. 3 and likewise in FIG. 2 for the transmitter, the E-TFI information, HARQ-related information, E-DCH power offset information, and scheduling information may be decoded by the same single channel decoder. In the latter case, only one channel decoder and only one accumulator are used.

Hereinafter, the [40, 10] code, the [40, 9] code and the [40, 8] code will be described as exemplary codes for encoding the E-DCH uplink control information having a size of 10 bits or less. The [40, N] code (wherein N is a positive integer equal to or smaller than 10) for control information having a size of 10 bits or less, can be obtained by concatenating the [32, N] second order Reed Muller code and [8, N−6] first order Reed Muller code. The [40, N] code (wherein N is a positive integer equal to or smaller than 10) for control information having a size of 10 bits or less, can be obtained by performing the concatenation simultaneously while sequentially eliminating the least significant basis sequence from the basis sequences of the [40, 10] code.

Exemplary [40, 10] Code in Accordance with an Embodiment of the Present Invention Hereinafter, a method for designing an optimum [40, 10] code having a minimum distance of 16 will be described in greater detail.

Table 1 below shows basis sequences of a [32, 10, 12] code, including 10 basis sequences each having a length of 32. The number '12' in the [32, 10, 12] code implies the minimum length of the basis sequences, and the [32, 10, 12] code is also called a "[32, 10] code". From among the basis sequences in Table 1, the seventh to tenth basis sequences are mask basis sequences derived from the mask sequences disclosed in U.S. Pat. No. 6,882,636 of Balabanian, and corresponding to Korean Patent Application No. 1999-27932, the entire disclosure of each being incorporated herein by reference. Further, the first to fifth basis sequences are Walsh basis sequences derived from the Walsh codes. The sixth basis sequence is the all-one sequence.

The minimum distance can be increased to 16 by concatenating the [32, 10, 12] code with a [8, 4] first order Reed Muller code. Table 2 below shows basis sequences of the [8, 4] first order Reed Muller code. Table 3 below shows the [40, 10] code, an optimum code having a minimum distance of 16, which can be designed according to the above-described manner.

TABLE 1

```
0 1 0 1 0 1 0 1 0 1 0 1 0 1 0 1 0 1 0 1 0 1 0 1 0 1 0 1 0 1 0 1
0 0 1 1 0 0 1 1 0 0 1 1 0 0 1 1 0 0 1 1 0 0 1 1 0 0 1 1 0 0 1 1
0 0 0 0 1 1 1 1 0 0 0 0 1 1 1 1 0 0 0 0 1 1 1 1 0 0 0 0 1 1 1 1
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
0 0 1 0 1 0 0 0 0 1 1 0 0 0 1 1 1 1 1 1 0 0 0 0 0 1 1 1 0 1 1 1
0 0 0 0 0 0 0 1 1 1 0 0 1 1 0 1 0 1 1 0 1 1 0 1 1 1 0 0 0 1 1 1
0 0 0 0 1 0 1 0 1 1 1 1 0 0 1 0 0 0 1 1 0 1 1 0 0 1 0 1 0 1 1 1
0 0 0 1 1 1 0 0 0 0 1 1 0 1 1 1 0 0 1 0 1 1 1 1 0 1 0 1 0 0 0 1
```

TABLE 2

| 0 | 1 | 0 | 1 | 0 | 1 | 0 | 1 |
|---|---|---|---|---|---|---|---|
| 0 | 0 | 1 | 1 | 0 | 0 | 1 | 1 |
| 0 | 0 | 0 | 0 | 1 | 1 | 1 | 1 |
| 1 | 1 | 1 | 1 | 1 | 1 | 1 | 1 |

```
0 1 0 1 0 1 0 1 0 1 0 1 0 1 0 1 0 1 0 1 0 1 0 1 0 1 0 1 0 1 0 1 0 0 0 0 0 0 0 0

0 0 1 1 0 0 1 1 0 0 1 1 0 0 1 1 0 0 1 1 0 0 1 1 0 0 1 1 0 0 1 1 0 0 0 0 0 0 0 0

0 0 0 0 1 1 1 1 0 0 0 0 1 1 1 1 0 0 0 0 1 1 1 1 0 0 0 0 1 1 1 1 0 0 0 0 0 0 0 0

0 0 0 0 0 0 0 0 1 1 1 1 1 1 1 1 0 0 0 0 0 0 0 0 1 1 1 1 1 1 1 1 0 0 0 0 0 0 0 0

0 0 0 0 0 0 0 0 0 0 0 0 0 0 0 0 1 1 1 1 1 1 1 1 1 1 1 1 1 1 1 1 0 0 0 0 0 0 0 0

1 1 1 1 1 1 1 1 1 1 1 1 1 1 1 1 1 1 1 1 1 1 1 1 1 1 1 1 1 1 1 1 0 0 0 0 0 0 0 0

0 0 1 0 1 0 0 0 0 1 1 0 0 0 1 1 1 1 1 0 0 0 0 0 1 1 1 0 1 1 1 0 1 0 1 0 1 0 1 0

0 0 0 0 0 0 0 1 1 1 0 0 1 1 0 1 0 1 1 0 1 1 0 1 1 1 0 0 0 1 1 1 0 0 1 1 0 0 1 1

0 0 0 0 1 0 1 0 1 1 1 1 0 0 1 0 0 0 1 1 0 1 1 0 0 1 0 1 0 1 1 0 0 0 0 1 1 1 1 1

0 0 0 1 1 1 0 0 0 0 1 1 0 1 1 1 0 0 1 0 1 1 1 1 0 1 0 1 0 0 0 1 1 1 1 1 1 1 1 1
```

Exemplary [40, 9] Code in Accordance with an Embodiment of the Present Invention Hereinafter, a method for designing an optimum [40, 9] code having a minimum distance of 16 will be described in greater detail.

First, a [32, 9] code is formed by eliminating the tenth basis sequence '00011100001101110010111101010001' from the [32, 10] code shown in Table 1, and a [8, 3] first order Reed Muller code is formed by eliminating the fourth basis sequence '11111111' from the [8, 4] first order Reed Muller code shown in Table 2. Then, by concatenating the [32, 9] code and the [8, 3] first order Reed Muller code, the [40, 9] code is generated. Tables 4 and 5 below show the basis sequences of the [32, 9] code and the [8, 3] first order Reed Muller code formed in the manner described above. Table 6 below shows the [40, 9] code, an optimum code having a minimum distance of 16, which can be designed according to the above-described manner.

TABLE 4

```
0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1

0 0 0 0 0 0 0 0 0 0 0 0 0 0 0 0 1 1 1 1 1 1 1 1 1 1 1 1 1 1 1 1

1 1 1 1 1 1 1 1 1 1 1 1 1 1 1 1 1 1 1 1 1 1 1 1 1 1 1 1 1 1 1 1

0 0 1 0 1 0 0 0 0 1 1 0 0 0 1 1 1 1 1 0 0 0 0 0 1 1 1 0 1 1 1 1

0 0 0 0 0 0 0 1 1 1 0 0 1 1 0 1 0 1 1 0 1 1 0 1 1 1 0 0 0 1 1 1

0 0 0 0 1 0 1 0 1 1 1 1 0 0 1 0 0 0 1 1 0 1 1 0 0 1 0 1 1 0 0 1 0 1 1
```

TABLE 5

| 0 | 1 | 0 | 1 | 0 | 1 | 0 | 1 |
|---|---|---|---|---|---|---|---|
| 0 | 0 | 1 | 1 | 0 | 0 | 1 | 1 |
| 0 | 0 | 0 | 0 | 1 | 1 | 1 | 1 |

TABLE 6

```
0 1 0 1 0 1 0 1 0 1 0 1 0 1 0 1 0 1 0 1 0 1 0 1 0 1 0 1 0 1 0 1 0 0 0 0 0 0 0 0
0 0 1 1 0 0 1 1 0 0 1 1 0 0 1 1 0 0 1 1 0 0 1 1 0 0 1 1 0 0 1 1 0 0 0 0 0 0 0 0
0 0 0 0 1 1 1 1 0 0 0 0 1 1 1 1 0 0 0 0 1 1 1 1 0 0 0 0 1 1 1 1 0 0 0 0 0 0 0 0
0 0 0 0 0 0 0 0 1 1 1 1 1 1 1 1 0 0 0 0 0 0 0 0 1 1 1 1 1 1 1 1 0 0 0 0 0 0 0 0
0 0 0 0 0 0 0 0 0 0 0 0 0 0 0 0 1 1 1 1 1 1 1 1 1 1 1 1 1 1 1 1 0 0 0 0 0 0 0 0
1 1 1 1 1 1 1 1 1 1 1 1 1 1 1 1 1 1 1 1 1 1 1 1 1 1 1 1 1 1 1 1 0 0 0 0 0 0 0 0
0 0 1 0 1 0 0 0 0 1 1 0 0 0 1 1 1 1 1 1 0 0 0 0 1 1 1 0 1 1 1 0 1 0 1 0 1 0 1 0
0 0 0 0 0 0 0 0 1 1 1 0 0 1 1 0 1 0 1 1 0 1 1 0 1 1 1 0 0 0 1 1 1 0 0 1 1 0 0 1
0 0 0 0 1 0 1 0 1 1 1 1 0 0 1 0 0 0 1 1 0 1 1 0 0 1 0 1 0 1 1 0 0 0 0 1 1 1 1 1
```

Exemplary [40, 8] Code in Accordance with an Embodiment of the Present Invention Hereinafter, a method for designing an optimum [40, 8] code having a minimum distance of 16 will be described.

First, a [32, 8] code is generated by eliminating the ninth basis sequence '00001010111100100011011001010111' and the tenth basis sequence '00011100001101110010111101010001' from the [32, 10] code shown in Table 1, and a [8, 2] first order Reed Muller code is generated by eliminating the third basis sequence '00001111' and the fourth basis sequence '11111111' from the [8, 4] first order Reed Muller code shown in Table 2. Then, by concatenating the [32, 8] code and the [8, 2] first order Reed Muller code, the [40, 8] code is generated. Tables 7 and 8 below show the basis sequences of the [32, 8] code and the [8, 2] first order Reed Muller code formed in the manner described above. Table 9 below shows the [40, 8] code, an optimum code having a minimum distance of 16, which can be designed according to the above-described manner.

TABLE 7

```
0 1 0 1 0 1 0 1 0 1 0 1 0 1 0 1 0 1 0 1 0 1 0 1 0 1 0 1 0 1 0 1
0 0 1 1 0 0 1 1 0 0 1 1 0 0 1 1 0 0 1 1 0 0 1 1 0 0 1 1 0 0 1 1
0 0 0 0 1 1 1 1 0 0 0 0 1 1 1 1 0 0 0 0 1 1 1 1 0 0 0 0 1 1 1 1
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
0 0 1 0 1 0 0 0 0 1 1 0 0 0 1 1 1 1 1 0 0 0 0 0 1 1 1 0 1 1 1 0
0 0 0 0 0 0 0 0 1 1 1 0 0 1 1 0 1 0 1 1 0 1 1 0 1 1 1 0 0 0 1 1
```

TABLE 8

| 0 | 1 | 0 | 1 | 0 | 1 | 0 | 1 |
|---|---|---|---|---|---|---|---|
| 0 | 0 | 1 | 1 | 0 | 0 | 1 | 1 |

TABLE 9

```
0 1 0 1 0 1 0 1 0 1 0 1 0 1 0 1 0 1 0 1 0 1 0 1 0 1 0 1 0 1 0 1 0 0 0 0 0 0 0 0
0 0 1 1 0 0 1 1 0 0 1 1 0 0 1 1 0 0 1 1 0 0 1 1 0 0 1 1 0 0 1 1 0 0 0 0 0 0 0 0
0 0 0 0 1 1 1 1 0 0 0 0 1 1 1 1 0 0 0 0 1 1 1 1 0 0 0 0 1 1 1 1 0 0 0 0 0 0 0 0
0 0 0 0 0 0 0 0 1 1 1 1 1 1 1 1 0 0 0 0 0 0 0 0 1 1 1 1 1 1 1 1 0 0 0 0 0 0 0 0
0 0 0 0 0 0 0 0 0 0 0 0 0 0 0 0 1 1 1 1 1 1 1 1 1 1 1 1 1 1 1 1 0 0 0 0 0 0 0 0
1 1 1 1 1 1 1 1 1 1 1 1 1 1 1 1 1 1 1 1 1 1 1 1 1 1 1 1 1 1 1 1 0 0 0 0 0 0 0 0
0 0 1 0 1 0 0 0 0 1 1 0 0 0 1 1 1 1 1 1 0 0 0 0 1 1 1 0 1 1 1 0 1 0 1 0 1 0 1 0
0 0 0 0 0 0 0 0 1 1 1 0 0 1 1 0 1 0 1 1 0 1 1 0 1 1 1 0 0 0 1 1 1 0 0 1 1 0 0 1
```

In the case of using the [40, 10], [40, 9] and [40, 8] error correcting codes, the receiver can reduce the quantity of calculations in decoding by using a correlator employing the Inverse Fast Hadamard Transform (IFHT).

Figure 4:
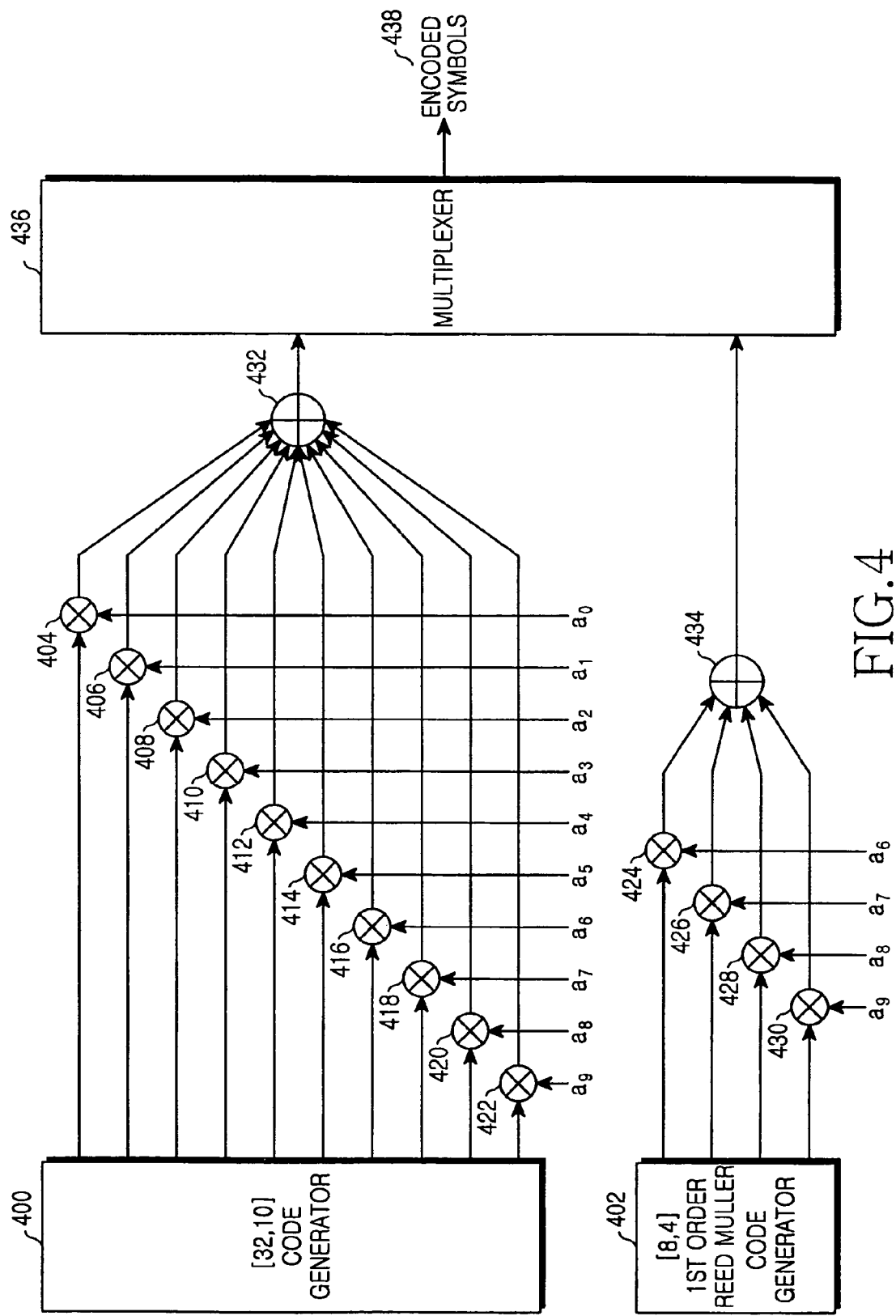
FIG. 4 illustrates a configuration of a [40, 10] encoder according to an embodiment of the present invention.

Exemplary [40, 10] Encoding in Accordance with an Embodiment of the Present Invention FIG. 4 illustrates a configuration of a [40, 10] encoder according to an embodiment of the present invention. The encoder of FIG. 4, which is an example of the channel encoders 218 and 219 shown in FIG. 2, converts 10 bits of the E-DCH uplink control information into 40 encoded symbols by using the [40, 10] code. The basis sequences of the [40, 10] code are as shown in Table 3.

Referring to FIG. 4, when 10 bits of the E-DCH uplink control information $a_0 \sim a_9$ are input to the encoder, the information bits $a_0$, $a_1$, $a_2$, $a_3$, $a_4$, $a_5$, $a_6$, $a_7$, $a_8$ and $a_9$ are input to the corresponding first multipliers 404, 406, 408, 410, 412, 414, 416, 418, 420 and 422, respectively. Further, the information bits $a_6$, $a_7$, $a_8$ and $a_9$ are input to the corresponding second multipliers 424, 426, 428 and 430, respectively. When the 10 information bits have been input in the manner described above, the [32, 10] code generator 400 and the [8, 4] first order Reed Muller code generator 402 generate the basis sequences as shown in Tables 1 and 2.

Specifically, the [32, 10] code generator 400 generates '0000010000', the first column of Table 1, in parallel. Then, the generated bits are sequentially input to the first multipliers 404, 406, 408, 410, 412, 414, 416, 418, 420 and 422, in which they are multiplied by the input information bits $a_0$, $a_1$, $a_2$, $a_3$, $a_4$, $a_5$, $a_6$, $a_7$, $a_8$ and $a_9$, and are then input to the first summer 432. The first summer 432 generates an encoded symbol by performing a modulo-2 addition for the 10 input values and outputs the generated encoded symbol to the multiplexer 436. This process is repeated up to '1111111111', the thirty second column of Table 1, so that 32 encoded symbols are input to the multiplexer 436.

Simultaneously, the [8, 4] first order Reed Muller code generator 402 generates '0001', the first column of Table 2. Then, the generated bits are sequentially input to the second multipliers 424, 426, 428 and 430, in which they are multiplied by the input information bits $a_6$, $a_7$, $a_8$ and $a_9$, and are then input to the second summer 434. The second summer 434 generates an encoded symbol by performing a modulo-2 addition for the 4 input values and outputs the generated encoded symbol to the multiplexer 436. This process is repeated up to '1111', the eighth column of Table 2, so that eight encoded symbols are input to the multiplexer 436.

Thereafter, the multiplexer 436 multiplexes the 32 encoded symbols generated by the first summer 432 and the eight encoded symbols generated by the second summer 434, thereby generating a codeword 438 including 40 encoded symbols.

More specifically, the multiplier 404 multiplies the first basis sequence of Table 1 by the information bit $a_0$ and outputs the product, the multiplier 406 multiplies the second basis sequence by the information bit $a_1$ and outputs the product, the multiplier 408 multiplies the third basis sequence by the information bit $a_2$ and outputs the product, the multiplier 410 multiplies the fourth basis sequence by the information bit $a_3$ and outputs the product, the multiplier 412 multiplies the fifth basis sequence by the information bit $a_4$ and outputs the product, the multiplier 414 multiplies the sixth basis sequence by the information bit $a_5$ and outputs the product, the multiplier 416 multiplies the seventh basis sequence by the information bit $a_6$ and outputs the product, the multiplier 418 multiplies the eighth basis sequence by the information bit $a_7$ and outputs the product, the multiplier 420 multiplies the ninth basis sequence by the information bit $a_8$ and outputs the product, and the multiplier 422 multiplies the tenth basis sequence by the information bit $a_9$ and outputs the product. Then, the first summer 432 adds the products output from the multipliers 404 to 422 for each symbol and thereby outputs 32 encoded symbols.

The multiplier 424 multiplies the first basis sequence of Table 2 by the information bit $a_6$ and outputs the product, the multiplier 426 multiplies the second basis sequence by the information bit $a_7$ and outputs the product, the multiplier 428 multiplies the third basis sequence by the information bit $a_8$ and outputs the product, and the multiplier 430 multiplies the fourth basis sequence by the information bit $a_9$ and outputs the product. Then, the second summer 434 adds the products output from the multipliers 424 to 430 for each symbol and thereby outputs eight encoded symbols. Then, the multiplexer 436 concatenates the symbols from the first summer 432 and the symbols from the second summer 434, thereby outputting 40 encoded symbols.

Figure 5:
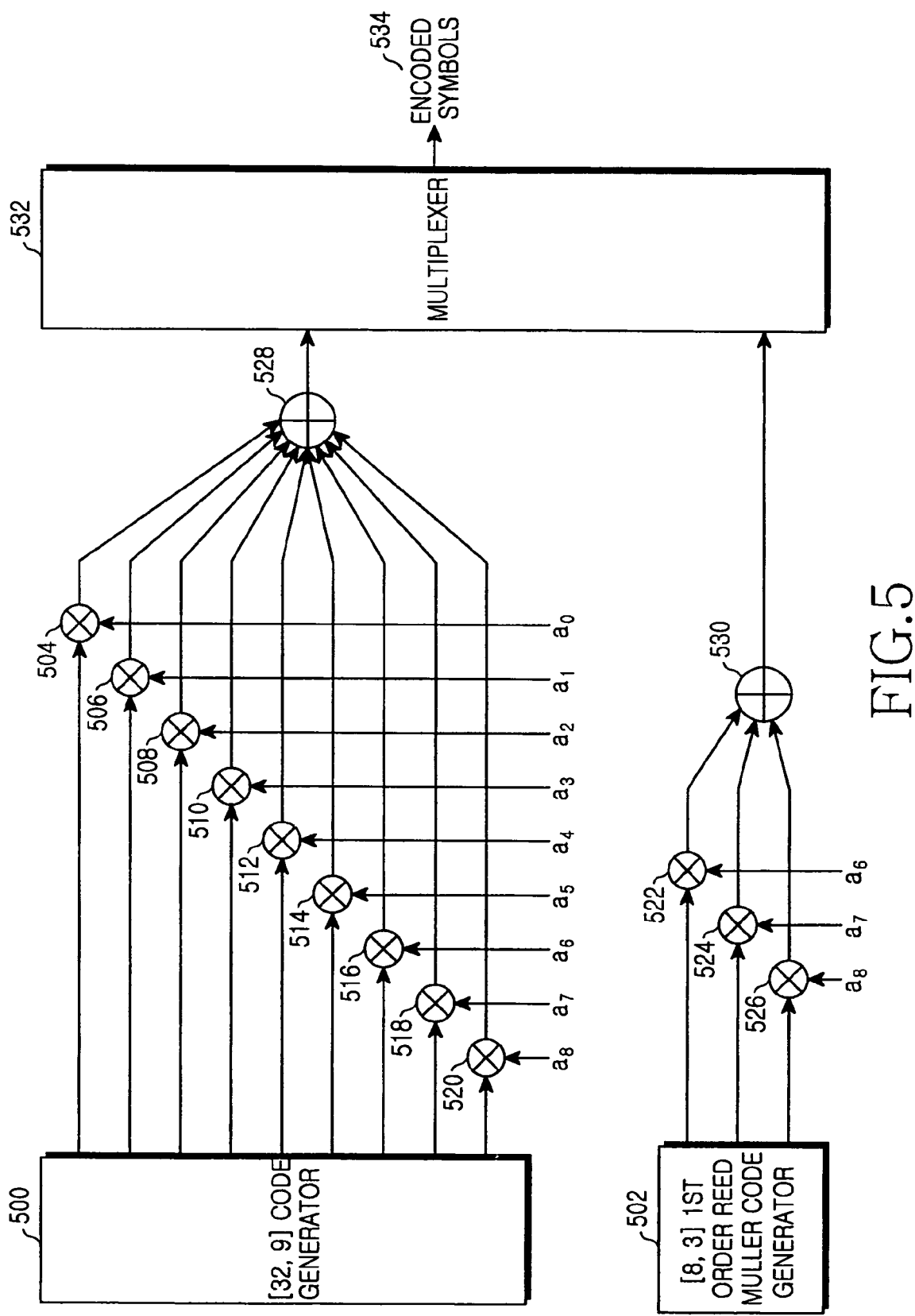
FIG. 5 illustrates a configuration of a [40, 9] encoder according to an embodiment of the present invention.

Exemplary [40, 9] Encoding in Accordance with an Embodiment of the Present Invention FIG. 5 illustrates a configuration of a [40, 9] encoder according to an embodiment of the present invention. The encoder of FIG. 5, which is an example of the channel encoders 218 and 219 shown in FIG. 2, converts 9 bits of the E-DCH uplink control information into 40 encoded symbols by using the [40, 9] code. The basis sequences of the [40, 9] code are as shown in Table 6.

Referring to FIG. 5, when the 9 E-DCH uplink control information bits $a_0 \sim a_8$ are input to the encoder, the information bits $a_0$, $a_1$, $a_2$, $a_3$, $a_4$, $a_5$, $a_6$, $a_7$ and $a_8$ are input to the corresponding first multipliers 504, 506, 508, 510, 512, 514, 516, 518 and 520, respectively. Further, the information bits $a_6$, $a_7$ and $a_8$ are input to the corresponding second multipliers 522, 524 and 526, respectively. When the 9 information bits have been input in the manner described above, the [32, 9] code generator 500 and the [8, 3] first order Reed Muller code generator 502 generate the basis sequences as shown in Tables 4 and 5.

Specifically, the [32, 9] code generator 500 generates '000001000', the first column of Table 4, in parallel. Then, the generated bits are sequentially input to the first multipliers 504, 506, 508, 510, 512, 514, 516, 518 and 520, in which they are multiplied by the input information bits $a_0$, $a_1$, $a_2$, $a_3$, $a_4$, $a_5$, $a_6$, $a_7$ and $a_8$, and are then input to the first summer 528. The first summer 528 generates an encoded symbol by performing a modulo-2 addition for the 9 input values and outputs the generated encoded symbol to the multiplexer 532. This process is repeated up to '111111111', the thirty second column of Table 4, so that 32 encoded symbols are input to the multiplexer 532.

Simultaneously, the [8, 3] first order Reed Muller code generator 502 generates '000', the first column of Table 5. Then, the generated bits are sequentially input to the second multipliers 522, 524 and 526, in which they are multiplied by the input information bits $a_6$, $a_7$, and $a_8$, and are then input to the second summer 530. The second summer 530 generates an encoded symbol by performing a modulo-2 addition for the 3 input values and outputs the generated encoded symbol to the multiplexer 532. This process is repeated up to '111', the eighth column of Table 5, so that eight encoded symbols are input to the multiplexer 532.

Thereafter, the multiplexer 532 multiplexes the 32 encoded symbols generated by the first summer 528 and the eight encoded symbols generated by the second summer 530, thereby generating a codeword 534 including 40 encoded symbols.

More specifically, the multiplier 504 multiplies the first basis sequence of Table 4 by the information bit $a_0$ and outputs the product, the multiplier 506 multiplies the second basis sequence by the information bit $a_1$ and outputs the product, the multiplier 508 multiplies the third basis sequence by the information bit $a_2$ and outputs the product, the multiplier 510 multiplies the fourth basis sequence by the information bit $a_3$ and outputs the product, the multiplier 512 multiplies the fifth basis sequence by the information bit $a_4$ and outputs the product, the multiplier 514 multiplies the sixth basis sequence by the information bit $a_5$ and outputs the product, the multiplier 516 multiplies the seventh basis sequence by the information bit $a_6$ and outputs the product, the multiplier 518 multiplies the eighth basis sequence by the information bit $a_7$ and outputs the product, and the multiplier 520 multiplies the ninth basis sequence by the information bit $a_8$ and outputs the product. Then, the first summer 528 adds the products output from the multipliers 504 to 520 for each symbol and thereby outputs 32 encoded symbols.

The multiplier 522 multiplies the first basis sequence of Table 5 by the information bit $a_6$ and outputs the product, the multiplier 524 multiplies the second basis sequence by the information bit $a_7$ and outputs the product, and the multiplier 526 multiplies the third basis sequence by the information bit $a_8$ and outputs the product. Then, the second summer 530 adds the products output from the multipliers 522 to 526 for each symbol and thereby outputs eight encoded symbols. Then, the multiplexer 532 concatenates the symbols from the first summer 528 and the symbols from the second summer 530, thereby outputting 40 encoded symbols.

Figure 6:
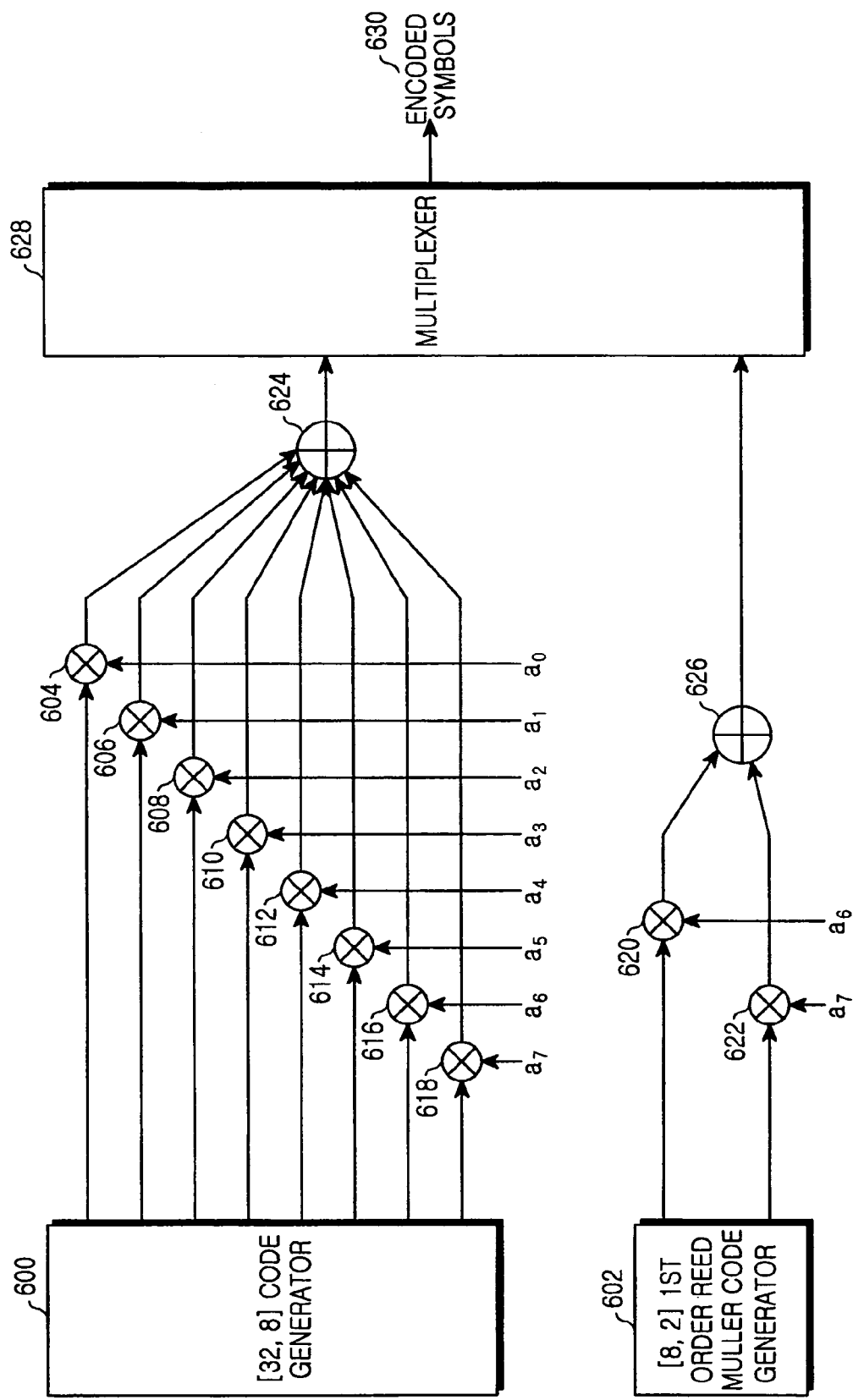
FIG. 6 illustrates a configuration of a [40, 8] encoder according to an embodiment of the present invention.

Exemplary [40, 8] Encoding in Accordance with an Embodiment of the Present Invention FIG. 6 illustrates a configuration of a [40, 8] encoder according to an embodiment of the present invention. The encoder of FIG. 6, which is an example of the channel encoders 218 and 219 shown in FIG. 2, converts 8 bits of E-DCH uplink control information into 40 encoded symbols by using the [40, 8] code. The basis sequences of the [40, 8] code are as shown in Table 9.

Referring to FIG. 6, when the 8 E-DCH uplink control information bits $a_0$~$a_7$ are input to the encoder, the information bits $a_0$, $a_1$, $a_2$, $a_3$, $a_4$, $a_5$, $a_6$ and $a_7$ are input to the corresponding first multipliers 604, 606, 608, 610, 612, 614, 616 and 618, respectively. Further, the information bits $a_6$ and $a_7$ are input to the corresponding second multipliers 620 and 622, respectively. When the 8 information bits have been input in the manner described above, the [32, 8] code generator 600 and the [8, 2] first order Reed Muller code generator 602 generate the basis sequences as shown in Tables 7 and 8.

Specifically, the [32, 8] code generator 600 generates '00000100', the first column of Table 7, in parallel. Then, the generated bits are sequentially input to the first multipliers 604, 606, 608, 610, 612, 614, 616 and 618, in which they are multiplied by the input information bits $a_0$, $a_1$, $a_2$, $a_3$, $a_4$, $a_5$, $a_6$ and $a_7$, and are then input to the first summer 624. The first summer 624 generates an encoded symbol by performing a modulo-2 addition for the 8 input values and outputs the generated encoded symbol to the multiplexer 628. This process is repeated up to '11111111', the thirty second column of Table 7, so that 32 encoded symbols are input to the multiplexer 628.

Simultaneously, the [8, 2] first order Reed Muller code generator 602 generates '00', the first column of Table 8. Then, the generated bits are sequentially input to the second multipliers 620 and 622, in which they are multiplied by the input information bits $a_6$ and $a_7$, and are then input to the second summer 626. The second summer 626 generates an encoded symbol by performing a modulo-2 addition for the 2 input values and outputs the generated encoded symbol to the multiplexer 628. This process is repeated up to '11', the eighth column of Table 8, so that eight encoded symbols are input to the multiplexer 628.

Thereafter, the multiplexer 628 multiplexes the 32 encoded symbols generated by the first summer 624 and the eight encoded symbols generated by the second summer 626, thereby generating a codeword 630 including 40 encoded symbols.

More specifically, the multiplier 604 multiplies the first basis sequence of Table 7 by the information bit $a_0$ and outputs the product, the multiplier 606 multiplies the second basis sequence by the information bit $a_1$ and outputs the product, the multiplier 608 multiplies the third basis sequence by the information bit $a_2$ and outputs the product, the multiplier 610 multiplies the fourth basis sequence by the information bit $a_3$ and outputs the product, the multiplier 612 multiplies the fifth basis sequence by the information bit $a_4$ and outputs the product, the multiplier 614 multiplies the sixth basis sequence by the information bit $a_5$ and outputs the product, the multiplier 616 multiplies the seventh basis sequence by the information bit $a_6$ and outputs the product, and the multiplier 618 multiplies the eighth basis sequence by the information bit $a_7$ and outputs the product. Then, the first summer 624 adds the products output from the multipliers 604 to 618 for each symbol and thereby outputs 32 encoded symbols.

The multiplier 620 multiplies the first basis sequence of Table 8 by the information bit $a_6$ and outputs the product, and the multiplier 622 multiplies the second basis sequence by the information bit $a_7$ and outputs the product. Then, the second summer 626 adds the products output from the multipliers 620 and 622 for each symbol and thereby outputs eight encoded symbols. Then, the multiplexer 628 concatenates the symbols from the first summer 624 and the symbols from the second summer 626, thereby outputting 40 encoded symbols.

Figure 7:
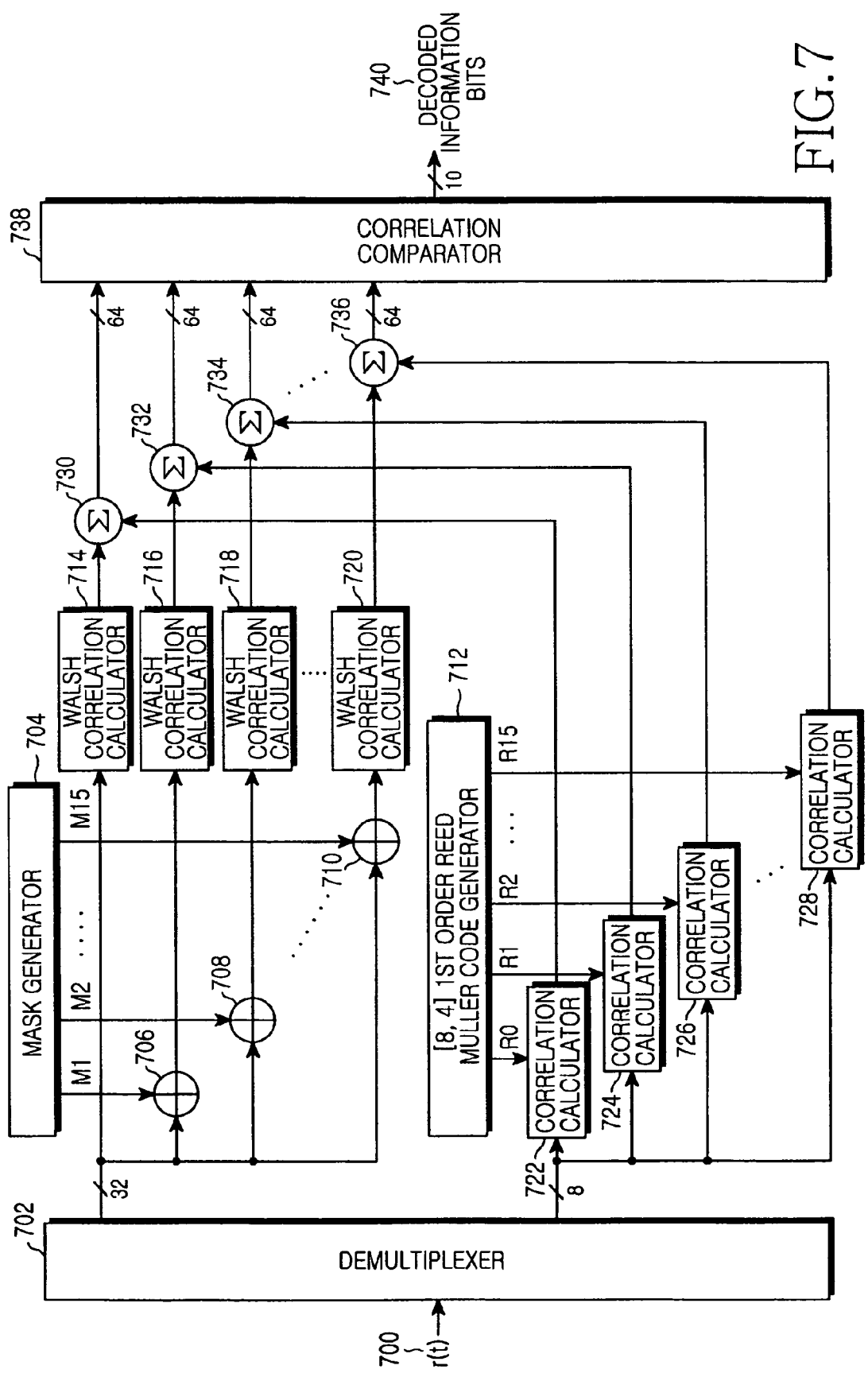
FIG. 7 illustrates a configuration of a [40, 10] decoder according to an embodiment of the present invention.

Exemplary [40, 10] Decoding in Accordance with an Embodiment of the Present Invention FIG. 7 illustrates a configuration of a [40, 10] decoder according to an embodiment of the present invention. The decoder of FIG. 7, which is an example of the channel decoders 314 and 316 shown in FIG. 3 and corresponds to the encoders of FIG. 4, decodes 10 bits of control information from the 40 encoded symbols.

Referring to FIG. 7, the received signal r(t) 700 including the 40 encoded symbols is divided into 32 higher symbols and eight lower symbols by the demultiplexer 702. The 32 higher symbols are input to the 15 adders 706, 708, . . . , 710, and the first Walsh correlation calculator 714. The received signal r(t) 700 is a signal having passed through a channel after being encoded by the [32, 10] code and the [8, 4] first order Reed Muller code in the channel encoder having the configuration as shown in FIG. 4.

The mask generator 704 generates 15 mask sequences M1, M2, M3, ..., M15 according to the [32, 10] code used in the channel encoder and outputs them to the adders 706 to 710. The 15 mask sequences M1, M2, M3, ..., M15 are 15 orderly arranged sequences except for the all-zero sequence from among 16 codewords generated by a linear combination of the seventh to tenth codewords in Table 1. That is, the 15 mask sequences M1, M2, M3, ..., M15 are comprised as follows:

M1="00101000011000111111000001110111",
M2="00000001110011010110110111000111",
M3="00101001101011101001110110110000",
M4="00001010111110010001101100101011",
M5="00100010100110101110101101011100",
M6="00001011001101000111011011101100", and
M7="00100011010101111000011010011011".
M8="00011100001101110010111101010001",
M9="00110100010101001101111100100110",
M10="00011101111110100100001010010110",
M11="00110101100110011011001011100001",
M12="00010110110011100011010001111010",
M13="00111110101011011100010000001101",
M14="00010111000000110101100110111101", and
M15="00111111011000001010100111001010".

The first adder 706 adds the 32 higher symbols from the demultiplexer 702 and the mask sequence M1 from the mask generator 704 by modulo-2 addition, and outputs the resultant symbols to the second Walsh correlation calculator 716. The second adder 708 adds the 32 higher symbols and the mask sequence M2 from the mask generator 704 by modulo-2 addition and outputs the resultant symbols to the third Walsh correlation calculator 718. Also, other adders operate similarly to the above described manner. Finally, the fifteenth adder 710 adds the 32 higher symbols and the final mask sequence M15 from the mask generator 704 by modulo-2 addition and outputs the resultant symbols to the sixteenth Walsh correlation calculator 720. As noted from the above description, the decoder comprises as many adders 706 to 710 as mask sequences, and each of the adders 706 to 710 generates unmasked symbols by adding the 32 higher symbols and the corresponding mask sequence by modulo-2 addition and then outputs the unmasked symbols to the corresponding Walsh correlation calculators 716 to 720.

If the 32 higher symbols have been encoded by the combination of the basis mask sequences, one of the outputs of the adders 706 to 710 is expected to be a signal from which the mask sequence has been removed. This is due to the orthogonality between the mask sequences. For example, if the information bits have been encoded by using the mask sequence M2, the output of the second adder, which is a result of the addition of the M2 and the 32 higher symbols, is expected to be the signal from which the mask sequence has been removed. The signal from which the mask sequence has been removed can be said to be a signal spread by a predetermined Walsh code.

The first Walsh correlation calculator 714 correlates the 32 higher symbols from the demultiplexer 702 with 64 bi-orthogonal Walsh codes and thereby outputs 64 correlation values to the first summer 730. The second Walsh correlation calculator 716 correlates the symbols from the first adder 706 with the 64 bi-orthogonal Walsh codes and thereby outputs 64 correlation values to the second summer 732. The third Walsh correlation calculator 718 correlates the symbols from the second adder 708 with the 64 bi-orthogonal Walsh codes and thereby outputs 64 correlation values to the third summer 734. The sixteenth Walsh correlation calculator 720 correlates the symbols from the fifteenth adder 710 with the 64 bi-orthogonal Walsh codes and thereby outputs 64 correlation values to the sixteenth summer 736.

Figure 8A:
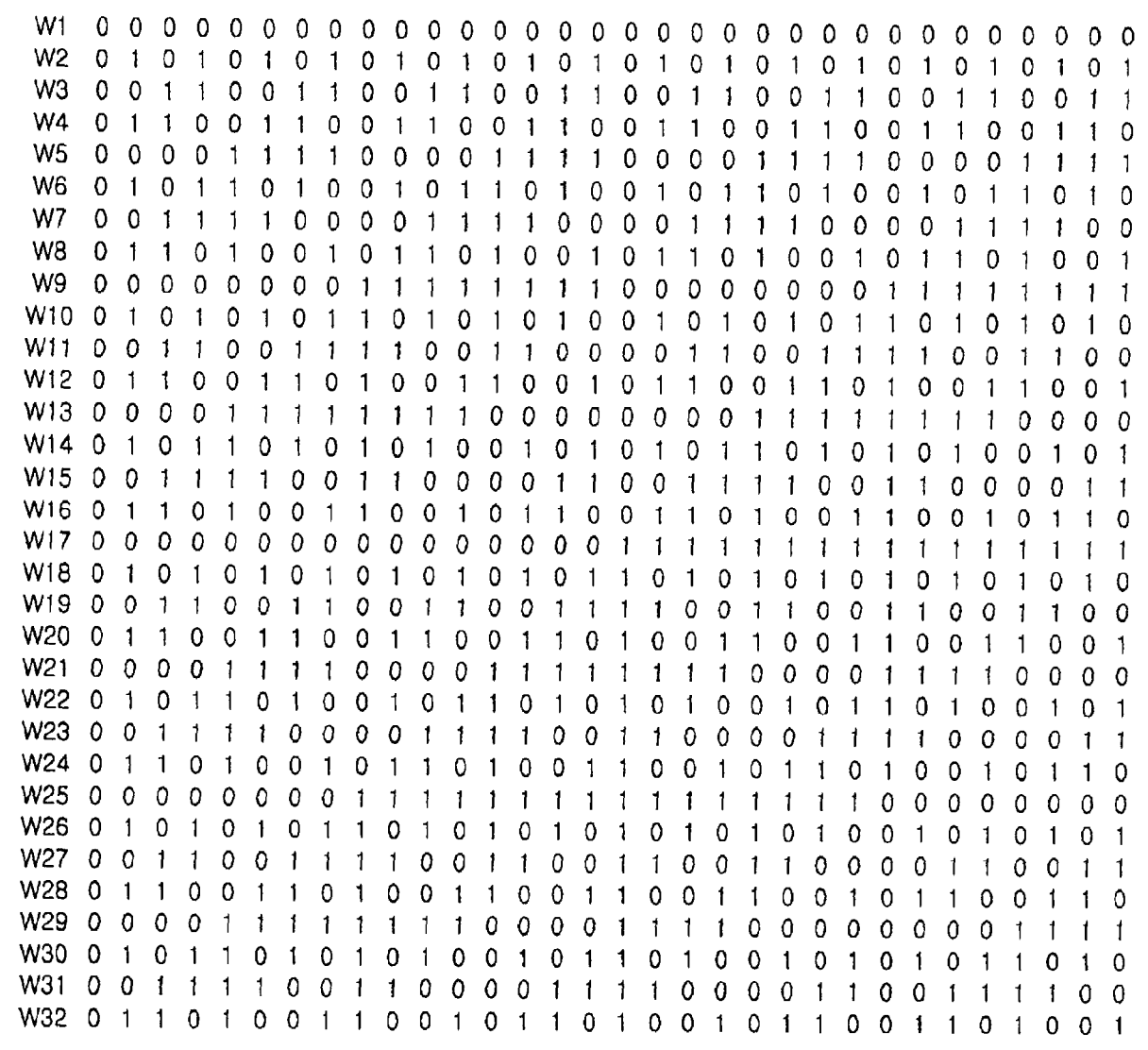
Figure 8B:
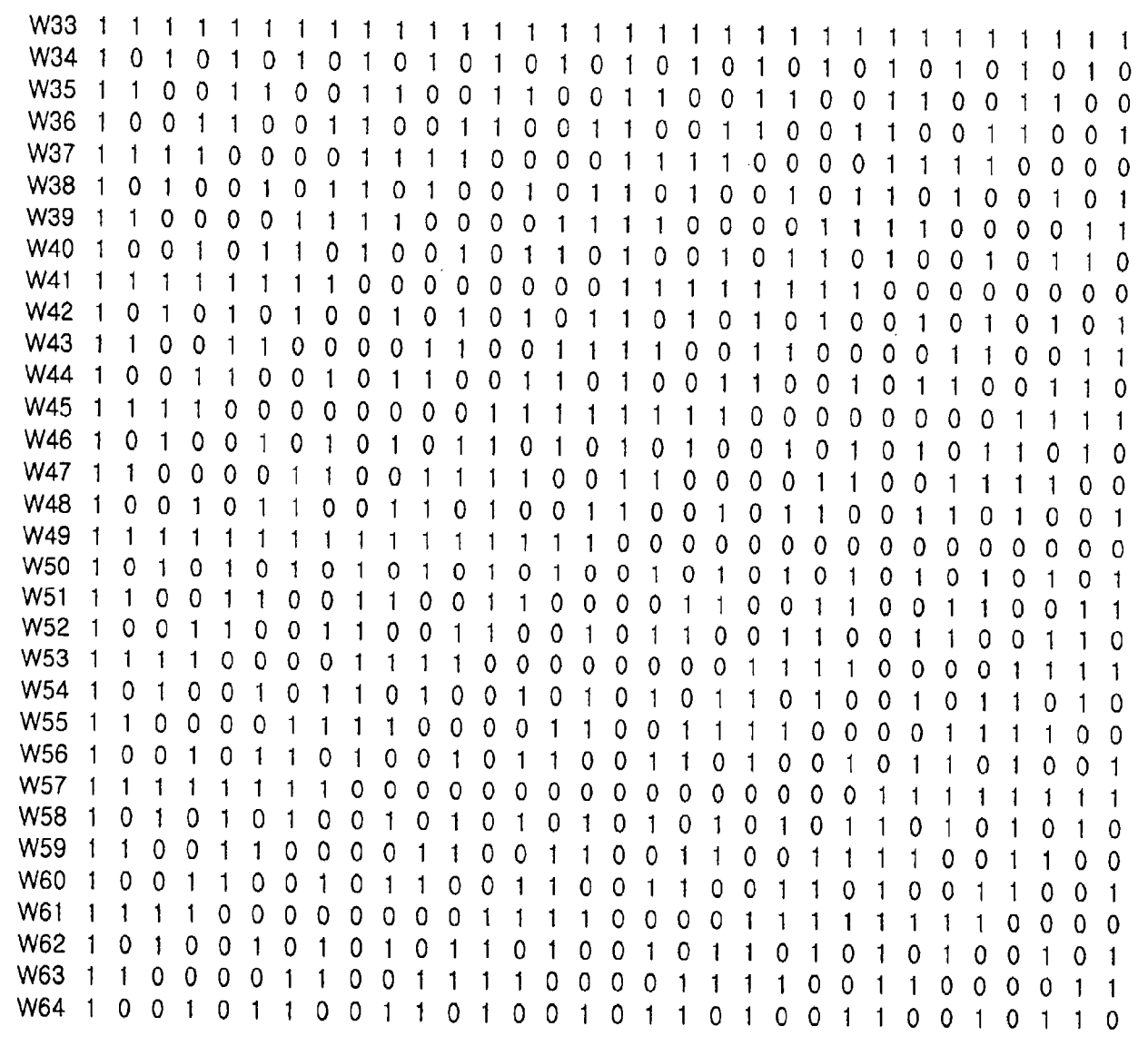

In this manner, each of the Walsh correlation calculators 714 to 720 correlates 32 input symbols with 64 bi-orthogonal Walsh codes and thereby outputs 64 correlation values to the corresponding summer 730 to 736. The 64 bi-orthogonal Walsh codes correspond to all Walsh codes which can be generated by a combination of five basis Walsh codes having a length of 5 and the all-one sequence. FIGS. 8A and 8B show Walsh codes preferably used in the calculation of the correlation values in the Walsh correlation calculators 714 to 720.

In FIGS. 8A and 8B, W2, W3, W5, W9, W17 and W33 are basis Walsh codes, and W33 is the all-one sequence. Combination of the basis Walsh codes and the all-one sequence generates 64 Walsh codes as shown in FIGS. 8A and 8B. The Walsh correlation calculators 714 to 720 preferably use IFHT in order to achieve rapid calculation of correlation with the 64 Walsh codes.

The eight lower symbols divided by the demultiplexer 702 are input to the correlation calculators 722, 724, 726, ..., 728. The [8, 4] first order Reed Muller code generator 712 generates first order Reed Muller codewords R0, R1, ..., R15, and outputs them to the correlation calculators 722, 724, 726, ..., 728. The 16 codewords R0, R1, ..., R15 are codewords of the [8, 4] first order Reed Muller code used in the channel encoder, which are generated by sequentially arranging 16 codewords formed through a linear combination of the four codewords of Table 2. That is, R0=[00000000], R1=[01010101], R2=[00110011], R3=[01100110], R4=[00001111], R5=[01011010], R6=[00111100], R7=[01101001], R8=[11111111], R9=[10101010], R10=[11001100], R11=[10011001], R12=[11110000], R13=[10100101], R14=[11000011], and R15=[10010110].

The first correlation calculator 722 calculates the correlation value of the first order Reed Muller code R0 and the eight lower symbols from the demultiplexer 702, and outputs the calculated correlation value to the first summer 730. The second correlation calculator 724 calculates the correlation value of the first order Reed Muller code R1 and the eight lower symbols, and outputs the calculated correlation value to the second summer 732. The third correlation calculator 726 calculates the correlation value of the first order Reed Muller code R2 and the eight lower symbols, and outputs the calculated correlation value to the third summer 734. The sixteenth correlation calculator 728 calculates the correlation value of the first order Reed Muller code R15 and the eight lower symbols, and outputs the calculated correlation value to the sixteenth summer 736. The decoder comprises as many correlation calculators 722 to 728 as the first order Reed Muller codewords, wherein each of the correlation calculators 722 to 728 correlates the eight input lower symbols and the corresponding first order Reed Muller codeword and thereby outputs the correlation value to the corresponding summers 730 to 736. The correlation calculators 722 to 728 may preferably use IFHT in order to achieve rapid calculation of correlation with the first order Reed Muller codewords R0, R1, ..., R15.

The first summer 730 adds the correlation value from the first correlation calculator 722 to each of the 64 correlation values from the first Walsh correlation calculator 714 and thereby outputs 64 added correlation values to the correlation comparator 738. The second summer 732 adds the correlation value from the second correlation calculator 724 to each of the 64 correlation values from the second Walsh correlation calculator 716 and thereby outputs 64 added correlation values to the correlation comparator 738. The sixteenth summer 736 adds the correlation value from the sixteenth correlation calculator 728 to each of the 64 correlation values from the sixteenth Walsh correlation calculator 720 and thereby outputs 64 added correlation values to the correlation comparator 738. As a result, a total of 1024 correlation values generated by the summers 730 to 736 are input to the correlation comparator 738.

The correlation comparator 738 compares the 1024 correlation values input from the summers 730 to 736 and determines the maximum correlation value from among the 1024 correlation values. When the maximum correlation value has been determined, the correlation comparator 738 determines and outputs 10 decoded information bits 740 based on the [8, 4] first order Reed Muller code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M2 and the Walsh code corresponding to the maximum correlation value is W4, the decoded information bits are determined as "(index corresponding to W4)//(index corresponding to M2)", wherein "//" implies concatenation.

For example, where the 10 information bits $a_0$ to $a_9$ are '1100000100', the channel encoder encodes the information bits into "M2⊚W4//R2" and then transmits the encoded information bits. Here, ⊚ is a symbol denoting the modulo-2 addition. In the channel decoder, the received signal r(t) 700 encoded into "M2⊚W4//R2" is divided into an "M2⊚W4" related part and an "R2" related part by the demultiplexer 702. Then, the "M2⊚W4" related part which includes the 32 higher symbols is added to the all mask sequences by modulo-2 addition, and the added values are correlated with the 64 bi-orthogonal Walsh codes, so that a total of 1024 correlation values are generated.

Further, the "R2" related part which includes the eight lower symbols is correlated with all codewords of the [8, 4] first order Reed Muller code, so that 16 correlation values are obtained. Then, the 16 correlation values and the 1024 correlation values are summed according to a predetermined rule, so that 1024 added correlation values are obtained. Then, it is confirmed that the received signal r(t) has been encoded by M2, W4 and R2, that is, by the Walsh code index, mask sequence index and [8, 4] first order Reed Muller code index corresponding to the maximum value among the 1024 added correlation values. Upon confirming that the received signal r(t) has been encoded by M2, W4 and R2, the channel decoder combines '110000' (the index corresponding to the W4) and '0100' (the index corresponding to the M2), thereby outputting '1100000100' as the decoded information bits.

A reason why the information bits are determined by summing the result of decoding the [32, 10] code and the result of decoding the [8, 4] first order Reed Muller code is in order to achieve an exact decoding result by satisfying the minimum distance '16'. When the channel state is good, it is possible to obtain the information bit column by decoding only the [32, 10] code. However, it is substantially impossible to obtain an exact decoding result when the channel state is not good, because the minimum distance of the [32, 10] code is '12'. Therefore, both the [32, 10] code and the [8, 4] first order Reed Muller code are decoded, and the information bit column is determined from the combination of the decoding results for both codes.

Figure 9:
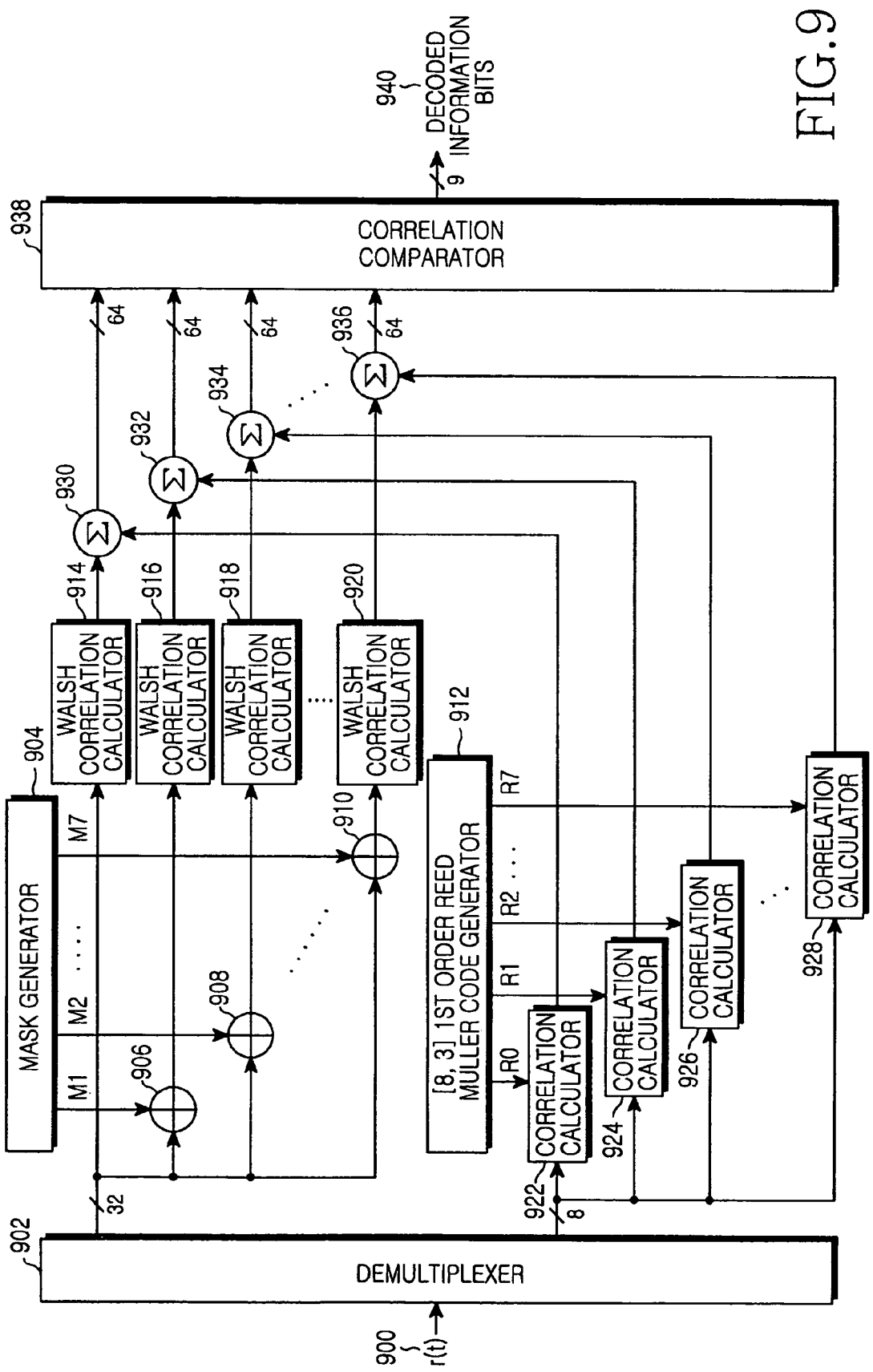
FIG. 9 illustrates a configuration of a [40, 9] decoder according to an embodiment of the present invention.

Exemplary [40, 9] Decoding in Accordance with an Embodiment of the Present Invention FIG. 9 illustrates a configuration of a [40, 9] decoder according to an embodiment of the present invention. The decoder of FIG. 9, which is an example of the channel decoders 314 and 316 shown in FIG. 3 and corresponds to the encoders of FIG. 5, decodes 9 bits of control information from the 40 encoded symbols.

Referring to FIG. 9, the received signal r(t) 900 including the 40 encoded symbols is divided into 32 higher symbols and eight lower symbols by the demultiplexer 902. The 32 higher symbols are input to the 7 adders 906, 908, . . . , 910, and the first Walsh correlation calculator 914. The received signal r(t) 900 is a signal having passed through a channel after being encoded by the [32, 9] code and the [8, 3] first order Reed Muller code in the channel encoder having the configuration as shown in FIG. 5.

The mask generator 904 generates 7 mask sequences M1, M2, M3, . . . , M7 according to the [32, 9] code used in the channel encoder and outputs them to the adders 906 to 910. The 7 mask sequences M1, M2, M3, . . . , M7 are 7 orderly arranged sequences except for the all-zero sequence from among 8 codewords generated by a linear combination of the seventh to ninth codewords in Table 4. That is, the 7 mask sequences M1, M2, M3, . . . , M7 are comprised as follows:

M1="00101000011000111111000001110111",
M2="00000001110011010110110111000111",
M3="00101001101011101001110110110000",
M4="00001010111110010001101100101011",
M5="00100010100110101110101101011100",
M6="00001011001101000111011011101100", and
M7="00100011010101111000011010011011".

The first adder 906 adds the 32 higher symbols from the demultiplexer 902 and the mask sequence M1 from the mask generator 904 by modulo-2 addition and outputs the resultant symbols to the second Walsh correlation calculator 916. The second adder 908 adds the 32 higher symbols and the mask sequence M2 from the mask generator 904 by modulo-2 addition and outputs the resultant symbols to the third Walsh correlation calculator 918. The seventh adder 910 adds the 32 higher symbols and the mask sequence M7 from the mask generator 904 by modulo-2 addition and outputs the resultant symbols to the eighth Walsh correlation calculator 920. As noted from the above description, the decoder comprises as many adders 906 to 910 as mask sequences, and each of the adders 906 to 910 generates unmasked symbols by adding the 32 higher symbols and the corresponding mask sequence by modulo-2 addition and then outputs the unmasked symbols to the corresponding Walsh correlation calculators 916 to 920.

If the 32 higher symbols have been encoded by the combination of the basis mask sequences, one of the outputs of the adders 906 to 910 is expected to be a signal from which the mask sequence has been removed. For example, if the information bits have been encoded by using the mask sequence M2, the output of the second adder 908, which is a result of the addition of the M2 and the 32 higher symbols, is expected to be the signal from which the mask sequence has been removed. The signal from which the mask sequence has been removed is a signal encoded by one of the Walsh codes shown in FIGS. 8A and 8B.

The first Walsh correlation calculator 914 correlates the 32 higher symbols from the demultiplexer 902 with 64 bi-orthogonal Walsh codes and thereby outputs 64 correlation values to the first summer 930. The second Walsh correlation calculator 916 correlates the symbols from the first adder 906 with the 64 bi-orthogonal Walsh codes and thereby outputs 64 correlation values to the second summer 932. The third Walsh correlation calculator 918 correlates the symbols from the second adder 908 with the 64 bi-orthogonal Walsh codes and thereby outputs 64 correlation values to the third summer 934. The eighth Walsh correlation calculator 920 correlates the symbols from the seventh adder 910 with the 64 bi-orthogonal Walsh codes and thereby outputs 64 correlation values to the eighth summer 936. In this manner, each of the Walsh correlation calculators 914 to 920 correlates 32 input symbols with 64 bi-orthogonal Walsh codes and thereby outputs 64 correlation values to the corresponding summers 930 to 936. The Walsh correlation calculators 914 to 920 preferably use IFHT in order to achieve rapid calculation of correlation with the 64 Walsh codes.

The eight lower symbols divided by the demultiplexer 902 are input to the correlation calculators 922, 924, 926, ..., 928. The [8, 3] first order Reed Muller code generator 912 generates first order Reed Muller codewords R0, R1, ..., R7 and outputs them to the correlation calculators 922 to 928. The 8 codewords R0, R1, ..., R7 are codewords of the [8, 3] first order Reed Muller code used in the channel encoder, which are generated by sequentially arranging 8 codewords formed through a linear combination of the 3 codewords of Table 5. That is, R0=[00000000], R1=[01010101], R2=[00110011], R3=[01100110], R4=[00001111], R5=[01011010], R6=[00111100], and R7=[01101001].

The first correlation calculator 922 calculates the correlation value of the first order Reed Muller code R0 and the eight lower symbols from the demultiplexer 902 and outputs the calculated correlation value to the first summer 930. The second correlation calculator 924 calculates the correlation value of the first order Reed Muller code R1 and the eight lower symbols and outputs the calculated correlation value to the second summer 932. The third correlation calculator 926 calculates the correlation value of the first order Reed Muller code R2 and the eight lower symbols and outputs the calculated correlation value to the third summer 934. The eighth correlation calculator 928 calculates the correlation value of the first order Reed Muller code R7 and the eight lower symbols and outputs the calculated correlation value to the eighth summer 936. The decoder comprises as many correlation calculators 922 to 928 as the codewords of the [8, 3] first order Reed Muller code, wherein each of the correlation calculators 922 to 928 correlates the eight input lower symbols and the corresponding first order Reed Muller codeword and thereby outputs the correlation value to the corresponding summers 930 to 936. The correlation calculators 922 to 928 preferably use IFHT in order to achieve rapid calculation of correlation with the first order Reed Muller codewords R0, R1, ..., R7.

The first summer 930 adds the correlation value from the first correlation calculator 922 to each of the 64 correlation values from the first Walsh correlation calculator 914 and thereby outputs 64 added correlation values to the correlation comparator 938. The second summer 932 adds the correlation value from the second correlation calculator 924 to each of the 64 correlation values from the second Walsh correlation calculator 916 and thereby outputs 64 added correlation values to the correlation comparator 938. The eighth summer 936 adds the correlation value from the eighth correlation calculator 928 to each of the 64 correlation values from the eighth Walsh correlation calculator 920 and thereby outputs 64 added correlation values to the correlation comparator 938. As a result, a total of 512 correlation values generated by the summers 930 to 936 are input to the correlation comparator 938.

The correlation comparator 938 compares the 512 correlation values input from the summers 930 to 936 and determines the maximum correlation value from among the 512 correlation values. When the maximum correlation value has been determined, the correlation comparator 938 determines and outputs 9 decoded information bits 940 based on the [8, 3] first order Reed Muller code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M2 and the Walsh code corresponding to the maximum correlation value is W4, the decoded information bits are determined as "(index corresponding to W4)//(index corresponding to M2)".

For example, where the 9 information bits $a_0$ to $a_8$ are '110000010', the channel encoder encodes the information bits into "M2⊕W4//R2" and then transmits the encoded information bits. In the channel decoder, the received signal r(t) 900 encoded into "M2⊕W4//R2" is divided into an "M2⊕W4" related part and an "R2" related part by the demultiplexer 902. Then, the "M2⊕W4" related part which includes the 32 higher symbols is added to the all mask sequences by modulo-2 addition, and the added values are correlated with the 64 bi-orthogonal Walsh codes, so that a total of 512 correlation values are generated.

Further, the "R2" related part which includes the eight lower symbols is correlated with all codewords of the [8, 3] first order Reed Muller code, so that eight correlation values are obtained. Then, the eight correlation values and the 512 correlation values are summed according to a predetermined rule, so that 512 added correlation values are obtained. Then, it is confirmed that the received signal r(t) has been encoded by M2, W4 and R2, that is, by the Walsh code index, mask sequence index and [8, 3] first order Reed Muller code index corresponding to the maximum value among the 512 added correlation values. Upon confirming that the received signal r(t) has been encoded by M2, W4 and R2, the channel decoder combines '110000' (the index corresponding to the W4) and '010' (the index corresponding to the M2), thereby outputting '110000010' as the decoded information bits.

Figure 10:
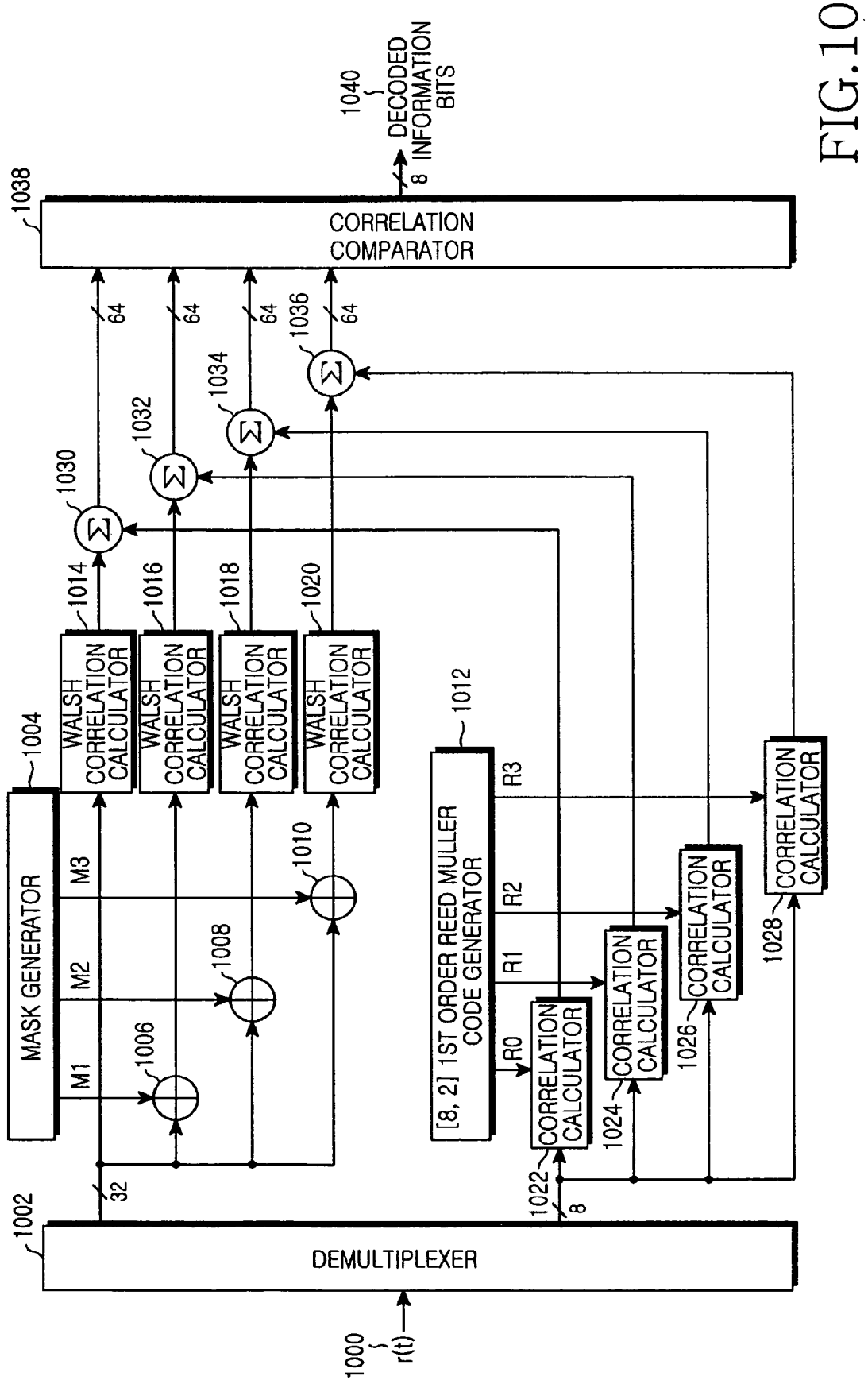
FIG. 10 illustrates a configuration of a [40, 8] decoder according to an embodiment of the present invention.

Exemplary [40, 8] Decoding in Accordance with an Embodiment of the Present Invention FIG. 10 illustrates a configuration of a [40, 8] decoder according to an embodiment of the present invention. The decoder of FIG. 10, which is an example of the channel decoders 314 and 316 shown in FIG. 3 and corresponds to the encoders of FIG. 6, decodes 8 bits of control information from the 40 encoded symbols.

Referring to FIG. 10, the received signal r(t) 1000 including the 40 encoded symbols is divided into 32 higher symbols and eight lower symbols by the demultiplexer 1002. The 32 higher symbols are input to three adders 1006, 1008 and 1010 and the first Walsh correlation calculator 1014. The received signal r(t) 1000 is a signal having passed through a channel after being encoded by the [32, 8] code and the [8, 2] first order Reed Muller code in the channel encoder having the configuration as shown in FIG. 6.

The mask generator 1004 generates three mask sequences M1, M2 and M3 according to the [32, 8] code used in the channel encoder, and outputs them to the adders 1006, 1008 and 1010. The three mask sequences M1, M2 and M3 are three orderly arranged sequences except for the all-zero sequence, from among four codewords generated by a linear combination of the seventh to eighth codewords in Table 7. That is, the three mask sequences M1, M2 and M3 are comprised as follows:

M1="00101000011000111111000001110111",
M2="00000001110011010110110111000111", and
M3="00101001101011101001110110110000".

The first adder 1006 adds the 32 higher symbols from the demultiplexer 1002 and the mask sequence M1 from the mask generator 1004 by modulo-2 addition and outputs the resultant symbols to the second Walsh correlation calculator 1016. The second adder 1008 adds the 32 higher symbols and the mask sequence M2 from the mask generator 1004 by modulo-2 addition and outputs the resultant symbols to the third Walsh correlation calculator 1018. The third adder 1010 adds the 32 higher symbols and the mask sequence M3 from the mask generator 1004 by modulo-2 addition and outputs the resultant symbols to the fourth Walsh correlation calculator 1020. As noted from the above, the decoder comprises as many adders 1006 to 1010 as mask sequences, and each of the adders 1006 to 1010 generates unmasked symbols by adding the 32 higher symbols and the corresponding mask sequence by modulo-2 addition, and then outputs the unmasked symbols to the corresponding Walsh correlation calculators 1016 to 1020.

If the 32 higher symbols have been encoded by the combination of the basis mask sequences, one of the outputs of the adders 1006 to 1010 is expected to be a signal from which the mask sequence has been removed. For example, if the information bits have been encoded by using the mask sequence M2, the output of the second adder 1008, which is a result of the addition of the M2 and the 32 higher symbols, is expected to be the signal from which the mask sequence has been removed. The signal from which the mask sequence has been removed is a signal encoded by one of the Walsh codes shown in FIGS. 8A and 8B.

The first Walsh correlation calculator 1014 correlates the 32 higher symbols from the demultiplexer 1002 with 64 bi-orthogonal Walsh codes and thereby outputs 64 correlation values to the first summer 1030. The second Walsh correlation calculator 1016 correlates the symbols from the first adder 1006 with the 64 bi-orthogonal Walsh codes and thereby outputs 64 correlation values to the second summer 1032. The third Walsh correlation calculator 1018 correlates the symbols from the second adder 1008 with the 64 bi-orthogonal Walsh codes and thereby outputs 64 correlation values to the third summer 1034. The fourth Walsh correlation calculator 1020 correlates the symbols from the third adder 1010 with the 64 bi-orthogonal Walsh codes and thereby outputs 64 correlation values to the fourth summer 1036. In this manner, each of the Walsh correlation calculators 1014 to 1020 correlates 32 input symbols with 64 bi-orthogonal Walsh codes and thereby outputs 64 correlation values to the corresponding summers 1030 to 1036. The Walsh correlation calculators 1014 to 1020 preferably use IFHT in order to achieve rapid calculation of correlation with the 64 Walsh codes.

The eight lower symbols divided by the demultiplexer 1002 are input to the correlation calculators 1022, 1024, 1026, and 1028. The [8, 2] first order Reed Muller code generator 1012 generates first order Reed Muller codewords R0, R1, R2 and R3 and outputs them to the correlation calculators 1022 to 1028. The four codewords R0, R1, R2 and R3 are codewords of the [8, 2] first order Reed Muller code used in the channel encoder, which are generated by sequentially arranging four codewords formed through a linear combination of the two codewords of Table 8. That is, R0=[00000000], R1=[01010101], R2=[00110011], and R3=[01100110].

The first correlation calculator 1022 calculates the correlation value of the first order Reed Muller code R0 and the eight lower symbols from the demultiplexer 1002 and outputs the calculated correlation value to the first summer 1030. The second correlation calculator 1024 calculates the correlation value of the first order Reed Muller code R1 and the eight lower symbols and outputs the calculated correlation value to the second summer 1032. The third correlation calculator 1026 calculates the correlation value of the first order Reed Muller code R2 and the eight lower symbols and outputs the calculated correlation value to the third summer 1034. The fourth correlation calculator 1028 calculates the correlation value of the first order Reed Muller code R3 and the eight lower symbols and outputs the calculated correlation value to the fourth summer 1036. The decoder comprises as many correlation calculators 1022 to 1028 as codewords of the [8, 2] first order Reed Muller code, and each of the correlation calculators 1022 to 1028 correlates the eight input lower symbols and the corresponding first order Reed Muller codeword, and thereby outputs the correlation value to the corresponding summers 1030 to 1036. The correlation calculators 1022 to 1028 preferably use IFHT in order to achieve rapid calculation of correlation with the first order Reed Muller codewords R0, R1, R2 and R3.

The first summer 1030 adds the correlation value from the first correlation calculator 1022 to each of the 64 correlation values from the first Walsh correlation calculator 1014 and thereby outputs 64 added correlation values to the correlation comparator 1038. The second summer 1032 adds the correlation value from the second correlation calculator 1024 to each of the 64 correlation values from the second Walsh correlation calculator 1016 and thereby outputs 64 added correlation values to the correlation comparator 1038. The third summer 1034 adds the correlation value from the third correlation calculator 1026 to each of the 64 correlation values from the third Walsh correlation calculator 1018 and thereby outputs 64 added correlation values to the correlation comparator 1038. The fourth summer 1036 adds the correlation value from the fourth correlation calculator 1028 to each of the 64 correlation values from the fourth Walsh correlation calculator 1020 and thereby outputs 64 added correlation values to the correlation comparator 1038. As a result, a total of 256 correlation values generated by the summers 1030 to 1036 are input to the correlation comparator 1038.

The correlation comparator 1038 compares the 256 correlation values input from the summers 1030 to 1036 and determines the maximum correlation value from among the 256 correlation values. When the maximum correlation value has been determined, the correlation comparator 1038 determines and outputs eight decoded information bits 1040 based on the [8, 2] first order Reed Muller code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M2 and the Walsh code corresponding to the maximum correlation value is W4, the decoded information bits are determined as "(index corresponding to W4)//(index corresponding to M2)".

For example, where the 8 information bits $a_0$ to $a_7$ are '11000001', the channel encoder encodes the E-DCH uplink control information bits into "M2⊚W4//R2" and then transmits the encoded information bits. In the channel decoder, the received signal r(t) 1000 encoded into "M2⊚W4//R2" is divided into an "M2⊚W4" related part and an "R2" related part by the demultiplexer 1002. Then, the "M2⊚W4" related part which includes the 32 higher symbols is added to the all mask sequences by modulo-2 addition, and the added values are correlated with the 64 bi-orthogonal Walsh codes, so that a total of 256 correlation values are generated.

Further, the "R2" related part which includes the eight lower symbols, is correlated with all codewords of the [8, 2] first order Reed Muller code, so that four correlation values are obtained. Then, the four correlation values and the 256 correlation values are summed according to a predetermined rule, so that 256 added correlation values are obtained. Then, it is confirmed that the received signal r(t) has been encoded by M2, W4 and R2, that is, by the Walsh code index, mask sequence index and [8, 2] first order Reed Muller code index corresponding to the maximum value among the 256 added correlation values. Upon confirming that the received signal r(t) has been encoded by M2, W4 and R2, the channel decoder combines '110000' (the index corresponding to the W4) and '01' (the index corresponding to the M2), thereby outputting '11000001' as the decoded information bits.

From among the scheduling information, the quantity of data accumulated in the buffer of the UE can be reported through the upper layer signaling in consideration of the signaling overhead, and the extra power transmissible by the UE can be calculated by the node B by taking the transmission power information and the power class of the UE into consideration. Therefore, the scheduling information actually transmitted through the physical channel may comprise only the transmission power information of the UE. In consideration of the range of the transmission power which can be transmitted by the UE, the size of the transmission power information of the UE requires about 7 bits.

The [32, 7] code, [32, 6] code and [32, 5] code can be used in order to encode information of 7 bits or less, such as the scheduling information. The [32, 7] code is substantially as shown in Table 10. The [32, 6] code can be implemented by Table 13, which is obtained by deleting one mask basis sequence from the code shown in Table 10. The [32, 5] code can be implemented by Table 15, which is obtained by deleting two mask basis sequences and the lowermost Walsh basis sequence from the code shown in Table 10. The [32, 7] code, [32, 6] code and [32, 5] code can be derived from the following description of embodiments of the present invention.

Also, the [40, 7] code, [40, 6] code, [40, 5] code, and [20, 5] Channel Quality Indication (CQI) code can be used instead of the [32, N] code, in order to encode scheduling information of 7 bits or less. The [40, 7] code, [40, 6] code, [40, 5] code, and [20, 5] CQI code are discussed in greater detail in the following description of embodiments of the present invention. In deleting the basis sequences in order to generate a code for smaller information bits, the mask basis sequences are first deleted and the Walsh basis sequences of higher numbers are then deleted from the lowermost sequence, as described above.

Exemplary [40, 7] Code in Accordance with an Embodiment of the Present Invention Hereinafter, a method for designing a [40, 7] code having a minimum distance of 12 will be described.

TABLE 10

```
0 0 1 0 1 0 0 0 0 1 1 0 0 0 1 1 1 1 1 1 0 0 0 0 0 1 1 1 0 1 1 1
0 1 0 1 0 1 0 1 0 1 0 1 0 1 0 1 0 1 0 1 0 1 0 1 0 1 0 1 0 1 0 1
0 0 1 1 0 0 1 1 0 0 1 1 0 0 1 1 0 0 1 1 0 0 1 1 0 0 1 1 0 0 1 1
0 0 0 0 1 1 1 1 0 0 0 0 1 1 1 1 0 0 0 0 1 1 1 1 0 0 0 0 1 1 1 1
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
1 1 1 1 1 1 1 1 1 1 1 1 1 1 1 1 1 1 1 1 1 1 1 1 1 1 1 1 1 1 1 1
```

Table 10 shows basis sequences of a [32, 7, 12] code, including 7 basis sequences each having a length of 32. The number '12' in the [32, 7, 12] code implies the minimum length of the basis sequences, and the [32, 7, 12] code is also called a "[32, 7] code". From among the basis sequences in Table 10, the first basis sequence is a mask basis sequence derived from the mask sequences as disclosed in U.S. Pat. No. 6,882,636 of Kim et al. and corresponding to Korean Patent Application No. 1999-27932, the entire disclosure of each being incorporated herein by reference.

It is possible to provide a higher error correcting capability to bits at particular locations of the scheduling information by concatenating the [8, 2] code with the [32, 7, 12] code.

Table 11 below shows basis sequences of a [8, 2] code. The two basis sequences in Table 11 are an example in which an additional error correcting capability of 25% (that is, 2 repeated bits/additional 8 bits*100) is provided to the sixth higher bit of the scheduling information, and an additional error correcting capability of 75% (that is, 6 repeated bits/additional 8 bits*100) is provided to the seventh higher bit of the scheduling information. Therefore, Table 11 may be modified depending on the number of bits to which it is desired to additionally provide the error correcting capability, and depending on the error correcting capability to be additionally provided to each bit. Specifically, if it is necessary to additionally provide the error correcting capability to three higher information bits, an [8, 3] code is used. Specifically, a [40, 7] code generated by concatenating the fifth, sixth and seventh basis sequences of Table 10 with the basis sequences of the [8, 3] code is used. That is, an [8, M] code, wherein M is the number of bits to which it is necessary to additionally provide the error correcting capability, is used as the code to be concatenated with the scheduling information.

TABLE 11

| 1 | 1 | 0 | 0 | 0 | 0 | 0 | 0 |
|---|---|---|---|---|---|---|---|
| 0 | 0 | 1 | 1 | 1 | 1 | 1 | 1 |

Tables 11A through 11K below show examples of other basis sequences for additionally providing the error correcting capability to some bits depending on the locations of the bits and depending on the number of bits to which it is desired to additionally provide the error correcting capability. Specifically, Table 11A shows basis sequences in which an additional error correcting capability of 100% (that is, 8 repeated bits/additional 8 bits*100) is provided only to the seventh higher bit, and Table 11B shows basis sequences in which an additional error correcting capability of 12.5% (that is, 1 bit/additional 8 bits*100) is provided to the sixth higher bit and an additional error correcting capability of 87.5% (that is, 7 repeated bits/additional 8 bits*100) is provided to the seventh higher bit. Table 11C shows basis sequences in which an additional error correcting capability of 37.5% (that is, 3 repeated bits/additional 8 bits*100) is provided to the sixth higher bit and an additional error correcting capability of 62.5% (that is, 5 repeated bits/additional 8 bits*100) is provided to the seventh higher bit. Table 11D shows basis sequences in which an additional error correcting capability of 50% (that is, 4 repeated bits/additional 8 bits*100) is provided to the sixth higher bit and an additional error correcting capability of 50% (that is, 4 repeated bits/additional 8 bits*100) is provided to the seventh higher bit. Table 11E shows basis sequences in which an additional error correcting capability of 12.5% (that is, 1 bit/additional 8 bits*100) is provided to the fifth higher bit, an additional error correcting capability of 12.5% (that is, 1 bit/additional 8 bits*100) is provided to the sixth higher bit, and an additional error correcting capability of 75% (that is, 6 repeated bits/additional 8 bits*100) is provided to the seventh higher bit. Table 11F shows basis sequences in which an additional error correcting capability of 12.5% (that is, 1 bit/additional 8 bits*100) is provided to the fifth higher bit, an additional error correcting capability of 25% (that is, 2 repeated bits/additional 8 bits*100) is provided to the sixth higher bit, and an additional error correcting capability of 62.5% (that is, 5 repeated bits/additional 8 bits*100) is provided to the seventh higher bit. Table 11G shows basis sequences in which an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, an additional error correcting capability of 12.5% (that is, 1 bit/additional 8 bits*100) is provided to the sixth higher bit, and an additional error correcting capability of 62.5% (that is, 5 repeated bits/additional 8 bits*100) is provided to the seventh higher bit. Table 11H shows basis sequences in which an additional error correcting capability of 12.5% (that is, 1 bit/additional 8 bits*100) is provided to the fifth higher bit, an additional error correcting capability of 37.5% (that is, 3 repeated bits/additional 8 bits*100) is provided to the sixth higher bit, and an additional error correcting capability of 50% (that is, 4 repeated bits/additional 8 bits*100) is provided to the seventh higher bit. Table 11 shows basis sequences in which an additional error correcting capability of 25% (that is, 2 repeated bits/additional 8 bits*100) is provided to the fifth higher bit, an additional error correcting capability of 25% (that is, 2 repeated bits/additional 8 bits*100) is provided to the sixth higher bit, and an additional error correcting capability of 50% (that is, 4 repeated bits/additional 8 bits*100) is provided to the seventh higher bit. Table 11J shows basis sequences in which an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, an additional error correcting capability of 25% (that is, 2 repeated bits/additional 8 bits*100) is provided to the sixth higher bit, and an additional error correcting capability of 50% (that is, 4 repeated bits/additional 8 bits*100) is provided to the seventh higher bit. Table 11K shows basis sequences in which an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, an additional error correcting capability of 12.5% (that is, 1 bit/additional 8 bits*100) is provided to the sixth higher bit, and an additional error correcting capability of 50% (that is, 4 repeated bits/additional 8 bits*100) is provided to the seventh higher bit.

TABLE 11A

| | | | | | | | |
|---|---|---|---|---|---|---|---|
| 0 | 0 | 0 | 0 | 0 | 0 | 0 | 0 |
| 1 | 1 | 1 | 1 | 1 | 1 | 1 | 1 |

TABLE 11B

| | | | | | | | |
|---|---|---|---|---|---|---|---|
| 1 | 0 | 0 | 0 | 0 | 0 | 0 | 0 |
| 0 | 1 | 1 | 1 | 1 | 1 | 1 | 1 |

TABLE 11C

| | | | | | | | |
|---|---|---|---|---|---|---|---|
| 1 | 1 | 1 | 0 | 0 | 0 | 0 | 0 |
| 0 | 0 | 0 | 1 | 1 | 1 | 1 | 1 |

TABLE 11D

| | | | | | | | |
|---|---|---|---|---|---|---|---|
| 1 | 1 | 1 | 1 | 0 | 0 | 0 | 0 |
| 0 | 0 | 0 | 0 | 1 | 1 | 1 | 1 |

TABLE 11E

| | | | | | | | |
|---|---|---|---|---|---|---|---|
| 1 | 0 | 0 | 0 | 0 | 0 | 0 | 0 |
| 0 | 1 | 0 | 0 | 0 | 0 | 0 | 0 |
| 0 | 0 | 1 | 1 | 1 | 1 | 1 | 1 |

TABLE 11F

| | | | | | | | |
|---|---|---|---|---|---|---|---|
| 1 | 0 | 0 | 0 | 0 | 0 | 0 | 0 |
| 0 | 1 | 1 | 0 | 0 | 0 | 0 | 0 |
| 0 | 0 | 0 | 1 | 1 | 1 | 1 | 1 |

TABLE 11G

| | | | | | | | |
|---|---|---|---|---|---|---|---|
| 1 | 0 | 0 | 0 | 0 | 0 | 0 | 0 |
| 0 | 1 | 0 | 0 | 0 | 0 | 0 | 0 |
| 0 | 0 | 1 | 0 | 0 | 0 | 0 | 0 |
| 0 | 0 | 0 | 1 | 1 | 1 | 1 | 1 |

TABLE 11H

| | | | | | | | |
|---|---|---|---|---|---|---|---|
| 1 | 0 | 0 | 0 | 0 | 0 | 0 | 0 |
| 0 | 1 | 1 | 1 | 0 | 0 | 0 | 0 |
| 0 | 0 | 0 | 0 | 1 | 1 | 1 | 1 |

TABLE 11I

| 1 | 1 | 0 | 0 | 0 | 0 | 0 | 0 |
|---|---|---|---|---|---|---|---|
| 0 | 0 | 1 | 1 | 0 | 0 | 0 | 0 |
| 0 | 0 | 0 | 0 | 1 | 1 | 1 | 1 |

TABLE 11J

| 1 | 0 | 0 | 0 | 0 | 0 | 0 | 0 |
|---|---|---|---|---|---|---|---|
| 0 | 1 | 0 | 0 | 0 | 0 | 0 | 0 |
| 0 | 0 | 1 | 1 | 0 | 0 | 0 | 0 |
| 0 | 0 | 0 | 0 | 1 | 1 | 1 | 1 |

TABLE 11K

| 1 | 0 | 0 | 0 | 0 | 0 | 0 | 0 |
|---|---|---|---|---|---|---|---|
| 0 | 1 | 0 | 0 | 0 | 0 | 0 | 0 |
| 0 | 0 | 1 | 0 | 0 | 0 | 0 | 0 |
| 0 | 0 | 0 | 1 | 0 | 0 | 0 | 0 |
| 0 | 0 | 0 | 0 | 1 | 1 | 1 | 1 |

Table 12 below illustrates the [40, 7] code which has a minimum distance of 12 and is generated by concatenating the code of Table 10 with the [8, 2] code of Table 11, in which an additional error correcting capability of 25% (that is, 2 repeated bits/additional 8 bits*100) is provided to the sixth higher bit and an additional error correcting capability of 75% (that is, 6 repeated bits/additional 8 bits*100) is provided to the seventh higher bit. Further, by concatenating the code of Table 10 with each of the codes of Tables 11A through 11K, it is possible to generate another [40, 7] code having an additional error correcting capability depending on the number of bits to which it is desired to additionally provide the error correcting capability, and depending on the error correcting capability to be additionally provided to each bit.

TABLE 12

```
0 0 1 0 1 0 0 0 0 1 1 0 0 0 1 1 1 1 1 1 0 0 0 0 0 1 1 1 0 1 1 1 0 0 0 0 0 0 0 0
0 1 0 1 0 1 0 1 0 1 0 1 0 1 0 1 0 1 0 1 0 1 0 1 0 1 0 1 0 1 0 1 0 0 0 0 0 0 0 0
0 0 1 1 0 0 1 1 0 0 1 1 0 0 1 1 0 0 1 1 0 0 1 1 0 0 1 1 0 0 1 1 0 0 0 0 0 0 0 0
0 0 0 0 1 1 1 1 0 0 0 0 1 1 1 1 0 0 0 0 1 1 1 1 0 0 0 0 1 1 1 1 0 0 0 0 0 0 0 0
0 0 0 0 0 0 0 0 1 1 1 1 1 1 1 1 0 0 0 0 0 0 0 0 1 1 1 1 1 1 1 1 0 0 0 0 0 0 0 0
0 0 0 0 0 0 0 0 0 0 0 0 0 0 0 0 1 1 1 1 1 1 1 1 1 1 1 1 1 1 1 1 0 0 0 0 0 0 0 0
1 1 1 1 1 1 1 1 1 1 1 1 1 1 1 1 1 1 1 1 1 1 1 1 1 1 1 1 1 1 1 1 0 0 1 1 1 1 1 1
```

Exemplary [40, 6] Code in Accordance with an Embodiment of the Present Invention Hereinafter, a method for designing a [40, 6] code having a minimum distance of 16 will be described.

First, a [32, 6] code is generated by eliminating '00101000011000111111000001110111', which is the first basis sequence, from the [32, 7] code shown in Table 10. Then, a [40, 6] code can be generated by concatenating the [32, 6] code with the [8, 2] code of Table 11. By this method, it is possible to provide a higher error correcting capability to the sixth and fifth higher bits of the scheduling information, which are the most significant and the next most significant bits. The basis sequences in Table 11 are an example in which an additional error correcting capability of 25% (that is, 2 repeated bits/additional 8 bits*100) is provided to the fifth higher bit of the scheduling information and an additional error correcting capability of 75% (that is, 6 repeated bits/additional 8 bits*100) is provided to the sixth higher bit of the scheduling information. Therefore, Table 11 may have another configuration depending on the number of bits to which it is desired to additionally provide the error correcting capability, and depending on the error correcting capability to be additionally provided to each bit.

Similar to the above description, Table 11A shows basis sequences in which an additional error correcting capability of 100% (that is, 8 repeated bits/additional 8 bits*100) is provided only to the sixth higher bit. Table 11B shows basis sequences in which an additional error correcting capability of 12.5% (that is, 1 bit/additional 8 bits*100) is provided to the fifth higher bit and an additional error correcting capability of 87.5% (that is, 7 repeated bits/additional 8 bits*100) is provided to the sixth higher bit. Table 11C shows basis sequences in which an additional error correcting capability of 37.5% (that is, 3 repeated bits/additional 8 bits*100) is provided to the fifth higher bit and an additional error correcting capability of 62.5% (that is, 5 repeated bits/additional 8 bits*100) is provided to the sixth higher bit. Table 11D shows basis sequences in which an additional error correcting capability of 50% (that is, 4 repeated bits/additional 8 bits*100) is provided to the fifth higher bit and an additional error correcting capability of 50% (that is, 4 repeated bits/additional 8 bits*100) is provided to the sixth higher bit. Table 11E shows basis sequences in which an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, and an additional error correcting capability of 75% (that is, 6 repeated bits/additional 8 bits*100) is provided to the sixth higher bit. Table 11F shows basis sequences in which an additional error correcting capability of 12.5% (that is, 1 bit/additional 8 bits*100) is provided to the fourth higher bit, an additional error correcting capability of 25% (that is, 2 repeated bits/additional 8 bits*100) is provided to the fifth higher bit, and an additional error correcting capability of 62.5% (that is, 5 repeated bits/additional 8 bits*100) is provided to the sixth higher bit. Table 11G shows basis sequences in which an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, and an additional error correcting capability of 62.5% (that is, 5 repeated bits/additional 8 bits*100) is provided to the sixth higher bit. Table 11H shows basis sequences in which an additional error correcting capability of 12.5% (that is, 1 bit/additional 8 bits*100) is provided to the fourth higher bit, an additional error correcting capability of 37.5% (that is, 3 repeated bits/additional 8 bits*100) is provided to the fifth higher bit, and an additional error correcting capability of 50% (that is, 4 repeated bits/additional 8 bits*100) is provided to the sixth higher bit. Table 11I shows basis sequences in which an additional error correcting capability of 25% (that is, 2 repeated bits/additional 8 bits*100) is provided to the fourth higher bit, an additional error correcting capability of 25% (that is, 2 repeated bits/additional 8 bits*100) is provided to the fifth higher bit, and an additional error correcting capability of 50% (that is, 4 repeated bits/additional 8 bits*100) is provided to the sixth higher bit. Table 11J shows basis sequences in which an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, an additional error correcting capability of 25% (that is, 2 repeated bits/additional 8 bits*100) is provided to the fifth higher bit, and an additional error correcting capability of 50% (that is, 4 repeated bits/additional 8 bits*100) is provided to the sixth higher bit. Table 11K shows basis sequences in which an additional error correcting capability of 12.5% (that is, 1 bit/additional 8 bits*100) is provided to the second higher bit, an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, an additional error correcting capability of 12.5% (that is, 1 bit/additional 8 bits*100) is provided to the fifth higher bit, and an additional error correcting capability of 50% (that is, 4 repeated bits/additional 8 bits*100) is provided to the sixth higher bit.

Table 13 below shows the [32, 6] code generated by eliminating '00101000011000111110000011101111', which is the first basis sequence, from the [32, 7] code shown in Table 10. Table 14 below illustrates the [40, 6] code which has a minimum distance of 16 and is generated by concatenating the code of Table 11 with the code of Table 13, in which an additional error correcting capability of 25% (that is, 2 repeated bits/additional 8 bits*100) is provided to the fifth higher bit and an additional error correcting capability of 75% (that is, 6 repeated bits/additional 8 bits*100) is provided to the sixth higher bit. Further, by concatenating the code of Table 13 with each of the codes of Tables 11A through 11K, it is possible to generate another [40, 6] code having an additional error correcting capability depending on the number of bits to which it is desired to additionally provide the error correcting capability, and depending on the error correcting capability to be additionally provided to each bit.

TABLE 13

```
0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1

0 0 0 0 0 0 0 0 0 0 0 0 0 0 0 0 1 1 1 1 1 1 1 1 1 1 1 1 1 1 1 1

1 1 1 1 1 1 1 1 1 1 1 1 1 1 1 1 1 1 1 1 1 1 1 1 1 1 1 1 1 1 1 1
```

TABLE 14

```
0 1 0 1 0 1 0 1 0 1 0 1 0 1 0 1 0 1 0 1 0 1 0 1 0 1 0 1 0 1 0 1 0 0 0 0 0 0 0 0

0 0 1 1 0 0 1 1 0 0 1 1 0 0 1 1 0 0 1 1 0 0 1 1 0 0 1 1 0 0 1 1 0 0 0 0 0 0 0 0

0 0 0 0 1 1 1 1 0 0 0 0 1 1 1 1 0 0 0 0 1 1 1 1 0 0 0 0 1 1 1 1 0 0 0 0 0 0 0 0

0 0 0 0 0 0 0 0 1 1 1 1 1 1 1 1 0 0 0 0 0 0 0 0 1 1 1 1 1 1 1 1 0 0 0 0 0 0 0 0

0 0 0 0 0 0 0 0 0 0 0 0 0 0 0 0 1 1 1 1 1 1 1 1 1 1 1 1 1 1 1 1 0 0 0 0 0 0 0 0

1 1 1 1 1 1 1 1 1 1 1 1 1 1 1 1 1 1 1 1 1 1 1 1 1 1 1 1 1 1 1 1 0 0 1 1 1 1 1 1
```

Exemplary [40, 5] Code in Accordance with an Embodiment of the Present Invention Hereinafter, a method for designing a [40, 5] code having a minimum distance of 16 will be described.

First, a [32, 5] code is generated by eliminating '11111111111111111111111111111111', which is the sixth basis sequence, from the [32, 6] code shown in Table 13. Then, a [40, 5] code can be generated by concatenating the [32, 5] code with the [8, 2] code of Table 11. By this method, it is possible to provide a higher error correcting capability to the fifth and fourth higher bits of the scheduling information, which are the most significant and the next most significant bits. The basis sequences in Table 11 are an example in which an additional error correcting capability of 25% (that is, 2 repeated bits/additional 8 bits*100) is provided to the fourth higher bit of the scheduling information and an additional error correcting capability of 75% (that is, 6 repeated bits/additional 8 bits*100) is provided to the fifth higher bit of the scheduling information. Therefore, Table 11 may have another configuration depending on the number of bits to which it is desired to additionally provide the error correcting capability, and depending on the error correcting capability to be additionally provided to each bit.

Similarly to the above description, Table 11A shows basis sequences in which an additional error correcting capability of 100% (that is, 8 repeated bits/additional 8 bits*100) is provided only to the fifth higher bit. Table 11B shows basis sequences in which an additional error correcting capability of 12.5% (that is, 1 bit/additional 8 bits*100) is provided to the fourth higher bit and an additional error correcting capability of 87.5% (that is, 7 repeated bits/additional 8 bits*100) is provided to the fifth higher bit. Table 11C shows basis sequences in which an additional error correcting capability of 37.5% (that is, 3 repeated bits/additional 8 bits*100) is provided to the fourth higher bit and an additional error correcting capability of 62.5% (that is, 5 repeated bits/additional 8 bits*100) is provided to the fifth higher bit. Table 11D shows basis sequences in which an additional error correcting capability of 50% (that is, 4 repeated bits/additional 8 bits*100) is provided to the fourth higher bit and an additional error correcting capability of 50% (that is, 4 repeated bits/additional 8 bits*100) is provided to the fifth higher bit. Table 11E shows basis sequences in which an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, and an additional error correcting capability of 75% (that is, 6 repeated bits/additional 8 bits*100) is provided to the fifth higher bit. Table 11F shows basis sequences in which an additional error correcting capability of 12.5% (that is, 1 bit/additional 8 bits*100) is provided to the third higher bit, an additional error correcting capability of 25% (that is, 2 repeated bits/additional 8 bits*100) is provided to the fourth higher bit, and an additional error correcting capability of 62.5% (that is, 5 repeated bits/additional 8 bits*100) is provided to the fifth higher bit. Table 11G shows basis sequences in which an additional error correcting capability of 12.5% (that is, 1 bit/additional 8 bits*100) is provided to the second higher bit, an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, and an additional error correcting capability of 62.5% (that is, 5 repeated bits/additional 8 bits*100) is provided to the fifth higher bit. Table 11H shows basis sequences in which an additional error correcting capability of 12.5% (that is, 1 bit/additional 8 bits*100) is provided to the third higher bit, an additional error correcting capability of 37.5% (that is, 3 repeated bits/additional 8 bits*100) is provided to the fourth higher bit, and an additional error correcting capability of 50% (that is, 4 repeated bits/additional 8 bits*100) is provided to the fifth higher bit. Table 11I shows basis sequences in which an additional error correcting capability of 25% (that is, 2 repeated bits/additional 8 bits*100) is provided to the third higher bit, an additional error correcting capability of 25% (that is, 2 repeated bits/additional 8 bits*100) is provided to the fourth higher bit, and an additional error correcting capability of 50% (that is, 4 repeated bits/additional 8 bits*100) is provided to the fifth higher bit. Table 11J shows basis sequences in which an additional error correcting capability of 12.5% (that is, 1 bit/additional 8 bits*100) is provided to the second higher bit, an additional error correcting capability of 12.5% (that is, 1 bit/additional 8 bits*100) is provided to the third higher bit, an additional error correcting capability of 25% (that is, 2 repeated bits/additional 8 bits*100) is provided to the fourth higher bit, and an additional error correcting capability of 50% (that is, 4 repeated bits/additional 8 bits*100) is provided to the fifth higher bit. Table 11K shows basis sequences in which an additional error correcting capability of 12.5% (that is, 1 bit/additional 8 bits*100) is provided to the first higher bit, an additional error correcting capability of 12.5% (that is, 1 bit/additional 8 bits*100) is provided to the second higher bit, an additional error correcting capability of 12.5% (that is, 1 bit/additional 8 bits*100) is provided to the third higher bit, an additional error correcting capability of 12.5% (that is, 1 bit/additional 8 bits*100) is provided to the fourth higher bit, and an additional error correcting capability of 50% (that is, 4 repeated bits/additional 8 bits*100) is provided to the fifth higher bit.

Table 15 below shows the [32, 5] code generated by eliminating '11111111111111111111111111111111', which is the first basis sequence, from the [32, 7] code shown in Table 13. Table 16 below illustrates the [40, 5] code which has a minimum distance of 16 and is generated by concatenating the code of Table 11 with the code of Table 15 in which an additional error correcting capability of 25% (that is, 2 repeated bits/additional 8 bits*100) is provided to the fourth higher bit and an additional error correcting capability of 75% (that is, 6 repeated bits/additional 8 bits*100) is provided to the fifth higher bit. Further, by concatenating the code of Table 15 with each of the codes of Tables 11A through 11K, it is possible to generate another [40, 5] code having an additional error correcting capability depending on the number of bits to which it is desired to additionally provide the error correcting capability, and depending on the error correcting capability to be additionally provided to each bit.

TABLE 15

```
0 1 0 1 0 1 0 1 0 1 0 1 0 1 0 1 0 1 0 1 0 1 0 1 0 1 0 1 0 1 0 1
0 0 1 1 0 0 1 1 0 0 1 1 0 0 1 1 0 0 1 1 0 0 1 1 0 0 1 1 0 0 1 1
0 0 0 0 1 1 1 1 0 0 0 0 1 1 1 1 0 0 0 0 1 1 1 1 0 0 0 0 1 1 1 1
0 0 0 0 0 0 0 0 1 1 1 1 1 1 1 1 0 0 0 0 0 0 0 0 1 1 1 1 1 1 1 1
0 0 0 0 0 0 0 0 0 0 0 0 0 0 0 0 1 1 1 1 1 1 1 1 1 1 1 1 1 1 1 1
```

TABLE 16

```
0 1 0 1 0 1 0 1 0 1 0 1 0 1 0 1 0 1 0 1 0 1 0 1 0 1 0 1 0 0 0 0 0 0 0 0
0 0 1 1 0 0 1 1 0 0 1 1 0 0 1 1 0 0 1 1 0 0 1 1 0 0 1 1 0 0 1 1 0 0 0 0 0 0 0 0
0 0 0 0 1 1 1 1 0 0 0 0 1 1 1 1 0 0 0 0 1 1 1 1 0 0 0 0 1 1 1 1 0 0 0 0 0 0 0 0
0 0 0 0 0 0 0 0 1 1 1 1 1 1 1 1 0 0 0 0 0 0 0 0 1 1 1 1 1 1 1 1 0 0 0 0 0 0 0 0
0 0 0 0 0 0 0 0 0 0 0 0 0 0 0 0 1 1 1 1 1 1 1 1 1 1 1 1 1 1 1 1 0 0 1 1 1 1 1 1
```

Due to the characteristics of the linear error correcting code, the code including the basis sequences thereof having been subjected to the column transposition (i.e. columns of the code have exchanged their locations) operates the same as the code including the basis sequences having not been subjected to the column transposition. Therefore, a code including basis sequences obtained through column transposition of the basis sequences in each of the [40, 7] code shown in Table 12, the [40, 6] code shown in Table 14 and the [40, 5] code shown in Table 16, operates as the same code as the original code before the column transposition. Also, a code including basis sequences obtained through column transposition of the basis sequences generated by concatenating one of Tables 11 through 11K with the basis sequences in each of the [32, 7] code shown in Table 10, the [32, 6] code shown in Table 13 and the [32, 5] code shown in Table 15, operates as the same code as the original code before the column transposition.

Exemplary [20, 5] CQI Code in Accordance with an Embodiment of the Present Invention When the scheduling information has a size of 5 bits, a [20, 5] CQI code for encoding the CQI of the High Speed Downlink Packet Access (HSDPA) defined in a 3GPP standard TS25.212 may be used. Table 17 below shows basis sequences of the [20, 5] code defined in the 3GPP standard.

TABLE 17

| i | $M_{i,0}$ | $M_{i,1}$ | $M_{i,2}$ | $M_{i,3}$ | $M_{i,4}$ |
|---|---|---|---|---|---|
| 0 | 1 | 0 | 0 | 0 | 1 |
| 1 | 0 | 1 | 0 | 0 | 1 |
| 2 | 1 | 1 | 0 | 0 | 1 |
| 3 | 0 | 0 | 1 | 0 | 1 |
| 4 | 1 | 0 | 1 | 0 | 1 |
| 5 | 0 | 1 | 1 | 0 | 1 |
| 6 | 1 | 1 | 1 | 0 | 1 |
| 7 | 0 | 0 | 0 | 1 | 1 |
| 8 | 1 | 0 | 0 | 1 | 1 |
| 9 | 0 | 1 | 0 | 1 | 1 |
| 10 | 1 | 1 | 0 | 1 | 1 |
| 11 | 0 | 0 | 1 | 1 | 1 |
| 12 | 1 | 0 | 1 | 1 | 1 |
| 13 | 0 | 1 | 1 | 1 | 1 |
| 14 | 1 | 1 | 1 | 1 | 1 |

TABLE 17-continued

| i | $M_{i,0}$ | $M_{i,1}$ | $M_{i,2}$ | $M_{i,3}$ | $M_{i,4}$ |
|---|---|---|---|---|---|
| 15 | 0 | 0 | 0 | 0 | 1 |
| 16 | 0 | 0 | 0 | 0 | 1 |
| 17 | 0 | 0 | 0 | 0 | 1 |
| 18 | 0 | 0 | 0 | 0 | 1 |
| 19 | 0 | 0 | 0 | 0 | 1 |

By linear combinations of five basis sequences each having a length of 5 as illustrated in Table 17, it is possible to apply [20, 5] channel encoding by using Equation (2) below:

$$b_i = \sum_{n=0}^{4} (a_n \times M_{i,n}) \bmod 2, \quad i = 0, 1, \ldots, 19 \qquad (2)$$

In Equation (2), $a_n$ denotes the (n+1)-th information bit to be encoded, wherein $a_0$ is the Least Significant Bit (LSB) and $a_4$ is the Most Significant Bit (MSB). Also, $b_i$ denotes the (i+1)-th output bit obtained by channel-encoding an information bit (that is, $b_i$ denotes an encoded bit). Therefore, 20 encoded bits can be generated from five bits of input information.

Hereinafter, a method for designing the [30, 10] code, [30, 9] code and [30, 8] code for encoding uplink control information of 10 bits or less will be described.

Exemplary [30, 10] Code in Accordance with an Embodiment of the Present Invention The 3GPP standard TS25.212 defines a [30, 10] code including basis sequences as shown in Table 18 below in order to encode a Transport Format Combination Indicator (TFCI) of 10 bits. Therefore, when the E-DCH uplink control information has a size of 10 bits, it cannot use the [30, 10] code. From among the basis sequences as shown in Table 18, the sixth to tenth basis sequences are derived from the mask sequences disclosed in U.S. Pat. No. 6,882,636 referenced above and corresponding to the Korean Patent Application No. 1999-27932. Further, the second and sixth basis sequences are derived from the Walsh codes.

TABLE 18

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |
| 5 | 0 | 1 | 1 | 0 | 0 | 1 | 0 | 0 | 1 | 0 |
| 6 | 1 | 1 | 1 | 0 | 0 | 1 | 0 | 1 | 0 | 0 |
| 7 | 0 | 0 | 0 | 1 | 0 | 1 | 0 | 1 | 1 | 0 |
| 8 | 1 | 0 | 0 | 1 | 0 | 1 | 1 | 1 | 1 | 0 |
| 9 | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 1 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

By linear combinations of 10 basis sequences each having a length of 32 as illustrated in Table 18, it is possible to apply [32, 10] channel encoding by using Equation (3) below.

$$b_i = \sum_{n=0}^{9} (a_n \times M_{i,n}) \bmod 2, \quad i = 0, 1, \ldots, 31 \tag{3}$$

In Equation (3), $a_n$ denotes the (n+1)-th information bit to be encoded, wherein $a_0$ is the Least Significant Bit (LSB) and $a_9$ is the Most Significant Bit (MSB). Also, $b_i$ denotes the (i+1)-th output bit obtained by channel-encoding an input information bit (that is, $b_i$ denotes an encoded bit). Therefore, 32 encoded bits can be generated from 10 bits of input information.

Exemplary [30, 9] Code in Accordance with an Embodiment of the Present Invention When the E-DCH uplink control information has a size of 9 bits, it can be encoded by using a [30, 9] code which is obtained by removing the last basis sequence from the [30, 10] code. Table 19 below shows basis sequences of the [30, 9] code.

TABLE 19

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ |
|---|---|---|---|---|---|---|---|---|---|
| 0 | 1 | 0 | 0 | 0 | 0 | 1 | 0 | 0 | 0 |
| 1 | 0 | 1 | 0 | 0 | 0 | 1 | 1 | 0 | 0 |
| 2 | 1 | 1 | 0 | 0 | 0 | 1 | 0 | 0 | 0 |
| 3 | 0 | 0 | 1 | 0 | 0 | 1 | 1 | 0 | 1 |
| 4 | 1 | 0 | 1 | 0 | 0 | 1 | 0 | 0 | 0 |
| 5 | 0 | 1 | 1 | 0 | 0 | 1 | 0 | 0 | 1 |
| 6 | 1 | 1 | 1 | 0 | 0 | 1 | 0 | 1 | 0 |
| 7 | 0 | 0 | 0 | 1 | 0 | 1 | 0 | 1 | 1 |
| 8 | 1 | 0 | 0 | 1 | 0 | 1 | 1 | 1 | 1 |
| 9 | 0 | 1 | 0 | 1 | 0 | 1 | 1 | 0 | 1 |
| 10 | 1 | 1 | 0 | 1 | 0 | 1 | 0 | 0 | 1 |
| 11 | 0 | 0 | 1 | 1 | 0 | 1 | 0 | 1 | 1 |
| 12 | 1 | 0 | 1 | 1 | 0 | 1 | 0 | 1 | 0 |
| 13 | 0 | 1 | 1 | 1 | 0 | 1 | 1 | 0 | 0 |
| 14 | 1 | 1 | 1 | 1 | 0 | 1 | 1 | 1 | 1 |
| 15 | 1 | 0 | 0 | 0 | 1 | 1 | 1 | 1 | 0 |
| 16 | 0 | 1 | 0 | 0 | 1 | 1 | 1 | 1 | 0 |
| 17 | 1 | 1 | 0 | 0 | 1 | 1 | 1 | 0 | 1 |
| 18 | 0 | 0 | 1 | 0 | 1 | 1 | 0 | 1 | 1 |
| 19 | 1 | 0 | 1 | 0 | 1 | 1 | 0 | 1 | 0 |
| 20 | 0 | 1 | 1 | 0 | 1 | 1 | 0 | 0 | 1 |
| 21 | 1 | 1 | 1 | 0 | 1 | 1 | 0 | 1 | 1 |
| 22 | 0 | 0 | 0 | 1 | 1 | 1 | 0 | 1 | 0 |
| 23 | 1 | 0 | 0 | 1 | 1 | 1 | 1 | 1 | 0 |
| 24 | 0 | 1 | 0 | 1 | 1 | 1 | 1 | 0 | 1 |
| 25 | 1 | 1 | 0 | 1 | 1 | 1 | 1 | 0 | 0 |
| 26 | 0 | 0 | 1 | 1 | 1 | 1 | 0 | 0 | 1 |
| 27 | 1 | 0 | 1 | 1 | 1 | 1 | 1 | 1 | 0 |
| 28 | 0 | 1 | 1 | 1 | 1 | 1 | 1 | 1 | 1 |
| 29 | 1 | 1 | 1 | 1 | 1 | 1 | 1 | 1 | 1 |
| 30 | 0 | 0 | 0 | 0 | 0 | 1 | 0 | 0 | 0 |
| 31 | 0 | 0 | 0 | 0 | 1 | 1 | 1 | 0 | 0 |

By linear combinations of 9 basis sequences each having a length of 32 as illustrated in Table 19, it is possible to apply [32, 9] channel encoding by using Equation (4) below.

$$b_i = \sum_{n=0}^{8} (a_n \times M_{i,n}) \bmod 2, \; i = 0, 1, \ldots, 31 \qquad (4)$$

In Equation (4), $a_n$ denotes the (n+1)-th information bit to be encoded, wherein $a_0$ is the Least Significant Bit (LSB) and $a_8$ is the Most Significant Bit (MSB). Also, $b_i$ denotes the (i+1)-th output bit obtained by channel-encoding an input information bit (that is, $b_i$ denotes an encoded bit). Therefore, 32 encoded bits can be generated from 9 bits of input information.

Exemplary [30, 8] Code in Accordance with an Embodiment of the Present Invention When the E-DCH uplink control information has a size of 8 bits, it can be encoded by using a [30, 8] code which is obtained by removing the last two basis sequences from the [30, 10] code. Table 20 below shows basis sequences of the [30, 8] code.

TABLE 20

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ |
|---|---|---|---|---|---|---|---|---|
| 0 | 1 | 0 | 0 | 0 | 0 | 1 | 0 | 0 |
| 1 | 0 | 1 | 0 | 0 | 0 | 1 | 1 | 0 |
| 2 | 1 | 1 | 0 | 0 | 0 | 1 | 0 | 0 |
| 3 | 0 | 0 | 1 | 0 | 0 | 1 | 1 | 0 |
| 4 | 1 | 0 | 1 | 0 | 0 | 1 | 0 | 0 |
| 5 | 0 | 1 | 1 | 0 | 0 | 1 | 0 | 0 |
| 6 | 1 | 1 | 1 | 0 | 0 | 1 | 0 | 1 |
| 7 | 0 | 0 | 0 | 1 | 0 | 1 | 0 | 1 |
| 8 | 1 | 0 | 0 | 1 | 0 | 1 | 1 | 1 |
| 9 | 0 | 1 | 0 | 1 | 0 | 1 | 1 | 0 |
| 10 | 1 | 1 | 0 | 1 | 0 | 1 | 0 | 0 |
| 11 | 0 | 0 | 1 | 1 | 0 | 1 | 0 | 1 |
| 12 | 1 | 0 | 1 | 1 | 0 | 1 | 0 | 1 |
| 13 | 0 | 1 | 1 | 1 | 0 | 1 | 1 | 0 |
| 14 | 1 | 1 | 1 | 1 | 0 | 1 | 1 | 1 |
| 15 | 1 | 0 | 0 | 0 | 1 | 1 | 1 | 1 |
| 16 | 0 | 1 | 0 | 0 | 1 | 1 | 1 | 1 |
| 17 | 1 | 1 | 0 | 0 | 1 | 1 | 1 | 0 |
| 18 | 0 | 0 | 1 | 0 | 1 | 1 | 0 | 1 |
| 19 | 1 | 0 | 1 | 0 | 1 | 1 | 0 | 1 |
| 20 | 0 | 1 | 1 | 0 | 1 | 1 | 0 | 0 |
| 21 | 1 | 1 | 1 | 0 | 1 | 1 | 0 | 1 |
| 22 | 0 | 0 | 0 | 1 | 1 | 1 | 0 | 1 |
| 23 | 1 | 0 | 0 | 1 | 1 | 1 | 1 | 1 |
| 24 | 0 | 1 | 0 | 1 | 1 | 1 | 1 | 0 |
| 25 | 1 | 1 | 0 | 1 | 1 | 1 | 1 | 0 |
| 26 | 0 | 0 | 1 | 1 | 1 | 1 | 0 | 0 |
| 27 | 1 | 0 | 1 | 1 | 1 | 1 | 1 | 1 |
| 28 | 0 | 1 | 1 | 1 | 1 | 1 | 1 | 1 |
| 29 | 1 | 1 | 1 | 1 | 1 | 1 | 1 | 1 |
| 30 | 0 | 0 | 0 | 0 | 0 | 1 | 0 | 0 |
| 31 | 0 | 0 | 0 | 0 | 1 | 1 | 1 | 0 |

By linear combinations of 8 basis sequences each having a length of 32 as illustrated in Table 20, it is possible to apply [32, 8] channel encoding by using Equation (5) below.

$$b_i = \sum_{n=0}^{7} (a_n \times M_{i,n}) \bmod 2, \; i = 0, 1, \ldots, 31 \qquad (5)$$

In Equation (5), $a_n$ denotes the (n+1)-th information bit to be encoded, wherein $a_0$ is the Least Significant Bit (LSB) and $a_7$ is the Most Significant Bit (MSB). Also, $b_i$ denotes the (i+1)-th output bit obtained by channel-encoding an input information bit (that is, $b_i$ denotes an encoded bit). Therefore, 32 encoded bits can be generated from 8 bits of input information.

The [40, 7] code, [40, 6] code, [40, 5] code, and [20, 5] CQI code as described above are codes for encoding the E-DCH scheduling information of 7 bits or less. By using one of Tables 11A through 11K instead of Table 11 for codes for the encoding, it is possible to provide higher error correcting capability to a particular bit or bits, and adjustably provide additional error correcting capability to each bit. The [20, 5] CQI code is obtained by using the CQI encoding defined in the 3GPP standard.

Further, the [32, 10] code, [32, 9] code and [32, 8] code as described above are codes for encoding the E-DCH scheduling information of 10 bits or less, and are obtained by reusing the TFCI encoding defined in the 3GPP standard.

Hereinafter, a frame structure of the E-DPCCH, which is an E-DCH physical control channel for transmitting E-DCH uplink control information and E-DCH scheduling information, will be described in greater detail with reference to FIG. 11.

As described above, the E-DCH takes a 2 ms Transmission Time Interval (TTI) into account. One radio frame 1102 of 10 ms includes five E-DPCCH sub-frames 1104 of 2 ms, each of which includes three slots. The sub-frame 1104 carries encoded E-DCH uplink control information and encoded E-DCH scheduling information. The E-DCH uplink control information is information of about 10 bits including E-TFI information and HARQ related information, which is necessary when a receiver of a node B decodes E-DCH packet data, and encoded E-DCH scheduling information is information of about 7 bits necessary when a node B performs scheduling.

According to an embodiment of the present invention, the E-DCH uplink control information is transmitted through the first two slots 1106 in the sub-frame 1104, and the E-DCH scheduling information is transmitted through the third slot 1108 of the sub-frame 1104. Using the frame structure described above, the receiver of the node B obtains information necessary for decoding the E-DCH packet data by decoding the first two slots 1106 of the sub-frame 1104, and obtains information necessary for performing scheduling by decoding the third slot 1108 of the sub-frame 1104.

The number of the physical channel bits which can be included in the sub-frame 1104 is determined according to the spreading factor of the E-DPCCH. The encoded E-DCH uplink control information has a length of 32 bits in accordance with one of the [32, 10] code, [32, 9] code and [32, 8] code, and the 32 bits are repeated according to the encoded blocks 1110 up to the number of bits which can be included in the first two slots of the sub-frame 1104. Further, the encoded E-DCH scheduling information has a length of 40 bits in accordance with one of the [40, 7] code, [40, 6] code and [40, 5] code, and the 40 bits are repeated according to the encoded blocks 1112 up to the number of bits which can be included in the third slot 1108 of the sub-frame 1104. The encoded E-DCH scheduling information has a length of 20 bits in accordance with the [20, 5] CQI code, and the 20 bits are repeated according to the encoded blocks 1112 up to the number of bits which can be included in the third slot 1108 of the sub-frame 1104. Through the repetition operation, time diversity can be obtained, so that the transmission power of the E-DPCCH can be reduced while maintaining the error rate of the E-DPCCH at a constant level.

Table 12 below shows the number of physical channel bits which can be included in each slot, the number of physical channel bits which can be included in each frame, the number of encoded E-DCH uplink control information bits and the number of repetitions thereof, and the number of encoded E-DCH scheduling information bits and the number of repetitions thereof, with respect to the spreading factor of the E-DPCCH.

are multiplied by the input information bits $a_0, a_1, a_2, a_3, a_4, a_5$ and $a_6$, and are then input to the first summer 1222. The first summer 1222 generates an encoded symbol by performing a modulo-2 addition for the seven input values and outputs the generated encoded symbol to the multiplexer 1226. This process is repeated up to '1111111', the thirty second column of Table 10, so that 32 encoded symbols are input to the multiplexer 1226.

TABLE 21

| spreading factor of E-DPCCH | bits/slot | bits/sub-frame | Encoded uplink control information × repetition number | Encoded scheduling information × repetition number | Encoded scheduling information × repetition number |
| --- | --- | --- | --- | --- | --- |
| 32 | 80 | 240 | 32 × 5 | 40 × 2 | 20 × 4 |
| 16 | 160 | 480 | 32 × 10 | 40 × 4 | 20 × 8 |
| 8 | 320 | 960 | 32 × 20 | 40 × 8 | 20 × 16 |

Referring to Table 21, when the E-DPCCH spreading factor is 16, one slot can include 160 physical channel bits (that is, 2560/16) because one slot includes 2560 chips, and one frame can include total 480 physical channel bits. Therefore, the 32 bits of output value generated by encoding the E-DCH uplink control information is repeated 10 times, so that a total of 320 bits are transmitted through the first and second slots of the E-DPCCH sub-frame. Further, the E-DCH scheduling information is encoded into 40 bits or 20 bits. When the E-DCH scheduling information has been encoded into 40 bits, the 40 bits of encoded information is repeated four times, so that a total of 160 bits are transmitted through the third slot of the E-DPCCH sub-frame. When the E-DCH scheduling information has been encoded into 20 bits, the 20 bits of encoded information is repeated eight times, so that a total of 160 bits are transmitted through the third slot of the E-DPCCH sub-frame.

Figure 11:
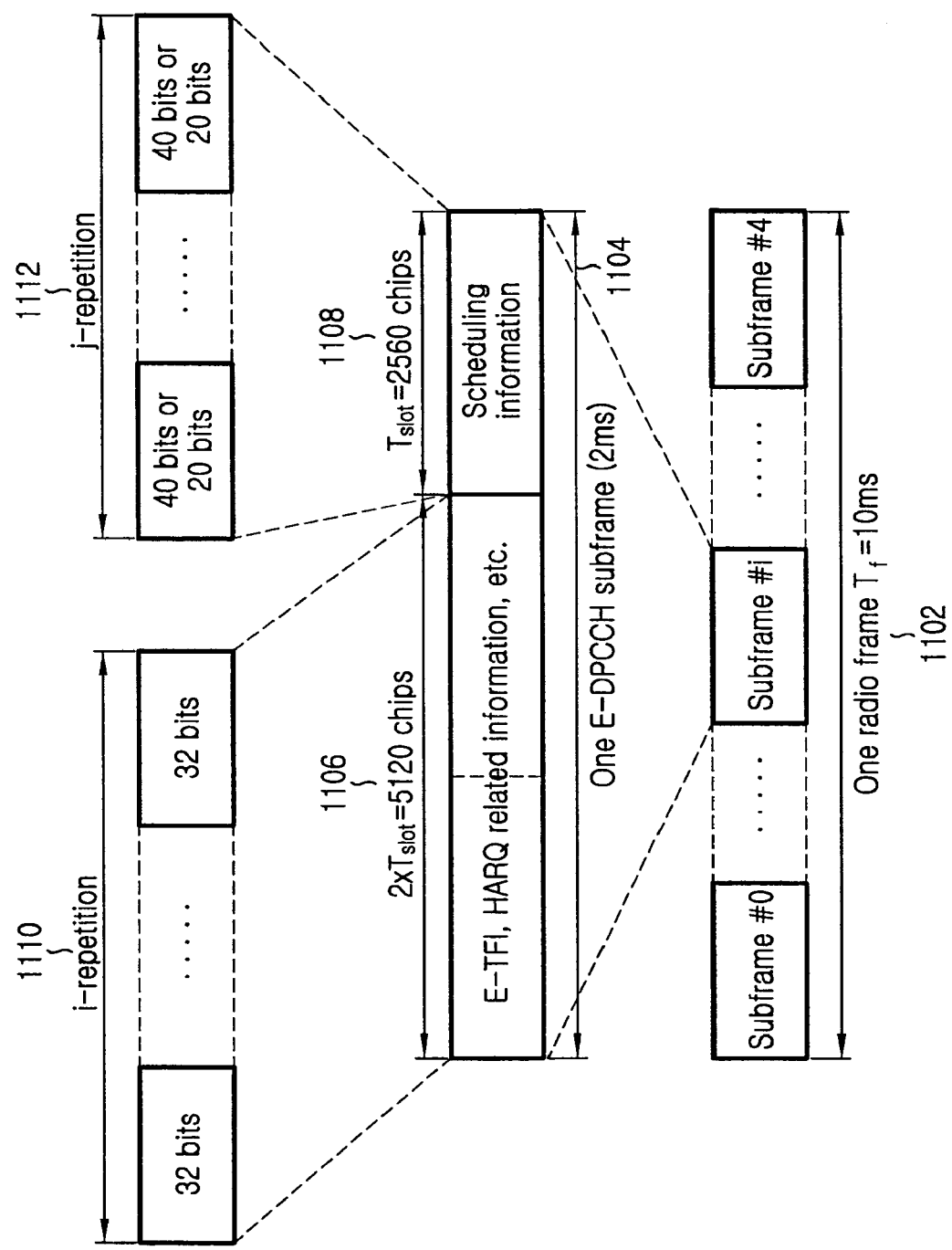
FIG. 11 illustrates a frame structure of the E-DPCCH according to an embodiment of the present invention.

The E-DPCCH frame structure shown in FIG. 11 employs a 2 ms TTI as a basic unit. When the E-DCH TTI has a length of 10 ms, the 2 ms sub-frame structure is repeated five times so that a frame of 10 ms is transmitted.

Figure 12:
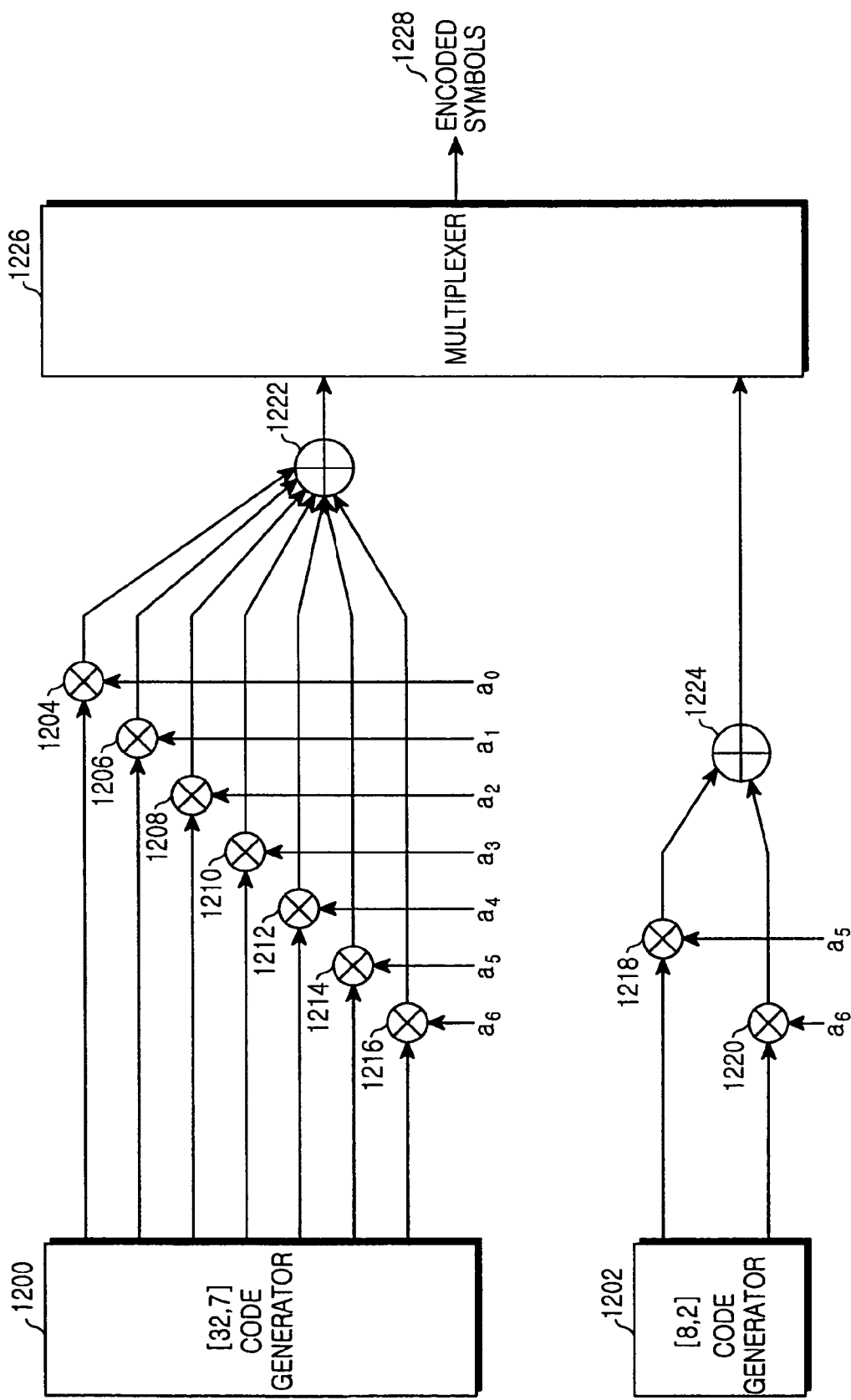
FIG. 12 illustrates a configuration of a [40, 7] encoder according to an embodiment of the present invention.

Exemplary [40, 7] Encoding in Accordance with an Embodiment of the Present Invention FIG. 12 illustrates a configuration of a [40, 7] encoder according to an embodiment of the present invention. The encoder of FIG. 12, which is an example of the channel encoders 218 and 219 shown in FIG. 2, converts 7 bits of E-DCH uplink control information into 40 encoded symbols by using the [40, 7] code. The basis sequences of the [40, 7] code are as shown in Table 12.

Referring to FIG. 12, when the 7 E-DCH uplink control information bits $a_0$~$a_6$ are input to the encoder, the information bits $a_0, a_1, a_2, a_3, a_4, a_5$ and $a_6$ are input to the corresponding first multipliers 1204, 1206, 1208, 1210, 1212, 1214 and 1216, respectively. Further, the information bits $a_5$ and $a_6$ are input to the corresponding second multipliers 1218 and 1220, respectively. When the 7 information bits have been input in the manner described above, the [32, 7] code generator 1200 and the [8, 2] code generator 1202 generate the basis sequences as shown in Tables 10 and 11.

Specifically, the [32, 7] code generator 1200 generates '0000001', the first column of Table 10, in parallel. Then, the generated bits are sequentially input to the first multipliers 1204, 1206, 1208, 1210, 1212, 1214 and 1216, in which they Simultaneously, the [8, 2] code generator 1202 generates '10', the first column of Table 10. Then, the generated bits are sequentially input to the second multipliers 1218 and 1220, in which they are multiplied by the input information bits $a_5$ and $a_6$, and are then input to the second summer 1224. The second summer 1224 generates an encoded symbol by performing a modulo-2 addition for the two input values and outputs the generated encoded symbol to the multiplexer 1226. This process is repeated up to '01', the eighth column of Table 11, so that eight encoded symbols are input to the multiplexer 1226.

Thereafter, the multiplexer 1226 multiplexes the 32 encoded symbols generated by the first summer 1222 and the eight encoded symbols generated by the second summer 1224, thereby generating a codeword 1228 including 40 encoded symbols.

Figure 13:
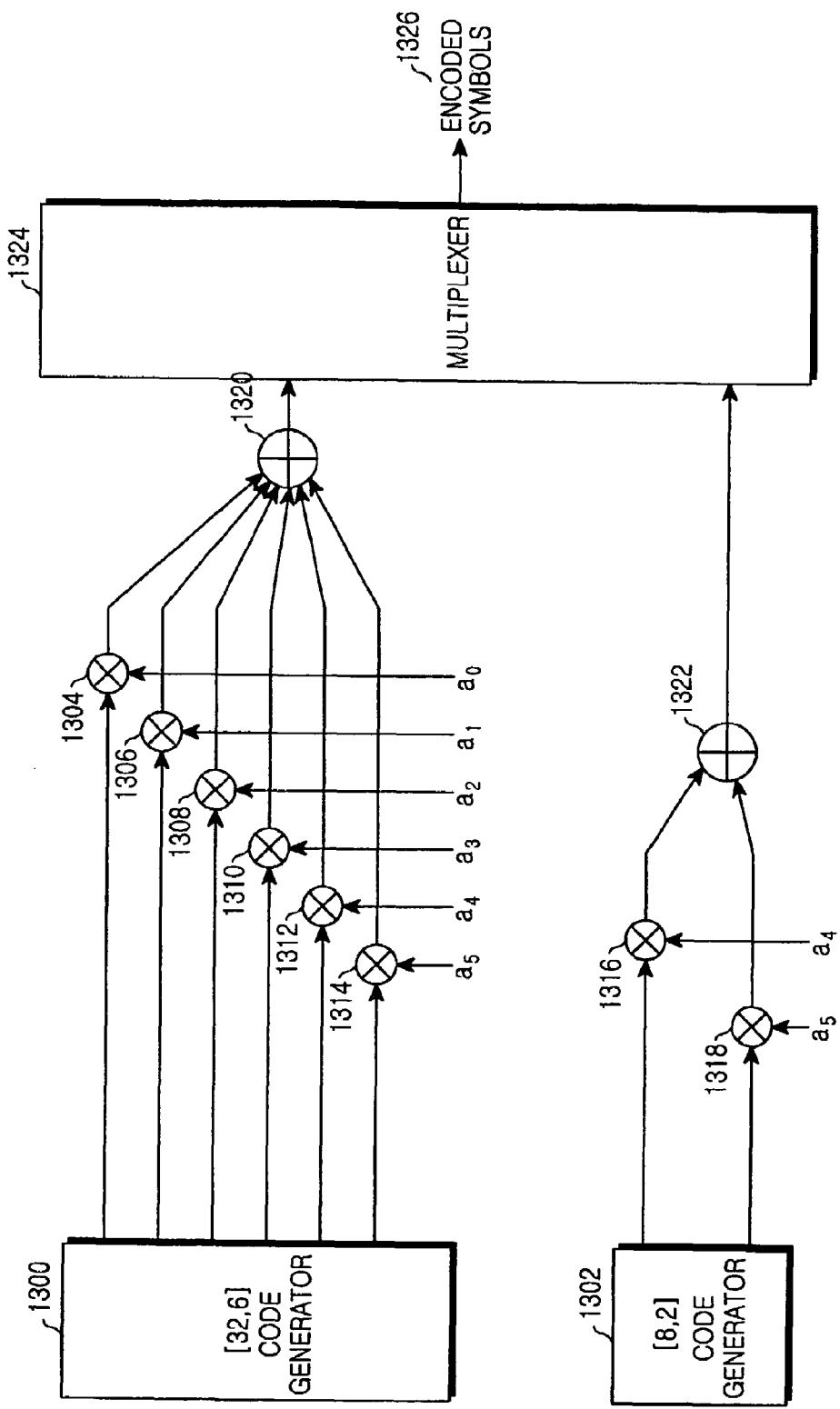
FIG. 13 illustrates a configuration of a [40, 6] encoder according to an embodiment of the present invention.

Exemplary [40, 6] Encoding in Accordance with an Embodiment of the Present Invention FIG. 13 illustrates a configuration of a [40, 6] encoder according to an embodiment of the present invention. The encoder of FIG. 13, which is an example of the channel encoders 218 and 219 shown in FIG. 2, converts 6 scheduling information bits into 40 encoded symbols by using the [40, 6] code. The basis sequences of the [40, 6] code are as shown in Table 14.

Referring to FIG. 13, when the 6 scheduling information bits $a_0$~$a_5$ are input to the encoder, the information bits $a_0, a_1, a_2, a_3, a_4$ and $a_5$ are input to the corresponding first multipliers 1304, 1306, 1308, 1310, 1312 and 1314, respectively. Further, the information bits $a_4$ and $a_5$ are input to the corresponding second multipliers 1316 and 1318, respectively. When the 6 information bits have been input in the manner described above, the [32, 6] code generator 1300 and the [8, 2] code generator 1302 generate the basis sequences as shown in Tables 13 and 11.

Specifically, the [32, 6] code generator 1300 generates '000001', the first column of Table 13, in parallel. Then, the generated bits are sequentially input to the first multipliers 1304, 1306, 1308, 1310, 1312 and 1314, in which they are multiplied by the input information bits $a_0, a_1, a_2, a_3, a_4$ and $a_5$, and are then input to the first summer 1320. The first summer 1320 generates an encoded symbol by performing a modulo-2 addition for the 6 input values and outputs the generated encoded symbol to the multiplexer 1324. This process is repeated up to '111111', the thirty second column of Table 13, so that 32 encoded symbols are input to the multiplexer 1324.

Simultaneously, the [8, 2] code generator 1302 generates '10', the first column of Table 11. Then, the generated bits are sequentially input to the second multipliers 1316 and 1318, in which they are multiplied by the input information bits $a_4$ and $a_5$, and are then input to the second summer 1322. The second summer 1322 generates an encoded symbol by performing a modulo-2 addition for the two input values and outputs the generated encoded symbol to the multiplexer 1324. This process is repeated up to '01', the eighth column of Table 11, so that eight encoded symbols are input to the multiplexer 1324.

Thereafter, the multiplexer 1324 multiplexes the 32 encoded symbols generated by the first summer 1320 and the eight encoded symbols generated by the second summer 1322, thereby generating a codeword 1326 including 40 encoded symbols.

Figure 14:
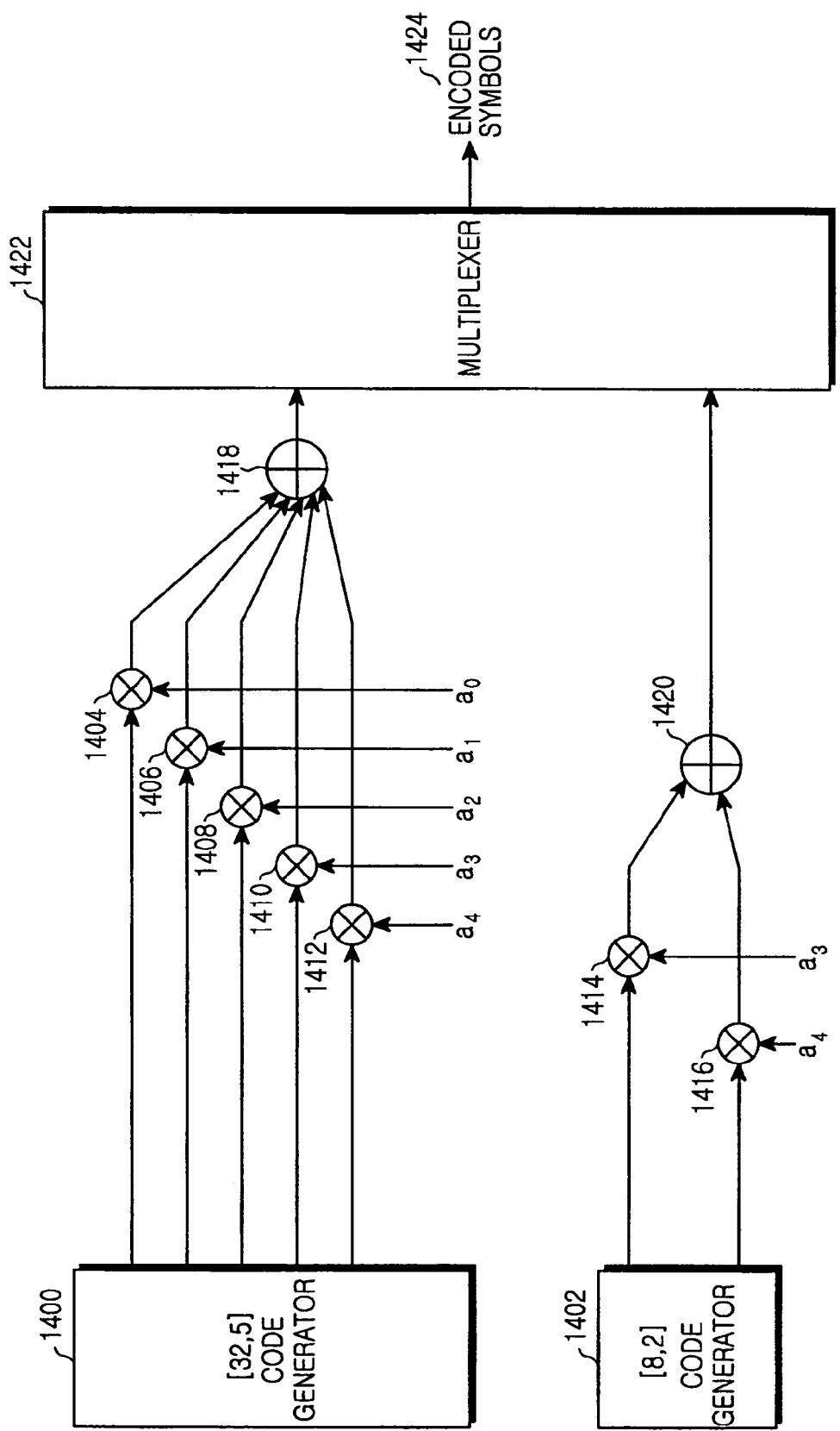
FIG. 14 illustrates a configuration of a [40, 5] encoder according to an embodiment of the present invention.

Exemplary [40, 5] Encoding in Accordance with an Embodiment of the Present Invention FIG. 14 illustrates a configuration of a [40, 5] encoder according to an embodiment of the present invention. The encoder of FIG. 14, which is an example of the channel encoder 219 shown in FIG. 2, converts 5 scheduling information bits into 40 encoded symbols by using the [40, 5] code. The basis sequences of the [40, 5] code are as shown in Table 16.

Referring to FIG. 14, when the 5 scheduling information bits $a_0 \sim a_4$ are input to the encoder, the information bits $a_0$, $a_1$, $a_2$, $a_3$ and $a_4$ are input to the corresponding first multipliers 1404, 1406, 1408, 1410 and 1412, respectively. Further, the information bits $a_3$ and $a_4$ are input to the corresponding second multipliers 1414 and 1416, respectively. When the 5 information bits have been input in the manner described above, the [32, 5] code generator 1400 and the [8, 2] code generator 1402 generate the basis sequences as shown in Tables 15 and 11.

Specifically, the [32, 5] code generator 1400 generates '00000', the first column of Table 15, in parallel. Then, the generated bits are sequentially input to the first multipliers 1404, 1406, 1408, 1410 and 1412, in which they are multiplied by the input information bits $a_0$, $a_1$, $a_2$, $a_3$ and $a_4$, and are then input to the first summer 1418. The first summer 1418 generates an encoded symbol by performing a modulo-2 addition for the 5 input values and outputs the generated encoded symbol to the multiplexer 1422. This process is repeated up to '11111', the thirty second column of Table 15, so that 32 encoded symbols are input to the multiplexer 1422.

Simultaneously, the [8, 2] code generator 1402 generates '10', the first column of Table 11. Then, the generated bits are sequentially input to the second multipliers 1414 and 1416, in which they are multiplied by the input information bits $a_3$ and $a_4$, and are then input to the second summer 1420. The second summer 1420 generates an encoded symbol by performing a modulo-2 addition for the two input values and outputs the generated encoded symbol to the multiplexer 1422. This process is repeated up to '01', the eighth column of Table 11, so that eight encoded symbols are input to the multiplexer 1422.

Thereafter, the multiplexer 1422 multiplexes the 32 encoded symbols generated by the first summer 1418 and the eight encoded symbols generated by the second summer 1420, thereby generating a codeword 1424 including 40 encoded symbols.

The configurations of the encoding apparatus for the [20, 5] CQI code, [32, 10] code, [32, 9] code and [32, 8] code, preferably use the CQI or TFCI encoding schemes of the 3GPP TS 25.212, so further description thereof is omitted.

Figure 15:
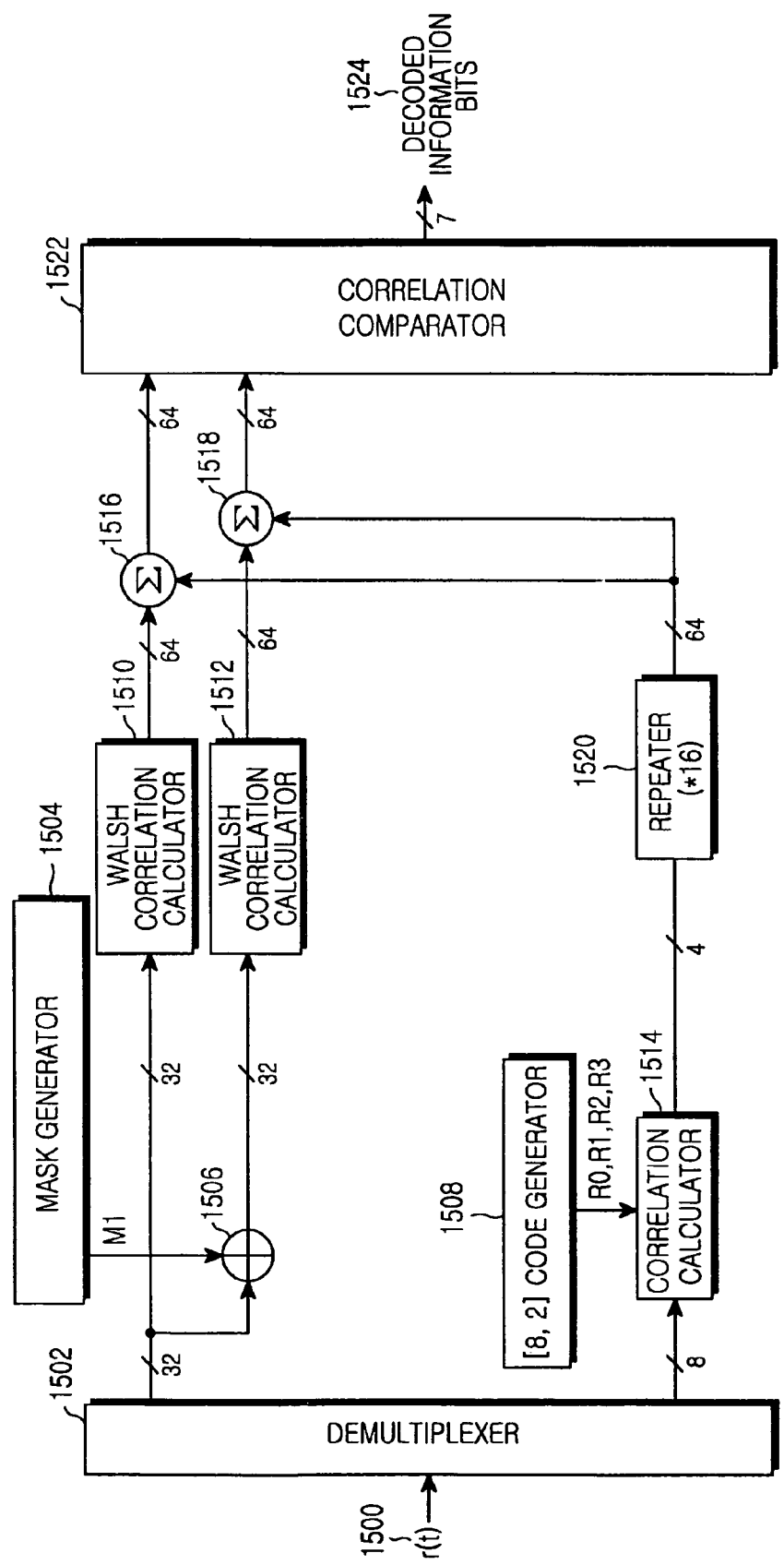
FIG. 15 illustrates a configuration of a [40, 7] decoder according to an embodiment of the present invention.

Exemplary [40, 7] Decoding in Accordance with an Embodiment of the Present Invention FIG. 15 illustrates a configuration of a [40, 7] decoder according to an embodiment of the present invention. The decoder of FIG. 15, which is an example of the channel decoders 314 and 316 shown in FIG. 3 and corresponds to the encoders of FIG. 12, decodes 7 bits of scheduling information from the 40 encoded symbols.

Referring to FIG. 15, the received signal r(t) 1500 including the 40 encoded symbols is divided into 32 higher symbols and eight lower symbols by the demultiplexer 1502. The 32 higher symbols are input to the adder 1506 and the first Walsh correlation calculator 1510. The received signal r(t) 1500 is a signal having passed through a channel after being encoded by the [32, 7] code and the [8, 2] code in the channel encoder having the configuration as shown in FIG. 12.

The mask generator 1504 generates one mask sequence M1 according to the [32, 7] code used in the channel encoder and outputs the generated mask sequence M1 to the adder 1506. The mask sequence M1 denotes the first codeword in Table 10. That is, the mask sequence M1 is comprised of '00101000011000111111000001110111'.

The adder 1506 adds the 32 higher symbols from the demultiplexer 1502 and the mask sequence M1 from the mask generator 1504 by modulo-2 addition and outputs 32 unmasked symbols to the second Walsh correlation calculator 1512. If the 32 higher symbols have been encoded by the basis mask sequences, the output from the adder 1506 is expected to be a signal from which the mask sequence has been removed. The signal from which the mask sequence has been removed is a signal spread by a predetermined Walsh code.

The first Walsh correlation calculator 1510 correlates the 32 higher symbols from the demultiplexer 1502 with 64 bi-orthogonal Walsh codes and thereby outputs 64 correlation values to the first summer 1516. The second Walsh correlation calculator 1512 correlates the 32 symbols from the adder 1506 with the 64 bi-orthogonal Walsh codes and thereby outputs 64 correlation values to the second summer 1518. In this way, each of the Walsh correlation calculators 1510 and 1512 correlates 32 input symbols with 64 bi-orthogonal Walsh codes and thereby outputs 64 correlation values to the corresponding summers 1516 and 1518, respectively. The 64 bi-orthogonal Walsh codes correspond to all Walsh codes which can be generated by the combination of five basis Walsh codes having a length of 32 and the all-one sequence. FIGS. 8A and 8B show Walsh codes preferably used for the calculation of correlation values by the Walsh correlation calculators 1510 and 1512.

The 64 correlation values output from the Walsh correlation calculators 1510 and 1512 are values obtained after sequentially performing correlation by the bi-orthogonal Walsh codes W1~W64 as shown in FIGS. 8A and 8B. The Walsh correlation calculators 1510 and 1512 preferably use IFHT in order to achieve rapid calculation of correlation with the 64 Walsh codes.

The eight lower symbols divided by the demultiplexer 1502 are input to the correlation calculator 1514. The [8, 2] code generator 1508 generates codewords R0, R1, R3 and R4 of the [8, 2] code and outputs them to the correlation calculator 1514. The four codewords R0, R1, R3 and R4 are codewords of the [8, 2] code used in the channel encoder, which are generated by sequentially arranging four codewords formed through a linear combination of the two codewords of Table 11. That is, R0=[00000000], R1=[111000000], R2=[00111111], and R3=[11111111].

The correlation calculator 1514 calculates the correlation value of the eight lower symbols from the demultiplexer 1502 and the four codewords R0, R1, R3 and R4 of the [8, 2] code, and outputs the four calculated correlation values to the repeater 1520. The repeater 1520 sequentially repeats each of the correlation values corresponding to the codewords R0 to R3 16 times and thereby outputs a total of 64 correlation values to the summers 1516 and 1518.

The first summer 1516 sequentially adds the 64 correlation values from the repeater 1520 to the 64 correlation values from the first Walsh correlation calculator 1510 and thereby outputs 64 added correlation values to the correlation comparator 1522. The second summer 1518 sequentially adds the 64 correlation values from the repeater 1520 to the 64 correlation values from the second Walsh correlation calculator 1512 and thereby outputs 64 added correlation values to the correlation comparator 1522. As a result, a total of 128 correlation values generated by the summers 1516 and 1518 are input to the correlation comparator 1522.

The correlation comparator 1522 compares the 128 correlation values input from the summers 1516 and 1518 and determines the maximum correlation value from among the 128 correlation values. When the maximum correlation value has been determined, the correlation comparator 1522 determines and outputs 7 decoded information bits 1524 based on the [8, 2] code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M1 and the Walsh code corresponding to the maximum correlation value is W4, the decoded information bits are determined as "(index corresponding to M1)//(index corresponding to W4)" wherein '//' implies concatenation.

For example, where the 7 information bits $a_0$ to $a_6$ are '1110000', the channel encoder encodes the information bits into "M1⊚W4//R0" and then transmits the encoded information bits, wherein ⊚ is a symbol representing modulo-2 addition. In the channel decoder, the received signal r(t) 1500 encoded into "M1⊚W4//R0" is divided into an "M1⊚W4" related part and an "R0" related part by the demultiplexer 1502. Then, the "M1⊚W4" related part which includes the 32 higher symbols is correlated with the 64 bi-orthogonal Walsh codes, so that a total of 64 correlation values are obtained. Also, the "M1⊚W4" related part which includes the 32 higher symbols is added to the mask sequence M1 by modulo-2 addition, and the added values are correlated with the 64 bi-orthogonal Walsh codes, so that 64 correlation values are generated. As a result, a total of 128 correlation values are generated.

Further, the "R0" related part which includes the eight lower symbols is correlated with all codewords of the [8, 2] code, so that four correlation values are obtained. Then, the four correlation values are repeated by the repeater 1520, and the 128 correlation values are summed according to a predetermined rule, so that 128 added correlation values are obtained. Then, it is confirmed that the received signal r(t) has been encoded by M1, W4 and R0, that is, by the Walsh code index, mask sequence index and [8, 2] code index corresponding to the maximum value among the 128 added correlation values. Upon confirming that the received signal r(t) has been encoded by M1, W4 and R0, the channel decoder combines '1' (the index corresponding to the M1) and '110000' (the index corresponding to the W2), thereby outputting '1110000' as the decoded information bits.

A reason why the information bit column is determined by summing the decoded result of the [32, 7] code and the decoded result of the [8, 2] code is in order to provide the higher error correcting capability to the seventh and sixth higher bits.

Figure 16:
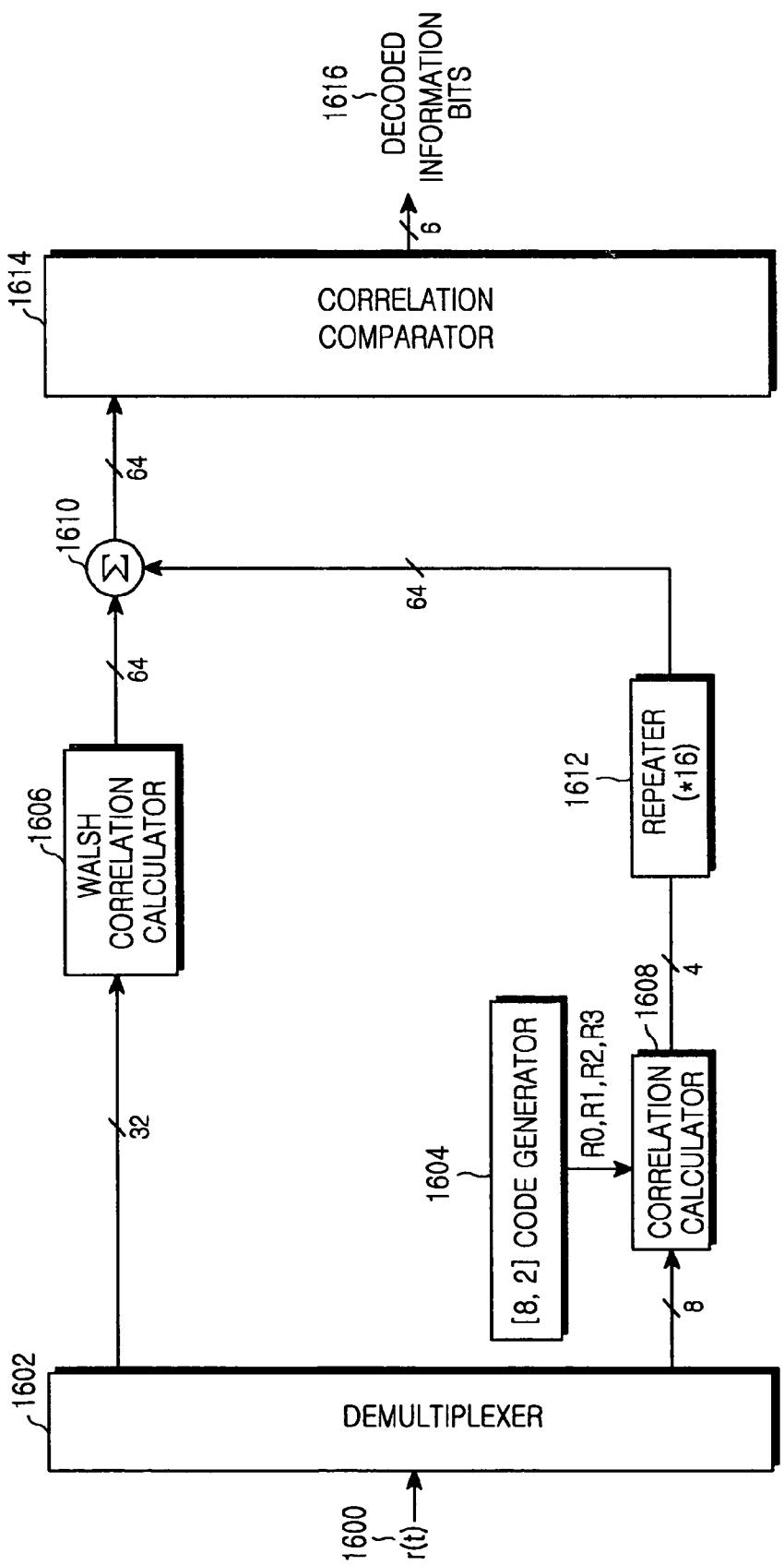
FIG. 16 illustrates a configuration of a [40, 6] decoder according to an embodiment of the present invention.

Exemplary [40, 6] Decoding in Accordance with an Embodiment of the Present Invention FIG. 16 illustrates a configuration of a [40, 6] decoder according to an embodiment of the present invention. The decoder of FIG. 16, which is an example of the channel decoders 314 and 316 shown in FIG. 3 and corresponds to the encoders of FIG. 13, decodes 6 bits of scheduling information from the 40 encoded symbols.

Referring to FIG. 16, the received signal r(t) 1600 including the 40 encoded symbols is divided into 32 higher symbols and eight lower symbols by the demultiplexer 1602. The 32 higher symbols are input to the Walsh correlation calculator 1606. The received signal r(t) 1600 is a signal having passed through a channel after being encoded by the [32, 6] code and the [8, 2] code in the channel encoder having the configuration as shown in FIG. 13.

The Walsh correlation calculator 1606 correlates the 32 higher symbols from the demultiplexer 1602 with 64 bi-orthogonal Walsh codes and thereby outputs 64 correlation values to the summer 1610. FIGS. 8A and 8B show Walsh codes preferably used for the calculation of correlation values by the Walsh correlation calculator 1606. That is, the 64 correlation values output from the Walsh correlation calculator 1606 are values obtained by sequentially performing correlation using the bi-orthogonal Walsh codes W1~W64 as shown in FIGS. 8A and 8B. The Walsh correlation calculator 1606 preferably uses IFHT in order to achieve rapid calculation of correlation with the 64 Walsh codes.

The eight lower symbols divided by the demultiplexer 1602 are input to the correlation calculator 1608. The [8, 2] code generator 1604 generates codewords R0, R1, R2 and R3 of the [8, 2] code and outputs them to the correlation calculator 1608. The four codewords R0, R1, R2 and R3 are codewords of the [8, 2] code used in the channel encoder, which are generated by sequentially arranging four codewords formed through a linear combination of the two codewords of Table 11. That is, R0=[00000000], R1=[11000000], R2=[00111111], and R3=[11111111].

The correlation calculator 1608 correlates the eight lower symbols from the demultiplexer 1602 and the four codewords R0, R1, R2 and R3 of the [8, 2] code and outputs the four obtained correlation values to the repeater 1612. The repeater 1612 sequentially repeats each of the correlation values corresponding to the codewords R0 to R3 16 times and thereby outputs a total of 64 correlation values to the summer 1610.

The summer 1610 sequentially adds the 64 correlation values from the repeater 1612 to the 64 correlation values from the Walsh correlation calculator 1606 and thereby outputs 64 added correlation values to the correlation comparator 1614. The correlation comparator 1614 compares the 64 correlation values input from the summer 1610 and determines the maximum correlation value from among the 64 correlation values. When the maximum correlation value has been determined, the correlation comparator 1614 determines and outputs 6 decoded information bits 1616 based on the [8, 2]

code index, mask sequence index and Walsh code index corresponding to the determined maximum correlation value.

The decoded information bits can be obtained by determining the index of the Walsh codes. That is, if the Walsh code corresponding to the maximum correlation value is W4, the decoded information bits are determined as an "index corresponding to W4".

For example, where the 6 information bits $a_0$ to $a_5$ are '110000', the channel encoder encodes the information bits into "W4//R0" and then transmits the encoded information bits. In the channel decoder, the received signal r(t) 1600 encoded into "W4//R0" is divided into a "W4" related part and an "R0" related part by the demultiplexer 1602. Then, the "W4" related part which includes the 32 higher symbols is correlated with the 64 bi-orthogonal Walsh codes, so that a total of 64 correlation values are obtained. Further, the "R0" related part which includes the eight lower symbols is correlated with all codewords of the [8, 2] code, so that four correlation values are obtained. Then, the four correlation values are repeated by the repeater 1612, so as to output 64 correlation values. Next, the 64 correlation values are added to the 64 correlation values obtained through correlation by the Walsh codes according to a predetermined rule, so that 64 added correlation values are obtained. Then, it is confirmed that the received signal r(t) has been encoded by W4 and R0, that is, by the Walsh code index and [8, 2] code index corresponding to the maximum value among the 64 added correlation values. Upon confirming that the received signal r(t) has been encoded by W4 and R0, the channel decoder outputs '110000' (the index corresponding to the W2) as the decoded information bits.

Figure 17:
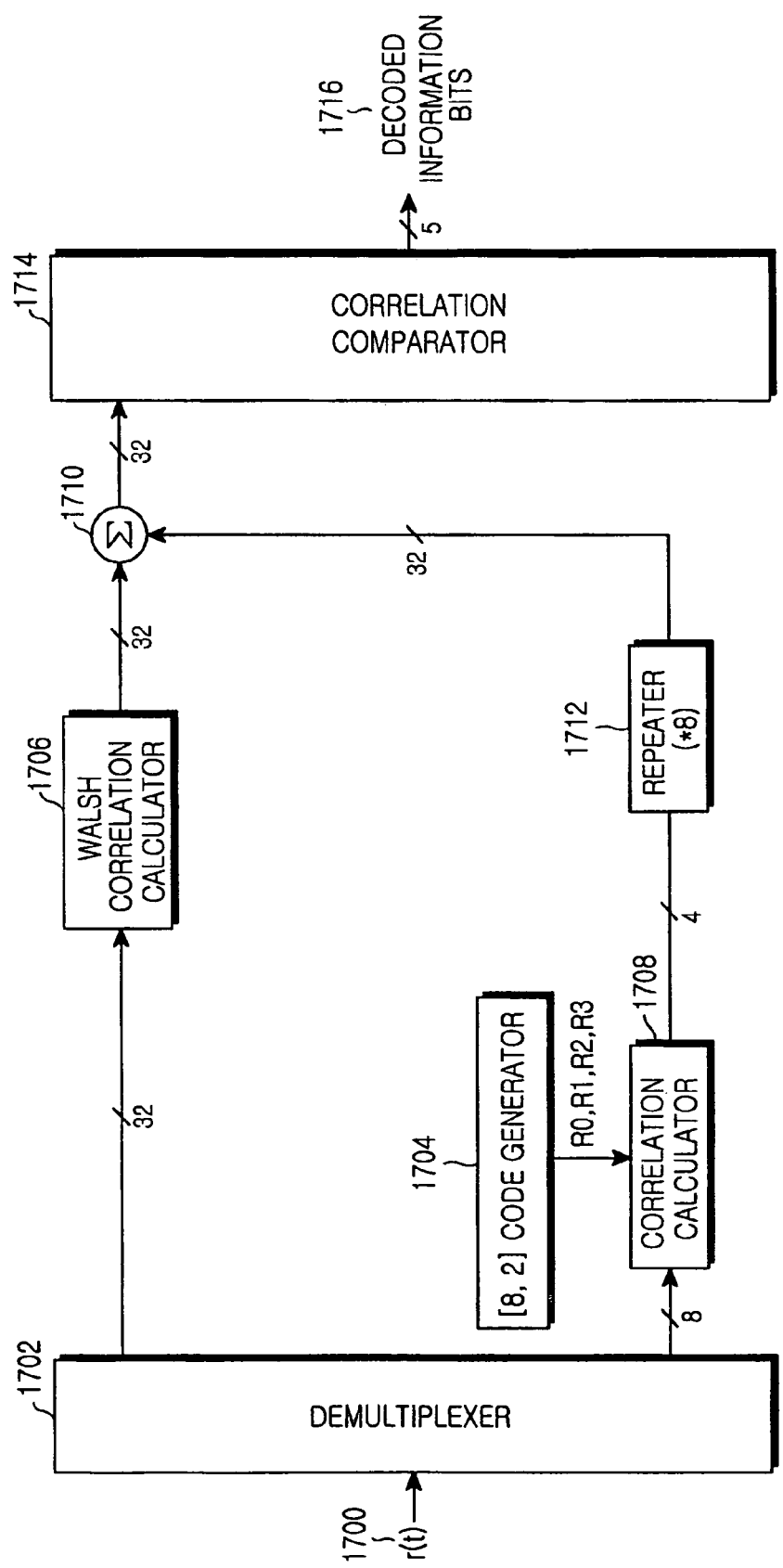
FIG. 17 illustrates a configuration of a [40, 5] decoder according to an embodiment of the present invention.

Exemplary [40, 5] Decoding in Accordance with an Embodiment of the Present Invention FIG. 17 illustrates a configuration of a [40, 5] decoder according to an embodiment of the present invention. The decoder of FIG. 17, which is an example of the channel decoders 314 and 316 shown in FIG. 3 and corresponds to the encoders of FIG. 14, decodes 5 bits of scheduling information from the 40 encoded symbols.

Referring to FIG. 17, the received signal r(t) 1700 including the 40 encoded symbols is divided into 32 higher symbols and eight lower symbols by the demultiplexer 1702. The 32 higher symbols are input to the Walsh correlation calculator 1706. The received signal r(t) 1700 is a signal having passed through a channel after being encoded by the [32, 5] code and the [8, 2] code in the channel encoder having the configuration as shown in FIG. 14.

Figure 18:
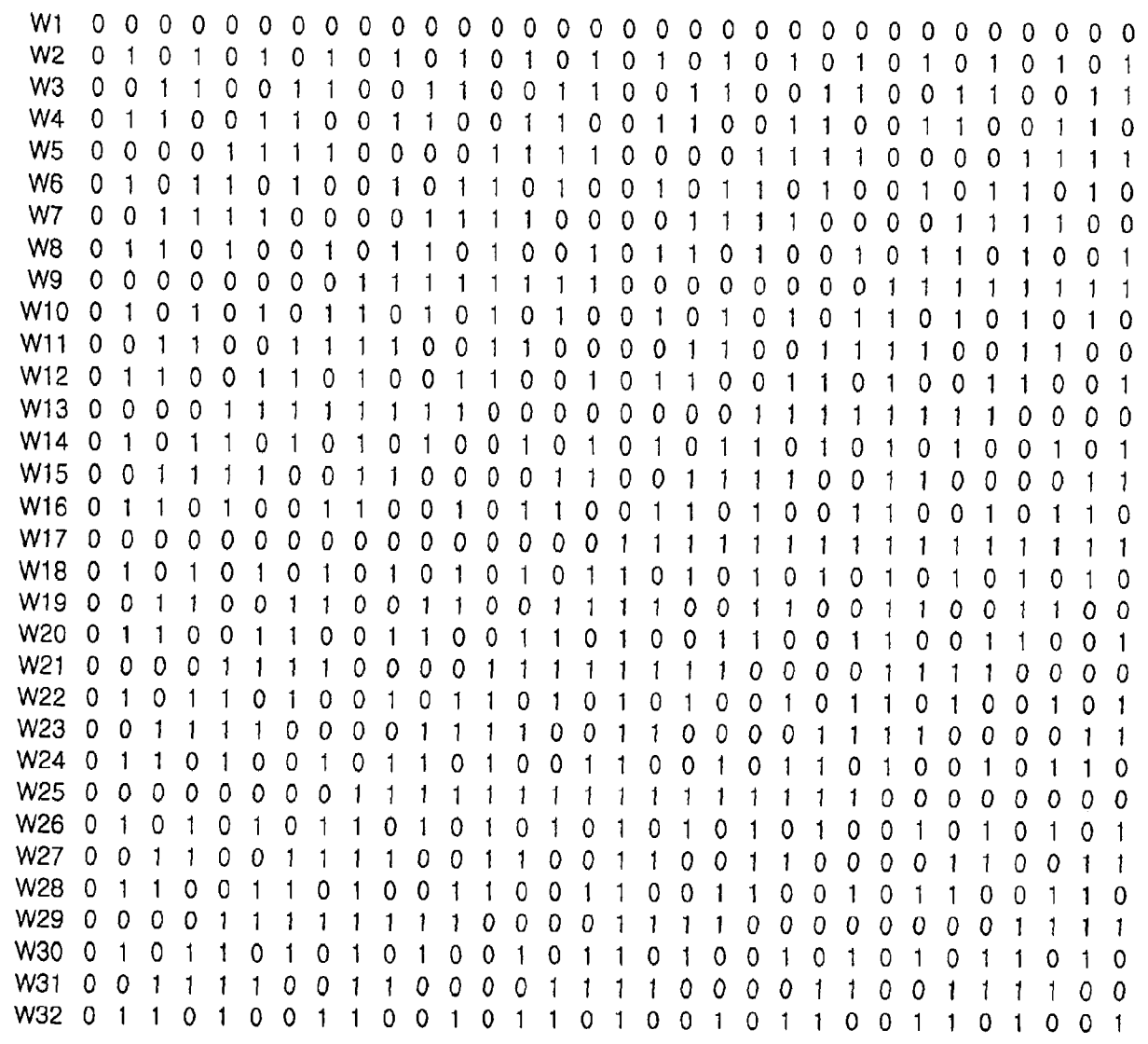

The Walsh correlation calculator 1706 correlates the 32 higher symbols from the demultiplexer 1702 with 32 bi-orthogonal Walsh codes and thereby outputs 32 correlation values to the summer 1710. The 64 bi-orthogonal Walsh codes correspond to all Walsh codes which can be generated by the combination of five basis Walsh codes each having a length of 32 and the all-one sequence. FIG. 18 sequentially shows Walsh codes preferably used for the calculation of correlation values by the Walsh correlation calculator 1706. As noted above, the 32 correlation values output from the Walsh correlation calculator 1706 are values obtained by sequentially performing correlation using the bi-orthogonal Walsh codes W1~W32 as shown in FIG. 18. Among the Walsh codes in FIG. 18, W2, W3, W5, W9 and W17 are basis Walsh codes. Through linear combination of the basis Walsh codes, it is possible to generate 32 Walsh codes. The Walsh correlation calculator 1706 preferably uses IFHT in order to achieve rapid calculation of correlation with the 64 Walsh codes.

The eight lower symbols divided by the demultiplexer 1702 are input to the correlation calculator 1708. The [8, 2] code generator 1704 generates codewords R0, R1, R2 and R3 of the [8, 2] code and outputs them to the correlation calculator 1708. The four codewords R0, R1, R2 and R3 are codewords of the [8, 2] code used in the channel encoder, which are generated by sequentially arranging four codewords formed through a linear combination of the two codewords of Table 11. That is, R0=[00000000], R1=[11100000], R2=[00111111], and R3=[11111111].

The correlation calculator 1708 correlates the eight lower symbols from the demultiplexer 1702 and the four codewords R0, R1, R2 and R3 of the [8, 2] code and outputs the four obtained correlation values to the repeater 1712. The repeater 1712 sequentially repeats each of the correlation values corresponding to the codewords R0 to R3 eight times and thereby outputs a total of 32 correlation values to the summer 1710.

The summer 1710 sequentially adds the 32 correlation values from the repeater 1712 to the 32 correlation values from the Walsh correlation calculator 1706 and thereby outputs 32 added correlation values to the correlation comparator 1714. The correlation comparator 1714 compares the 32 correlation values input from the summer 1710 and determines the maximum correlation value from among the 32 correlation values. When the maximum correlation value has been determined, the correlation comparator 1714 determines and outputs five decoded information bits 1716 based on the [8, 2] code index, mask sequence index and Walsh code index corresponding to the determined maximum correlation value.

The decoded information bits can be obtained by determining the index of the Walsh codes. That is, if the Walsh code corresponding to the maximum correlation value is W4, the decoded information bits are determined as an "index corresponding to W4".

For example, where the five information bits $a_0$ to $a_4$ are '11000', the channel encoder encodes the information bits into "W4//R0" and then transmits the encoded information bits. In the channel decoder, the received signal r(t) 1700 encoded into "W4//R0" is divided into a "W4" related part and an "R0" related part by the demultiplexer 1702. Then, the "W4" related part which includes the 32 higher symbols is correlated with the 32 bi-orthogonal Walsh codes, so that a total of 32 correlation values are obtained. Further, the "R0" related part which includes the eight lower symbols is correlated with all codewords of the [8, 2] code, so that four correlation values are obtained. Then, the four correlation values are repeated by the repeater 1712, so as to output 32 correlation values. Next, the 32 correlation values are added to the 32 correlation values obtained through correlation by the Walsh codes according to a predetermined rule, so that 32 added correlation values are obtained. Then, it is confirmed that the received signal r(t) has been encoded by W4 and R0, that is, by the Walsh code index and [8, 2] code index corresponding to the maximum value among the 32 added correlation values. Upon confirming that the received signal r(t) has been encoded by W4 and R0, the channel decoder outputs '11000' (the index corresponding to the W2) as the decoded information bits.

The configurations of the decoding apparatus for the [20, 5] CQI code, [32, 10] code, [32, 9] code and [32, 8] code preferably use the CQI or TFCI decoding schemes of the 3GPP TS 25.212, so further description thereof is omitted.

Hereinafter, exemplary codes for encoding scheduling information will be described, but are not limited thereto. The exemplary codes described below can also be applied to the above-mentioned control information.

First, two kinds of equal protection codes for encoding scheduling information which can provide the same error correcting capability to all bits of the scheduling information, will be described.

Exemplary [20, 7] Equal Protection Code in Accordance with an Embodiment of the Present Invention Hereinafter, a method for designing an optimum [20, 7] code having a minimum distance of 8 will be described.

Table 22 below shows basis sequences of a [16, 7, 6] code, including seven basis sequences each having a length of 16, in which the minimum distance of the basis sequences is 6. That is, the [16, 7, 6] code includes 16 columns each including seven symbols. The minimum distance can be increased to 8 by concatenating the [16, 7, 6] code with a [4, 2] first order Reed Muller code. Table 23 below shows basis sequences of the [4, 2] first order Reed Muller code. Table 24 below shows the [20, 7] code, an optimum code having a minimum distance of 8, which has been designed according to the above-described manner.

TABLE 22

| | | | | | | | | | | | | | | | |
|---|---|---|---|---|---|---|---|---|---|---|---|---|---|---|---|
| 0 | 1 | 1 | 0 | 0 | 0 | 1 | 1 | 1 | 1 | 1 | 1 | 0 | 1 | 0 | 1 |
| 0 | 1 | 1 | 1 | 1 | 1 | 1 | 0 | 0 | 0 | 1 | 0 | 1 | 0 | 1 | 1 |
| 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 |

TABLE 23

| | | | |
|---|---|---|---|
| 0 | 0 | 1 | 1 |
| 0 | 1 | 0 | 1 |

TABLE 24

| | | | | | | | | | | | | | | | | | | | |
|---|---|---|---|---|---|---|---|---|---|---|---|---|---|---|---|---|---|---|---|
| 0 | 1 | 1 | 0 | 0 | 0 | 1 | 1 | 1 | 1 | 1 | 1 | 0 | 1 | 0 | 1 | 0 | 0 | 1 | 1 |
| 0 | 1 | 1 | 1 | 1 | 1 | 1 | 0 | 0 | 0 | 1 | 0 | 1 | 0 | 1 | 1 | 0 | 1 | 0 | 1 |
| 1 | 1 | 1 | 1 | 1 | 1 | 1 | 1 | 1 | 1 | 1 | 1 | 1 | 1 | 1 | 1 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 0 | 0 | 0 | 0 | 1 | 1 | 1 | 1 | 0 | 0 | 0 | 0 |
| 0 | 0 | 1 | 1 | 0 | 0 | 1 | 1 | 0 | 0 | 1 | 1 | 0 | 0 | 1 | 1 | 0 | 0 | 0 | 0 |
| 0 | 1 | 0 | 1 | 0 | 1 | 0 | 1 | 0 | 1 | 0 | 1 | 0 | 1 | 0 | 1 | 0 | 0 | 0 | 0 |

Exemplary [20, 6] Equal Protection Code in Accordance with an Embodiment of the Present Invention Hereinafter, a method for designing an optimum [20, 6] code having a minimum distance of 8 will be described.

First, a [16, 6] code is formed by eliminating the first basis sequence '0110001111110101' from the [16, 7] code shown in Table 22, and a [4, 1] code is formed by eliminating the first basis sequence '0011' from the [4, 2] first order Reed Muller code shown in Table 23. Then, by concatenating the [16, 6] code and the [4, 1] code, the [20, 6] code can be generated. Tables 25 and 26 below show the basis sequences of the [16, 6] code and the [4, 1] code formed in the manner described above. Table 27 below shows the [20, 6] code, an optimum code having a minimum distance of 8, which has been designed according to the above-described manner.

TABLE 25

| 0 | 1 | 1 | 1 | 1 | 1 | 1 | 0 | 0 | 0 | 1 | 0 | 1 | 0 | 1 | 1 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 1 | 1 | 1 | 1 | 1 | 1 | 1 | 1 |
| 0 | 0 | 0 | 0 | 1 | 1 | 1 | 1 | 0 | 0 | 0 | 0 | 1 | 1 | 1 | 1 |
| 0 | 0 | 1 | 1 | 0 | 0 | 1 | 1 | 0 | 0 | 1 | 1 | 0 | 0 | 1 | 1 |
| 0 | 1 | 0 | 1 | 0 | 1 | 0 | 1 | 0 | 1 | 0 | 1 | 0 | 1 | 0 | 1 |

TABLE 26

| 0 | 1 | 0 | 1 |
|---|---|---|---|

TABLE 27

| 0 | 1 | 1 | 1 | 1 | 1 | 1 | 0 | 0 | 0 | 1 | 0 | 1 | 0 | 1 | 1 | 0 | 1 | 0 | 1 |
|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 0 | 0 | 0 | 0 |
| 0 | 0 | 0 | 0 | 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 0 | 0 | 0 | 0 | 1 | 1 | 1 | 1 | 0 | 0 | 0 | 0 |
| 0 | 0 | 1 | 1 | 0 | 0 | 1 | 1 | 0 | 0 | 1 | 1 | 0 | 0 | 1 | 1 | 0 | 0 | 0 | 0 |
| 0 | 1 | 0 | 1 | 0 | 1 | 0 | 1 | 0 | 1 | 0 | 1 | 0 | 1 | 0 | 1 | 0 | 0 | 0 | 0 |

In the case of using the [20, 7] code and the [20, 6] code, the receiver can reduce the quantity of calculations in decoding by using a correlator employing the IFHT.

Next, a [20, 7] code and a [20, 6] code for encoding 7 bits or 6 bits of scheduling information, which are unequal protection codes that are capable of providing higher error correcting capability to higher bits, will be described.

Exemplary [20, 7] Unequal Protection Code in Accordance with an Embodiment of the Present Invention Hereinafter, a method for designing a [20, 7] code having a minimum distance of 6 will be described.

Table 28 below shows basis sequences of a [16, 7, 6] code, including 7 basis sequences each having a length of 16, wherein the minimum distance of the basis sequences is 6. It is possible to provide a higher error correcting capability to the seventh higher bit (that is, the most significant bit) and the sixth higher bit (that is, the next most significant bit) of the scheduling information by concatenating the [4, 2] code as shown in Table 29A below with the [16, 7, 6] code. Table 29A shows basis sequences of the [4, 2] code. Table 30 shows a [20, 7] code having a minimum distance of 6 which can be designed according to the above-described manner. Specifically, Table 29A shows basis sequences in which an additional error correcting capability of 75% (that is, 3 repeated bits/additional 4 bits*100) is provided to the seventh higher bit and an additional error correcting capability of 25% (that is, 1 bit/additional 4 bits*100) is provided to the sixth higher bit. Therefore, Table 29A may be modified depending on the number of bits to which it is desired to additionally provide the error correcting capability, and depending on the error correcting capability to be additionally provided to each bit.

A [4, M] code, wherein M is the number of bits to which it is necessary to additionally provide the error correcting capability, is used as the code to be concatenated with the [16, 7, 6] code in order to generate the [20, 7] code.

For example, Table 29B shows basis sequences in which an additional error correcting capability of 50% (that is, 2 repeated bits/additional 4 bits*100) is provided to the seventh higher bit and an additional error correcting capability of 50% (that is, 2 repeated bits/additional 4 bits*100) is provided to the sixth higher bit. Table 29C shows basis sequences in which an additional error correcting capability of 100% (that is, 4 repeated bits/additional 4 bits*100) is provided to only the seventh higher bit, and Table 29D shows basis sequences in which an additional error correcting capability of 50% (that is, 2 repeated bits/additional 4 bits*100) is provided to the seventh higher bit, an additional error correcting capability of 25% (that is, 1 bit/additional 4 bits*100) is provided to the sixth higher bit, and an additional error correcting capability of 25% (that is, 1 bit/additional 4 bits*100) is provided to the fifth higher bit.

Therefore, by concatenating the code of Table 28 with each of the codes of Tables 29B through 29D, it is possible to generate another [20, 7] code having an additional error correcting capability depending on the number of bits to which it is desired to additionally provide the error correcting capability, and depending on the error correcting capability to be additionally provided to each bit.

TABLE 28

| 1 | 1 | 1 | 1 | 1 | 1 | 0 | 0 | 0 | 1 | 0 | 1 | 0 | 1 | 1 | 0 |
| 1 | 1 | 0 | 0 | 0 | 1 | 1 | 1 | 1 | 1 | 1 | 0 | 1 | 0 | 1 | 0 |
| 1 | 0 | 1 | 0 | 1 | 0 | 1 | 0 | 1 | 0 | 1 | 0 | 1 | 0 | 1 | 0 |
| 0 | 1 | 1 | 0 | 0 | 1 | 1 | 0 | 0 | 1 | 1 | 0 | 0 | 1 | 1 | 0 |
| 0 | 0 | 0 | 1 | 1 | 1 | 1 | 0 | 0 | 0 | 0 | 1 | 1 | 1 | 1 | 0 |
| 0 | 0 | 0 | 0 | 0 | 0 | 0 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 |

TABLE 29A

| 0 | 0 | 0 | 1 |
| 1 | 1 | 1 | 0 |

TABLE 29B

| 0 | 0 | 1 | 1 |
| 1 | 1 | 0 | 0 |

TABLE 29C

| 1 | 1 | 1 | 1 |

TABLE 29D

| 0 | 0 | 0 | 1 |
| 0 | 0 | 1 | 0 |
| 1 | 1 | 0 | 0 |

TABLE 30

| 1 | 1 | 1 | 1 | 1 | 1 | 0 | 0 | 0 | 1 | 0 | 1 | 0 | 1 | 1 | 0 | 0 | 0 | 0 | 0 |
| 1 | 1 | 0 | 0 | 0 | 1 | 1 | 1 | 1 | 1 | 1 | 0 | 1 | 0 | 1 | 0 | 0 | 0 | 0 | 0 |
| 1 | 0 | 1 | 0 | 1 | 0 | 1 | 0 | 1 | 0 | 1 | 0 | 1 | 0 | 1 | 0 | 0 | 0 | 0 | 0 |
| 0 | 1 | 1 | 0 | 0 | 1 | 1 | 0 | 0 | 1 | 1 | 0 | 0 | 1 | 1 | 0 | 0 | 0 | 0 | 0 |
| 0 | 0 | 0 | 1 | 1 | 1 | 1 | 0 | 0 | 0 | 0 | 1 | 1 | 1 | 1 | 0 | 0 | 0 | 0 | 0 |
| 0 | 0 | 0 | 0 | 0 | 0 | 0 | 1 | 1 | 1 | 1 | 1 | 1 | 1 | 1 | 0 | 0 | 0 | 0 | 1 |
| 1 | 1 | 1 | 1 | 1 | 1 | 1 | 1 | 1 | 1 | 1 | 1 | 1 | 1 | 1 | 1 | 1 | 1 | 1 | 0 |

Exemplary [20, 6] Unequal Protection Code in Accordance with an Embodiment of the Present Invention Hereinafter, a method for designing a [20, 6] code having a minimum distance of 6 will be described.

First, a [16, 6] code is formed by eliminating the first basis sequence '1111110001010110' from the [16, 7] code shown in Table 28. Then, by concatenating the [16, 6] code and the [4, 2] code shown in Table 29A, the [20, 6] code can be generated. It is possible to provide a higher error correcting capability to the sixth higher bit (that is, the most significant bit) and the fifth higher bit (that is, the next most significant bit) of the scheduling information by the above-described method. Table 31 shows basis sequences of the [16, 6] code. The [4, 2] code of Table 29A concatenated with the [16, 6] code includes basis sequences in which an additional error correcting capability of 75% (that is, 3 repeated bits/additional 4 bits*100) is provided to the sixth higher bit and an additional error correcting capability of 25% (that is, 1 bit/additional 4 bits*100) is provided to the fifth higher bit. Table 32 below shows a [20, 6] code having a minimum distance of 6, which can be generated by concatenating the [16, 6] code with the [4, 2] code.

Embodiments of the [20, 6] code may be designed in different manners depending on the number of bits to which it is desired to additionally provide the error correcting capability, and depending on the error correcting capability to be additionally provided to each bit. A [4, M] code, wherein M is the number of bits to which it is necessary to additionally provide the error correcting capability, is used as the code to be concatenated with the [16, 7, 6] code in order to generate the [20, 6] code.

For example, Table 29B shows basis sequences in which an additional error correcting capability of 50% (that is, 2 repeated bits/additional 4 bits*100) is provided to the sixth higher bit and an additional error correcting capability of 50% (that is, 2 repeated bits/additional 4 bits*100) is provided to the fifth higher bit. Table 29C shows basis sequences in which an additional error correcting capability of 100% (that is, 4 repeated bits/additional 4 bits*100) is provided to only the sixth higher bit, and Table 29D shows basis sequences in which an additional error correcting capability of 50% (that is, 2 repeated bits/additional 4 bits*100) is provided to the sixth higher bit, an additional error correcting capability of 25% (that is, 1 bit/additional 4 bits*100) is provided to the fifth higher bit, and an additional error correcting capability of 25% (that is, 1 bit/additional 4 bits*100) is provided to the fourth higher bit.

Therefore, by concatenating the code of Table 31 with each of the codes of Tables 29B through 29D, it is possible to generate another [20, 6] code having an additional error correcting capability depending on the number of bits to which it is desired to additionally provide the error correcting capability, and depending on the error correcting capability to be additionally provided to each bit.

TABLE 31

| 1 | 1 | 0 | 0 | 0 | 1 | 1 | 1 | 1 | 1 | 1 | 0 | 1 | 0 | 1 | 0 |
|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 1 | 0 |
| 0 | 1 | 1 | 0 | 0 | 1 | 1 | 0 | 0 | 1 | 1 | 0 | 0 | 1 | 1 | 0 |
| 0 | 0 | 0 | 1 | 1 | 1 | 1 | 0 | 0 | 0 | 0 | 1 | 1 | 1 | 1 | 0 |
| 0 | 0 | 0 | 0 | 0 | 0 | 0 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 |

TABLE 32

| 1 | 1 | 0 | 0 | 0 | 1 | 1 | 1 | 1 | 1 | 1 | 0 | 1 | 0 | 1 | 0 | 0 | 0 |
|---|---|---|---|---|---|---|---|---|---|---|---|---|---|---|---|---|---|
| 1 | 0 | 1 | 0 | 1 | 0 | 1 | 0 | 1 | 0 | 1 | 0 | 1 | 0 | 0 | 0 | 0 | 0 |
| 0 | 1 | 1 | 0 | 0 | 1 | 1 | 0 | 0 | 1 | 1 | 0 | 0 | 1 | 0 | 0 | 0 | 0 |
| 0 | 0 | 0 | 1 | 1 | 1 | 1 | 0 | 0 | 0 | 0 | 1 | 1 | 1 | 0 | 0 | 0 | 0 |
| 0 | 0 | 0 | 0 | 0 | 0 | 1 | 1 | 1 | 1 | 1 | 1 | 1 | 1 | 0 | 0 | 0 | 1 |
| 1 | 1 | 1 | 1 | 1 | 1 | 1 | 1 | 1 | 1 | 1 | 1 | 1 | 1 | 1 | 1 | 1 | 0 |

Due to the characteristics of the linear error correcting code, the code including the basis sequences thereof having been subjected to the column transposition (that is, columns of the code have exchanged their locations) operates the same as the code including the basis sequences having not been subjected to the column transposition. Therefore, a code including basis sequences obtained through column transposition of the basis sequences in each of the [20, 7] code shown in Table 24, the [20, 6] code shown in Table 27, the [20, 7] code shown in Table 30 and the [20, 6] code shown in Table 32, operates as the same code as the original code before the column transposition. Also, a code including basis sequences obtained through column transposition of the basis sequences of the [20, 7] code generated by concatenating one of Tables 29B through 29D with the basis sequences in each of the [16, 7] code shown in Table 28 and the [16, 6] code shown in Table 31, operates as the same code as the original code before the column transposition.

For example, Tables 33 and 34 show the column-transposed [16, 7] code and the [16, 6] code obtained after the sixth column is transposed to the first column, while the original first to fifteenth columns are each shifted backward by one column from the [16, 7] code shown in Table 28 and the [16, 6] code shown in Table 31. It is easily noted from Table 33 that the third to seventh codewords in the column-transposed [16, 7] code are basis codewords of the bi-orthogonal Walsh code having a length of 16. Likewise, it is as easily noted from Table 34 that the second to sixth codewords in the column-transposed [16, 6] code are basis codewords of the bi-orthogonal Walsh code having a length of 16.

TABLE 33

| 0 | 1 | 1 | 1 | 1 | 1 | 1 | 0 | 0 | 0 | 1 | 0 | 1 | 0 | 1 | 1 |
|---|---|---|---|---|---|---|---|---|---|---|---|---|---|---|---|
| 0 | 1 | 1 | 0 | 0 | 0 | 1 | 1 | 1 | 1 | 1 | 1 | 0 | 1 | 0 | 1 |
| 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 0 | 0 | 0 | 0 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

TABLE 34

| 0 | 1 | 1 | 0 | 0 | 0 | 1 | 1 | 1 | 1 | 1 | 1 | 0 | 1 | 0 | 1 |
|---|---|---|---|---|---|---|---|---|---|---|---|---|---|---|---|
| 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 0 | 0 | 0 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |

Therefore, in the case of using the column-transposed codes, the receiver can reduce the quantity of calculations for decoding by using a correlator employing IFHT by transposing the sixteenth symbol to the first symbol position among the 20 encoded symbols, and shifting each of the first to fifteenth symbols backward by one symbol position. Configurations for decoding by transposing the encoded symbols are described in greater detail below with reference to FIGS. 16 and 27.

Exemplary Encoding of [20, 7] Equal Code in Accordance with an Embodiment of the Present Invention FIG. 9 illustrates a configuration of a [20, 7] encoder according to an embodiment of the present invention. The encoder of FIG. 19, which is an example of the channel encoders 218 and 219 shown in FIG. 2, converts 7 bits of control information into 20 encoded symbols by using the [20, 7] equal protection code. The basis sequences of the [20, 7] equal protection code are as shown in Table 24.

Figure 19:
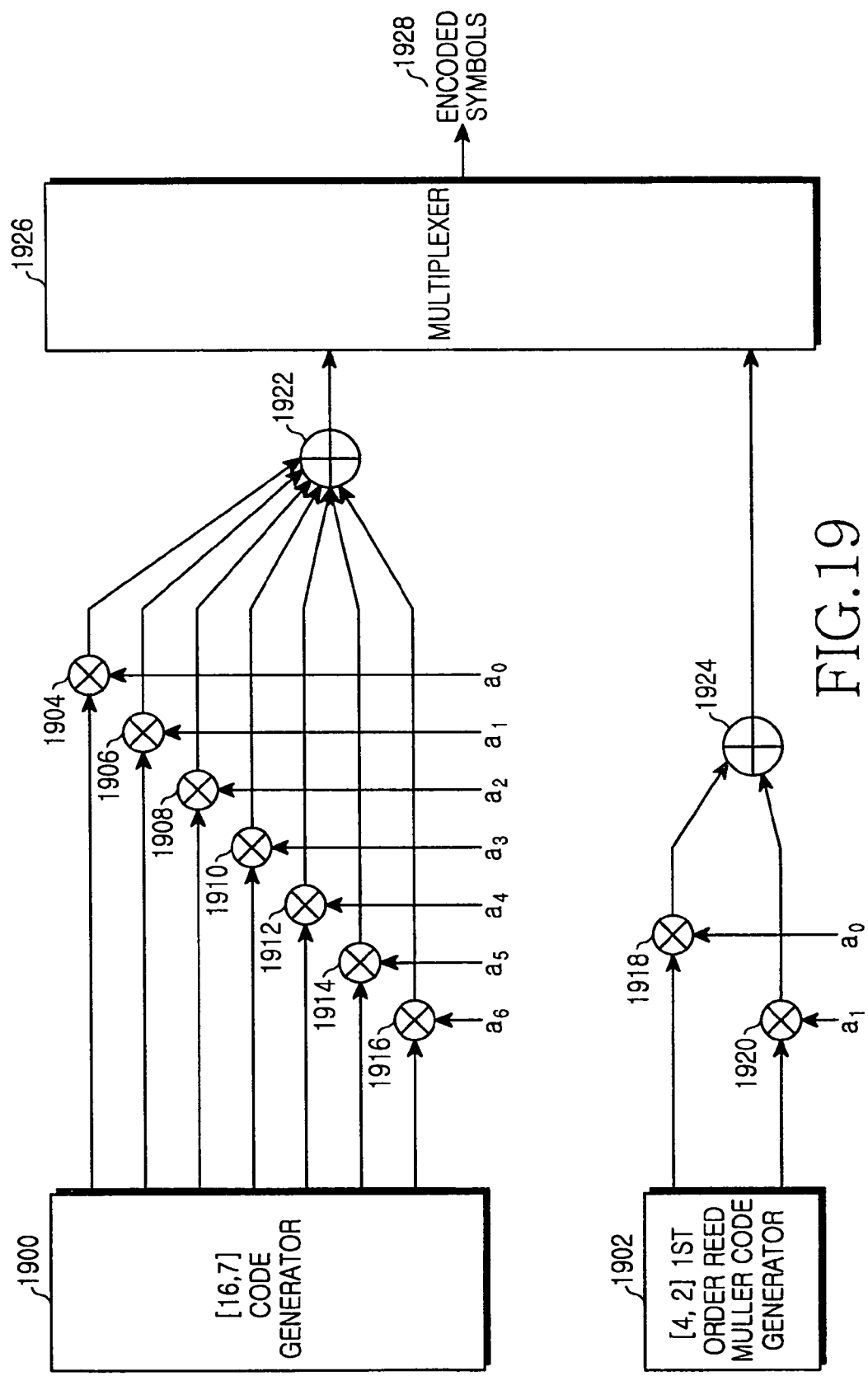
FIG. 19 illustrates a configuration of a [20, 7] encoder according to an embodiment of the present invention.

Referring to FIG. 19, when the seven control information bits $a_0 \sim a_6$ are input to the encoder, the information bits $a_0$, $a_1$, $a_2$, $a_3$, $a_4$, $a_5$ and $a_6$ are input to the corresponding first multipliers 1904, 1906, 1908, 1910, 1912, 1914 and 1916, respectively. Further, the information bits $a_0$ and $a_1$ are input to the corresponding second multipliers 1918 and 1920, respectively. Then, the [16, 7] code generator 1900 and the [4, 2] first order Reed Muller code generator 1902 generate the basis sequences as shown in Tables 22 and 23.

Specifically, the [16, 7] code generator 1900 generates '0010000', the first column of Table 22, in parallel. Then, the generated bits are sequentially input to the first multipliers 1904 through 1916, in which they are multiplied by the input information bits $a_0$, $a_1$, $a_2$, $a_3$, $a_4$, $a_5$ and $a_6$, and are then input to the first summer 1922. The first summer 1922 generates an encoded symbol by performing a modulo-2 addition for the seven input values and outputs the generated encoded symbol to the multiplexer 1926. This process is repeated up to '1111111', the last column of Table 22, so that 16 encoded symbols are input to the multiplexer 1926.

Simultaneously, the [4, 2] first order Reed Muller code generator 1902 generates '00', the first column of Table 23. Then, the generated bits are sequentially input to the second multipliers 1918 and 1920, in which they are multiplied by the input information bits $a_0$ and $a_1$, and are then input to the second summer 1924. The second summer 1924 generates an encoded symbol by performing a modulo-2 addition for the two input values and outputs the generated encoded symbol to the multiplexer 1926. This process is repeated for the four columns of Table 23, so that four encoded symbols are input to the multiplexer 1926.

Thereafter, the multiplexer 1926 multiplexes the 16 encoded symbols generated by the first summer 1922 and the four encoded symbols generated by the second summer 1924, thereby generating a codeword 1928 including 20 encoded symbols.

More specifically, the multiplier 1904 multiplies the first basis sequence of Table 22 by the information bit $a_0$ and outputs the product, the multiplier 1906 multiplies the second basis sequence by the information bit $a_1$ and outputs the product, the multiplier 1908 multiplies the third basis sequence by the information bit $a_2$ and outputs the product, the multiplier 1910 multiplies the fourth basis sequence by the information bit $a_3$ and outputs the product, the multiplier 1912 multiplies the fifth basis sequence by the information bit $a_4$ and outputs the product, the multiplier 1914 multiplies the sixth basis sequence by the information bit $a_5$ and outputs the product, and the multiplier 1916 multiplies the seventh basis sequence by the information bit $a_6$ and outputs the product. Then, the first summer 1922 adds the products output from the multipliers 1904 to 1916 for each symbol and thereby outputs 16 encoded symbols.

The multiplier 1918 multiplies the first basis sequence of Table 23 by the information bit $a_0$ and outputs the product, and the multiplier 1920 multiplies the second basis sequence by the information bit $a_1$ and outputs the product. Then, the second summer 1924 adds the products output from the multipliers 1918 and 1920 for each symbol and thereby outputs four encoded symbols. Finally, the multiplexer 1926 concatenates the symbols from the first summer 1922 and the symbols from the second summer 1924, thereby outputting 20 encoded symbols.

Figure 20:
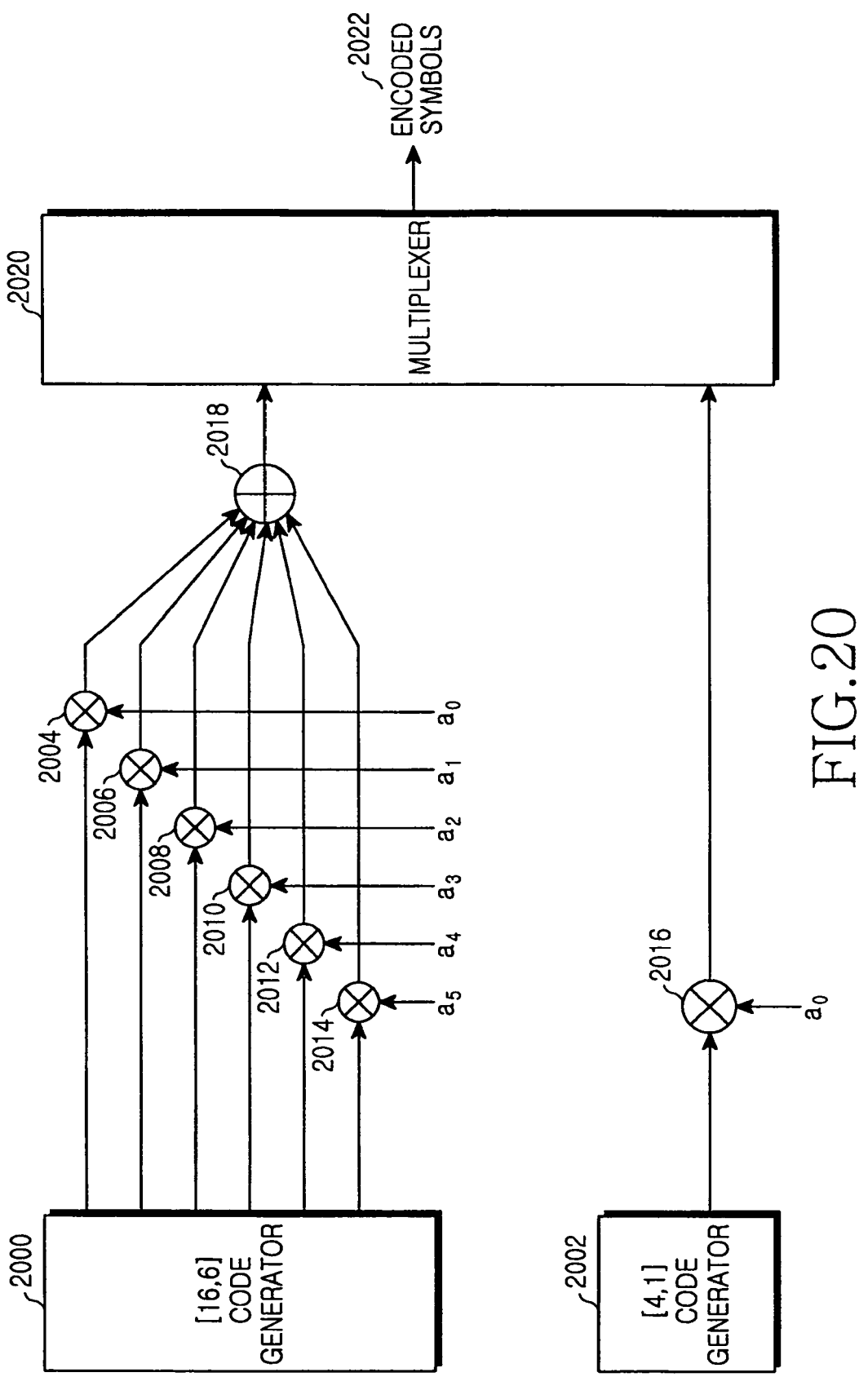
FIG. 20 illustrates a configuration of a [20, 6] encoder according to an embodiment of the present invention.

Exemplary Encoding of [20, 6] Equal Code in Accordance with an Embodiment of the Present Invention FIG. 20 illustrates a configuration of a [20, 6] encoder according to an embodiment of the present invention. The encoder of FIG. 20, which is an example of the channel encoders 218 and 219 shown in FIG. 2, converts 6 bits of control information into 20 encoded symbols by using the [20, 6] equal protection code. The basis sequences of the [20, 6] equal protection code are as shown in Table 27.

Referring to FIG. 20, when the six control information bits $a_0 \sim a_5$ are input to the encoder, the information bits $a_0$, $a_1$, $a_2$, $a_3$, $a_4$ and $a_5$ are input to the corresponding first multipliers 2004, 2006, 2008, 2010, 2012 and 2014, respectively. Further, the information bit $a_0$ is input to the corresponding second multiplier 2016. Then, the [16, 6] code generator 2000 and the [4, 1] first order Reed Muller code generator 2002 generate the basis sequences as shown in Tables 25 and 26.

Specifically, the [16, 6] code generator 2000 generates '010000', the first column of Table 25, in parallel. Then, the generated bits are sequentially input to the first multipliers 2004 through 2014, in which they are multiplied by the input information bits $a_0$, $a_1$, $a_2$, $a_3$, $a_4$ and $a_5$, and are then input to the summer 2018. The summer 2018 generates an encoded symbol by performing a modulo-2 addition for the six input values and outputs the generated encoded symbol to the multiplexer 2020. This process is repeated up to '111111', the last column of Table 25, so that 16 encoded symbols are input to the multiplexer 2020.

Simultaneously, the [4, 1] code generator 2002 generates '0', the first column of Table 26. Then, the generated bit is sequentially input to the second multiplier 2016, in which it is multiplied by the input information bit $a_0$, and is then output as an encoded symbol to the multiplexer 2020. For the four columns in Table 26, four encoded symbols are input to the multiplexer 2020.

Thereafter, the multiplexer 2020 multiplexes the 16 encoded symbols generated by the summer 2018 and the four encoded symbols generated by the second multiplier 2016, thereby generating a codeword 2022 including 20 encoded symbols.

More specifically, the multiplier 2004 multiplies the first basis sequence of Table 25 by the information bit $a_0$ and outputs the product, the multiplier 2006 multiplies the second basis sequence by the information bit $a_1$ and outputs the product, the multiplier 2008 multiplies the third basis sequence by the information bit $a_2$ and outputs the product, the multiplier 2010 multiplies the fourth basis sequence by the information bit $a_3$ and outputs the product, the multiplier 2012 multiplies the fifth basis sequence by the information bit $a_4$ and outputs the product, and the multiplier 2014 multiplies the sixth basis sequence by the information bit $a_5$ and outputs the product. Then, the summer 2018 adds the products output from the multipliers 2004 to 2014 for each symbol and thereby outputs 16 encoded symbols.

The second multiplier 2016 multiplies the first basis sequence of Table 26 by the information bit $a_0$ and outputs four encoded symbols. Then, the multiplexer 2020 concatenates the symbols from the summer 2018 and the symbols from the second multiplier 2016, thereby outputting 20 encoded symbols.

Figure 21:
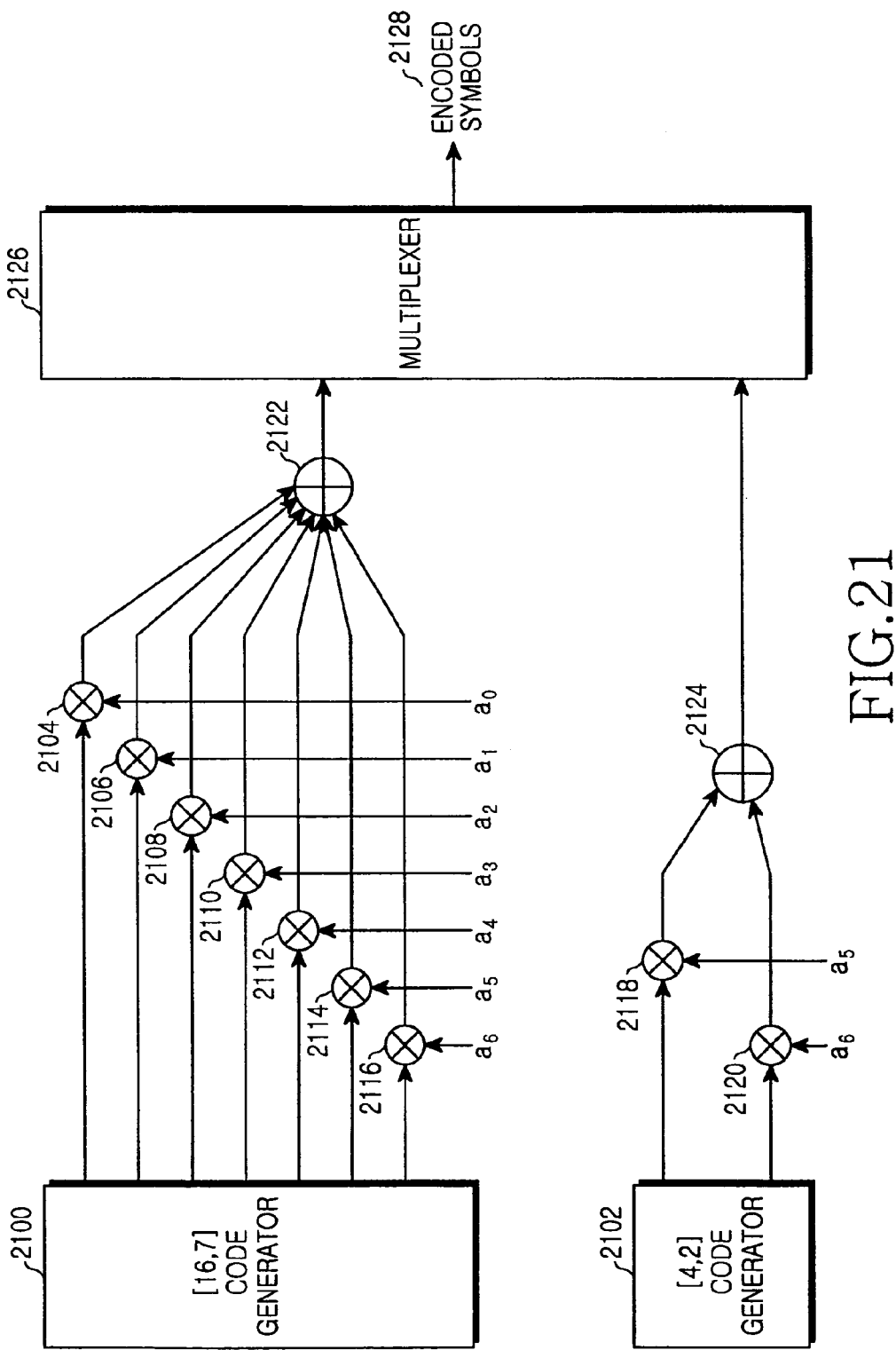
FIG. 21 illustrates a configuration of a [20, 7] encoder according to an embodiment of the present invention.

Exemplary Encoding of [20, 7] Unequal Protection Code in Accordance with an Embodiment of the Present Invention FIG. 21 illustrates a configuration of a [20, 7] encoder according to an embodiment of the present invention. The encoder of FIG. 21, which is an example of the channel encoders 218 and 219 shown in FIG. 2, converts 7 bits of control information into 20 encoded symbols by using the [20, 7] unequal protection code. The basis sequences of the [20, 7] unequal protection code are as shown in Table 30.

Referring to FIG. 21, when the seven control information bits $a_0 \sim a_6$ are input to the encoder, the information bits $a_0$, $a_1$, $a_2$, $a_3$, $a_4$, $a_5$ and $a_6$ are input to the corresponding first multipliers 2104, 2106, 2108, 2110, 2112, 2114 and 2116, respectively. Further, the information bits $a_5$ and $a_6$ are input to the corresponding second multipliers 2118 and 2120, respectively. Then, the [16, 7] code generator 2100 and the [4, 2] code generator 2102 generate the basis sequences as shown in Tables 28 and 29A.

Specifically, the [16, 7] code generator 2100 generates '1110001', the first column of Table 28, in parallel. Then, the generated bits are sequentially input to the first multipliers 2104 through 2116, in which they are multiplied by the input information bits $a_0$, $a_1$, $a_2$, $a_3$, $a_4$, $a_5$ and $a_6$, and are then input to the first summer 2122. The first summer 2122 generates an encoded symbol by performing a modulo-2 addition for the seven input values and outputs the generated encoded symbol to the multiplexer 2126. This process is repeatedly performed for all columns of Table 28, so that 16 encoded symbols are input to the multiplexer 2126.

Simultaneously, the [4, 2] first order Reed Muller code generator 2102 generates '01', the first column of Table 29A. Then, the generated bits are sequentially input to the second multipliers 2118 and 2120, in which they are multiplied by the input information bits $a_5$ and $a_6$, and are then input to the second summer 2124. The second summer 2124 generates an encoded symbol by performing a modulo-2 addition for the two input values and outputs the generated encoded symbol to the multiplexer 2126. This process is repeated for the four columns of Table 29A, so that four encoded symbols are input to the multiplexer 2126.

Thereafter, the multiplexer 2126 multiplexes the 16 encoded symbols generated by the first summer 2122 and the four encoded symbols generated by the second summer 2124, thereby generating a codeword 2128 including 20 encoded symbols.

Figure 22:
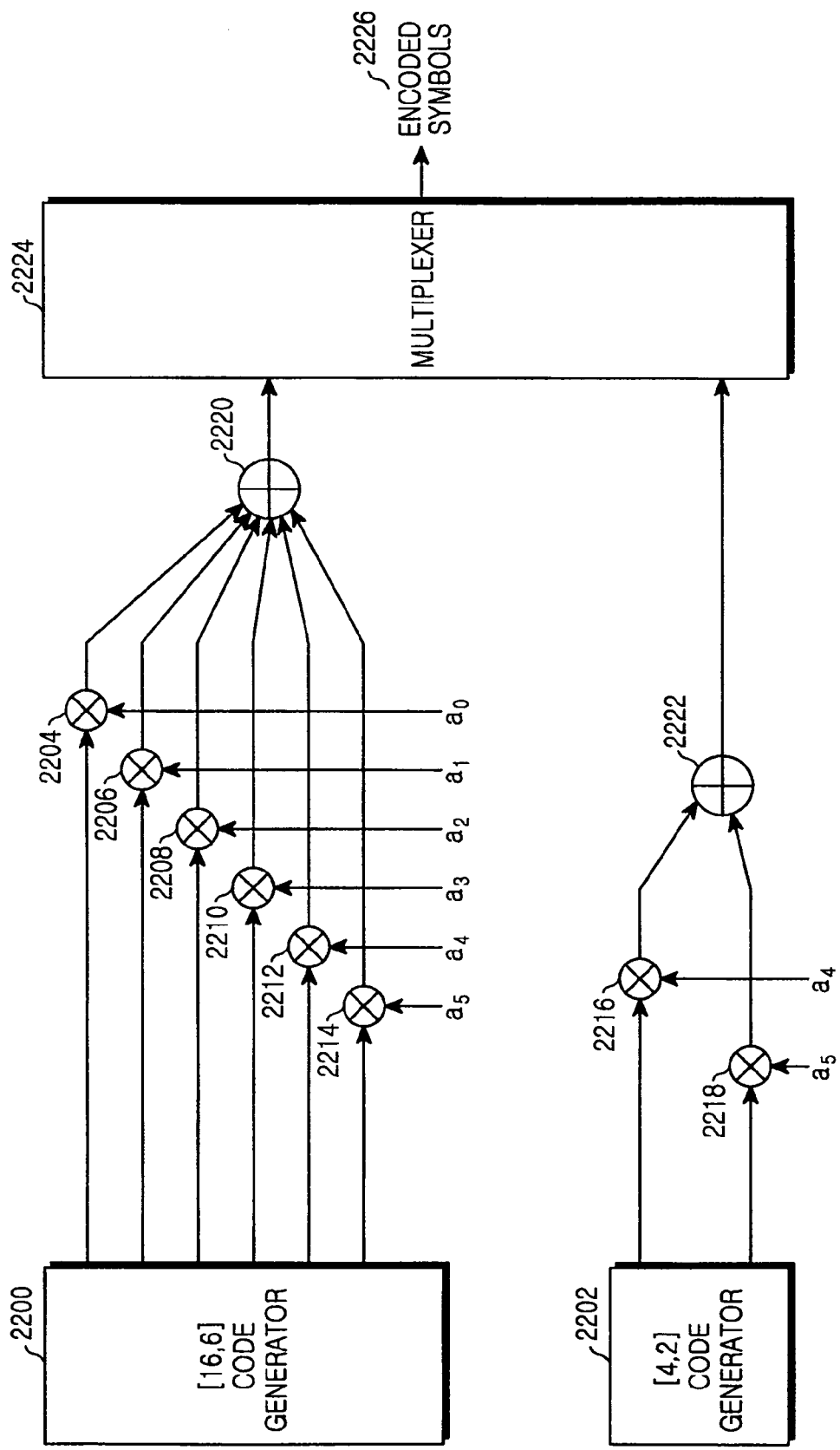
FIG. 22 illustrates a configuration of a [20, 6] encoder according to an embodiment of the present invention.

Exemplary Encoding of [20, 6] Unequal Protection Code in Accordance with an Embodiment of the Present Invention FIG. 22 illustrates a configuration of a [20, 6] encoder according to an embodiment of the present invention. The encoder of FIG. 22, which is an example of the channel encoders 218 and 219 shown in FIG. 2, converts six scheduling information bits into 40 encoded symbols by using the [20, 6] unequal protection code. The basis sequences of the [20, 6] unequal protection code are as shown in Table 16.

Referring to FIG. 22, when the six scheduling information bits $a_0 \sim a_5$ are input to the encoder, the information bits $a_0$, $a_1$, $a_2$, $a_3$, $a_4$ and $a_5$ are input to the corresponding first multipliers 2204, 2206, 2208, 2210, 2212 and 2214, respectively. Further, the information bits $a_4$ and $a_5$ are input to the corresponding second multipliers 2216 and 2218, respectively. When the six information bits have been input in the manner described above, the [16, 6] code generator 2200 and the [4, 2] code generator 2202 generate the basis sequences as shown in Tables 31 and 29A.

Specifically, the [16, 6] code generator 2200 generates '110001', the first column of Table 31, in parallel. Then, the generated bits are sequentially input to the first multipliers 2204, 2206, 2208, 2210, 2212 and 2214, in which they are multiplied by the input information bits $a_0$, $a_1$, $a_2$, $a_3$, $a_4$ and $a_5$, and are then input to the first summer 2220. The first summer 2220 generates an encoded symbol by performing a modulo-2 addition for the six input values and outputs the generated encoded symbol to the multiplexer 2224. This process is repeatedly performed for all columns of Table 31, so that 16 encoded symbols are input to the multiplexer 2224.

Simultaneously, the [4, 2] code generator 2202 generates '01', the first column of Table 29A. Then, the generated bits are sequentially input to the second multipliers 2216 and 2218, in which they are multiplied by the input information bits $a_4$ and $a_5$, respectively, and are then input to the second summer 2222. The second summer 2222 generates an encoded symbol by performing a modulo-2 addition for the two input values and outputs the generated encoded symbol to the multiplexer 2224. This process is repeatedly performed for all columns of Table 29A, so that four encoded symbols are input to the multiplexer 2224.

Thereafter, the multiplexer 2224 multiplexes the 16 encoded symbols generated by the first summer 2220 and the four encoded symbols generated by the second summer 2222, thereby generating a codeword 2226 including 20 encoded symbols.

Figure 23:
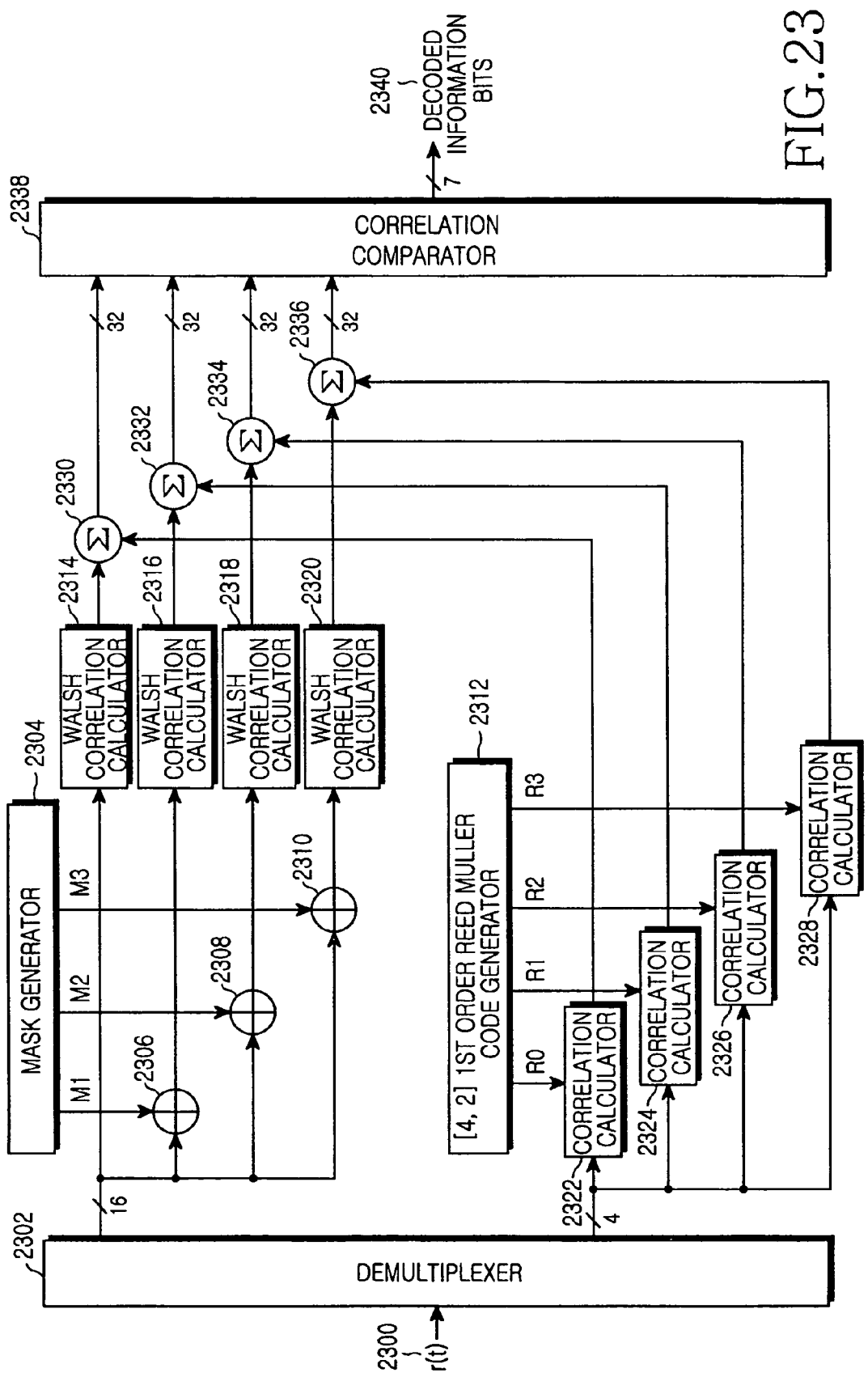
FIG. 23 illustrates a configuration of a [20, 7] decoder according to an embodiment of the present invention.

Exemplary Decoding of [20, 7] Equal Protection Code in Accordance with an Embodiment of the Present Invention FIG. 23 illustrates a configuration of a decoder according to an embodiment of the present invention. The decoder of FIG. 23, which is an example of the channel decoders 316 314 shown in FIG. 3 and corresponds to the encoders of FIG. 19, decodes seven bits of control information from the 20 encoded symbols.

Referring to FIG. 23, the received signal r(t) 2300 including the 20 encoded symbols is divided into 16 higher symbols and eight lower symbols by the demultiplexer 2302. The 16 higher symbols are input to three adders 2306, 2308 and 2310 and the first Walsh correlation calculator 2314. The received signal r(t) 2300 is a signal having passed through a channel after being encoded by the [16, 7] code and the [4, 2] first order Reed Muller code in the channel encoder having the configuration as shown in FIG. 19.

The mask generator 2304 generates three mask sequences M1, M2 and M3 according to the [16, 7] code used in the channel encoder and outputs them to the adders 2306, 2308 and 2310, respectively. The three mask sequences M1, M2 and M3 are three orderly arranged sequences except for the all-zero sequence from among four codewords generated by a linear combination of the first and second codewords in Table 22. That is, the three mask sequences M1, M2 and M3 are comprised as follows:

M1="0110001111110101",

M2="0111111000101011", and

M3="0001110111011110".

The first adder 2306 adds the 16 higher symbols from the demultiplexer 2302 and the mask sequence M1 from the mask generator 2304 by modulo-2 addition and outputs the resultant symbols to the second Walsh correlation calculator 2316. The second adder 2308 adds the 16 higher symbols and the mask sequence M2 from the mask generator 2304 by modulo-2 addition and outputs the resultant symbols to the third Walsh correlation calculator 2318. The third adder 2310 adds the 16 higher symbols and the mask sequence M3 from the mask generator 2304 by modulo-2 addition and outputs the resultant symbols to the fourth Walsh correlation calculator 2320. As noted from the above descriptions, the decoder comprises as many adders 2306 to 2310 as mask sequences, and each of the adders 2306 to 2310 generates unmasked symbols by adding the 16 higher symbols and the corresponding mask sequence by modulo-2 addition, and then outputs the unmasked symbols to the corresponding Walsh correlation calculator 2316 to 2320.

If the 16 higher symbols have been encoded by the combination of the basis mask sequences, one of the outputs of the adders 2306 to 2310 is expected to be a signal from which the mask sequence has been removed. For example, if the information bits have been encoded by using the mask sequence M2, the output of the second adder 2308, which is a result of the addition of the M2 and the 16 higher symbols, is expected to be the signal from which the mask sequence has been removed. The signal from which the mask sequence has been removed is a signal spread by a predetermined Walsh code.

The first Walsh correlation calculator 2314 correlates the 16 higher symbols from the demultiplexer 2302 with 32 bi-orthogonal Walsh codes and thereby outputs 32 correlation values to the first summer 2330. The second Walsh correlation calculator 2316 correlates the symbols from the first adder 2306 with the 32 bi-orthogonal Walsh codes and thereby outputs 32 correlation values to the second summer 2332. The third Walsh correlation calculator 2318 correlates the symbols from the second adder 2308 with the 32 bi-orthogonal Walsh codes and thereby outputs 32 correlation values to the third summer 2334. The fourth Walsh correlation calculator 2320 correlates the symbols from the third adder 2310 with the 32 bi-orthogonal Walsh codes and thereby outputs 32 correlation values to the fourth summer 2336.

In this manner, each of the Walsh correlation calculators 2314 to 2320 correlates 16 input symbols with 32 bi-orthogonal Walsh codes and thereby outputs 32 correlation values to the corresponding summers 2330 to 2336. The 32 bi-orthogonal Walsh codes correspond to all Walsh codes which can be generated by combination of four basis Walsh codes having a length of 16 and the all-one sequence. FIG. 24 shows Walsh codes preferably used for the calculation of the correlation values in the Walsh correlation calculators 2314 to 2320.

In FIG. 24, W2, W3, W5 and W9 are basis Walsh codes and W17 is the all-one sequence. Combination of the basis Walsh codes and the all-one sequence generates 32 Walsh codes as shown in FIG. 24. Meanwhile, the Walsh correlation calculators 2314 to 2320 preferably use IFHT in order to achieve rapid calculation of correlation with the 32 Walsh codes.

The four lower symbols divided by the demultiplexer 2302 are input to the correlation calculators 2322, 2324, 2326, and 2328. The [4, 2] first order Reed Muller code generator 2312 generates first order Reed Muller codewords R0, R1, R2 and R3 and outputs them to the correlation calculators 2322 to 2328. The four codewords R0, R1, R2 and R3 are codewords of the [4, 2] first order Reed Muller code used in the channel encoder, which are generated by sequentially arranging four codewords formed through a linear combination of the two codewords of Table 23. That is, R0=[0000], R1=[0011], R2=[0101], and R3=[0110].

The first correlation calculator 2322 calculates the correlation value of the first order Reed Muller code R0 and the four lower symbols from the demultiplexer 2302 and outputs the calculated correlation value to the first summer 2330. The second correlation calculator 2324 calculates the correlation value of the first order Reed Muller code R1 and the four lower symbols and outputs the calculated correlation value to the second summer 2332. The third correlation calculator 2326 calculates the correlation value of the first order Reed Muller code R2 and the four lower symbols and outputs the calculated correlation value to the third summer 2334. The fourth correlation calculator 2328 calculates the correlation value of the first order Reed Muller code R3 and the four lower symbols and outputs the calculated correlation value to the fourth summer 2336. The decoder comprises as many correlation calculators 2322 to 2328 as codewords of the [4, 2] first order Reed Muller code, and each of the correlation calculators 2322 to 2328 correlates the four input lower symbols and the corresponding first order Reed Muller codeword and thereby outputs the correlation value to the corresponding summers 2330 to 2336. The correlation calculators 2322 to 2328 preferably use IFHT in order to achieve rapid calculation of correlation with the first order Reed Muller codewords R0, R1, R2 and R3.

The first summer 2330 adds the correlation value from the first correlation calculator 2322 to each of the 32 correlation values from the first Walsh correlation calculator 2314 and thereby outputs 32 added correlation values to the correlation comparator 2338. The second summer 2332 adds the correlation value from the second correlation calculator 2324 to each of the 32 correlation values from the second Walsh correlation calculator 2316 and thereby outputs 32 added correlation values to the correlation comparator 2338. The third summer 2334 adds the correlation value from the third correlation calculator 2326 to each of the 32 correlation values from the third Walsh correlation calculator 2318 and thereby outputs 32 added correlation values to the correlation comparator 2338. The fourth summer 2336 adds the correlation value from the fourth correlation calculator 2328 to each of the 32 correlation values from the fourth Walsh correlation calculator 2320 and thereby outputs 32 added correlation values to the correlation comparator 2338. As a result, a total of 128 correlation values generated by the summers 2330 to 2336 are input to the correlation comparator 2338.

The correlation comparator 2338 compares the 128 correlation values input from the summers 2330 to 2336 and determines the maximum correlation value from among the 128 correlation values. When the maximum correlation value has been determined, the correlation comparator 2338 determines and outputs seven decoded information bits 2340 based on the [4, 2] first order Reed Muller code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M2 and the Walsh code corresponding to the maximum correlation value is W4, the decoded information bits are determined as "(index corresponding to M2)//(index corresponding to W4)", wherein '//' implies concatenation.

For example, where the seven information bits $a_0$ to $a_6$ are '0100011', the channel encoder encodes the information bits into "M2⊕W4//R2" and then transmits the encoded information bits. In the encoded information bits, ⊕ implies modulo-2 addition. In the channel decoder, the received signal r(t) 2300 encoded into "M2⊕W4//R2" is divided into an "M2⊕W4" related part and an "R2" related part by the demultiplexer 2302. Then, the "M2⊕W4" related part which includes the 16 higher symbols is added to the all mask sequences by modulo-2 addition, and the added values are correlated with the 32 bi-orthogonal Walsh codes, so that a total of 128 correlation values are generated.

Further, the "R2" related part which includes the four lower symbols is correlated with all codewords of the [4, 2] first order Reed Muller code, so that four correlation values are obtained. Then, the four correlation values and the 128 correlation values are summed according to a predetermined rule, so that 128 added correlation values are obtained. Then, it is confirmed that the received signal r(t) has been encoded by M2, W4 and R2, that is, by the Walsh code index, mask sequence index and [4, 2] first order Reed Muller code index corresponding to the maximum value among the 128 added correlation values. Upon confirming that the received signal r(t) has been encoded by M2, W4 and R2, the channel decoder combines '00011' (the index corresponding to the W4) and '01' (the index corresponding to the M2), thereby outputting '0100011' as the decoded information bits.

A reason why the information bit column is determined by summing the result of decoding the [16, 7] code and the result of decoding the [4, 2] first order Reed Muller code is in order to achieve an exact decoding result by satisfying the minimum distance '8'. When the channel state is good, it is possible to obtain the information bit column by decoding only the [16, 7] code. However, it is substantially impossible to obtain an exact decoding result when the channel state is not good, because the minimum distance of the [16, 7] code is '6'. Therefore, both the [16, 7] code and the [4, 2] first order Reed Muller code are decoded, and the information bit column is determined from the combination of the decoding results for both codes.

Figure 25:
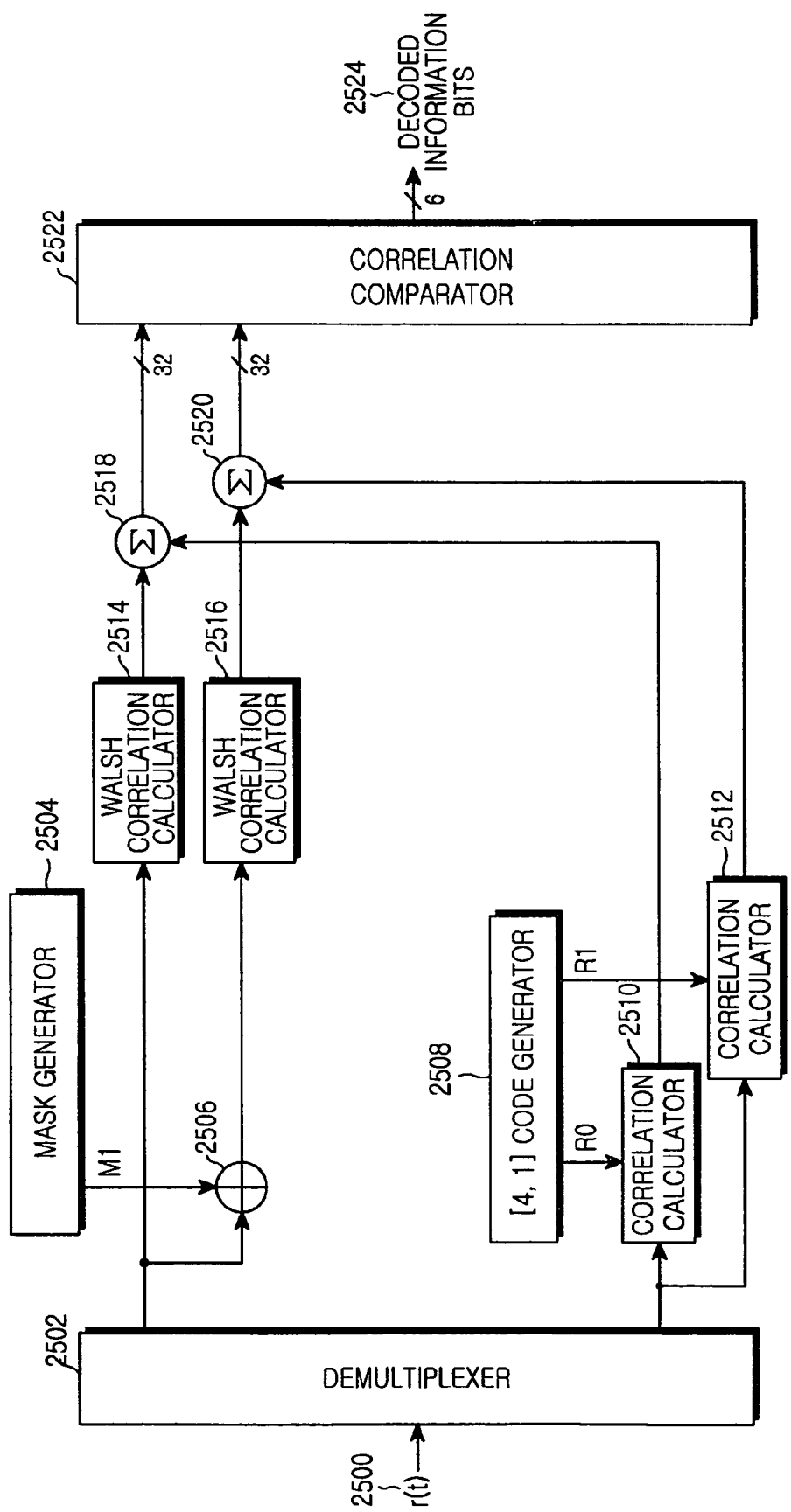
FIG. 25 illustrates a configuration of a [20, 6] decoder according to an embodiment of the present invention.

Exemplary Decoding of [20, 6] Equal Protection Code in Accordance with an Embodiment of the Present Invention FIG. 25 illustrates a configuration of a decoder according to an embodiment of the present invention. The decoder of FIG. 25, which is an example of the channel decoders 316 and 314 shown in FIG. 3 and corresponds to the encoders of FIG. 20, decodes six control information bits from the 20 encoded symbols.

Referring to FIG. 25, the received signal r(t) 2500 including the 20 encoded symbols, is divided into 16 higher symbols and eight lower symbols by the demultiplexer 2502. The 16 higher symbols are input to the adder 2506 and the first Walsh correlation calculator 2514. The received signal r(t) 2500 is a signal having passed through a channel after being encoded by the [16, 6] code and the [4, 1] code in the channel encoder having the configuration as shown in FIG. 20.

The mask generator 2504 generates one mask sequence M1 according to the [16, 6] code used in the channel encoder and outputs it to the adder 2506. The mask sequence M1 is the first codeword in Table 25. That is, M1="0111111000101011".

The adder 2506 adds the 16 higher symbols from the demultiplexer 2502 and the mask sequence M1 from the mask generator 2504 by modulo-2 addition and outputs the generated unmasked symbols to the second Walsh correlation calculator 2516. If the 16 higher symbols have been encoded by the combination of the basis mask sequences, the output of the adder 2506 is expected to be a signal from which the mask sequence has been removed. The signal from which the mask sequence has been removed is a signal encoded by one of the Walsh codes in FIG. 24.

The first Walsh correlation calculator 2514 correlates the 16 higher symbols from the demultiplexer 2502 with 32 bi-orthogonal Walsh codes and thereby outputs 32 correlation values to the first summer 2518. The second Walsh correlation calculator 2516 correlates the symbols from the adder 2506 with the 32 bi-orthogonal Walsh codes and thereby outputs 32 correlation values to the second summer 2520. The Walsh correlation calculators 2514 and 2516 preferably use IFHT in order to achieve rapid calculation of correlation with the 32 Walsh codes.

The four lower symbols divided by the demultiplexer 2502 are input to the correlation calculators 2510 and 2512. The [4, 1] code generator 2508 generates codewords R0 and R1 and outputs them to the correlation calculators 2510 and 2512. The two codewords R0 and R1 are codewords of the [4, 1] code used in the channel encoder, which are generated by sequentially arranging two codewords formed through a linear combination of the codewords of Table 26. That is, R0=[0000] and R1=[0101].

The first correlation calculator 2510 calculates the correlation value of the code R0 and the four lower symbols from the demultiplexer 2502 and outputs the calculated correlation value to the first summer 2518. The second correlation calculator 2512 calculates the correlation value of the code R1 and the four lower symbols and outputs the calculated correlation value to the second summer 2520. The decoder comprises as many correlation calculators 2510 and 2512 as codewords of the [4, 1] code, and each of the correlation calculators 2510 and 2512 correlates the four input lower symbols and the corresponding codeword of the [4, 1] code and thereby outputs the correlation value to the corresponding summers 2518 and 2520, respectively.

The first summer 2518 adds the correlation value from the first correlation calculator 2510 to each of the 32 correlation values from the first Walsh correlation calculator 2514 and thereby outputs 32 added correlation values to the correlation comparator 2522. The second summer 2520 adds the correlation value from the second correlation calculator 2512 to each of the 32 correlation values from the second Walsh correlation calculator 2516 and thereby outputs 32 added correlation values to the correlation comparator 2522. As a result, a total of 64 correlation values generated by the summers 2518 and 2520 are input to the correlation comparator 2522.

The correlation comparator 2522 compares the 64 correlation values input from the summers 2518 and 2520 and determines the maximum correlation value from among the 64 correlation values. When the maximum correlation value has been determined, the correlation comparator 2522 determines and outputs six decoded information bits 2524 based on the [4, 1] code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M1 and the Walsh code corresponding to the maximum correlation value is W4, the decoded information bits are determined as "(index corresponding to M1)//(index corresponding to W4)".

For example, where the six information bits $a_0$ to $a_5$ are '100011', the channel encoder encodes the information bits into "M1⊚W4//R1" and then transmits the encoded information bits. In the channel decoder, the received signal r(t) 2500 encoded into "M1⊚W4//R1" is divided into an "M1⊚W4" related part and an "R1" related part by the demultiplexer 2502. Then, the "M1⊚W4" related part which includes the 16 higher symbols is added to the all mask sequences by modulo-2 addition, and the added values are correlated with the 32 bi-orthogonal Walsh codes, so that a total of 64 correlation values are generated.

Further, the "R2" related part which includes the four lower symbols is correlated with all codewords of the [4, 1] code, so that two correlation values are obtained. Then, the two correlation values and the 64 correlation values are summed according to a predetermined rule, so that 64 added correlation values are obtained. Then, it is confirmed that the received signal r(t) has been encoded by M1, W4 and R1, that is, by the Walsh code index, mask sequence index and [4, 1] code index corresponding to the maximum value among the 64 added correlation values. Upon confirming that the received signal r(t) has been encoded by M1, W4 and R1, the channel decoder combines '00011' (the index corresponding to the W4) and '1' (the index corresponding to the M1), thereby outputting '100011' as the decoded information bits.

Figure 26:
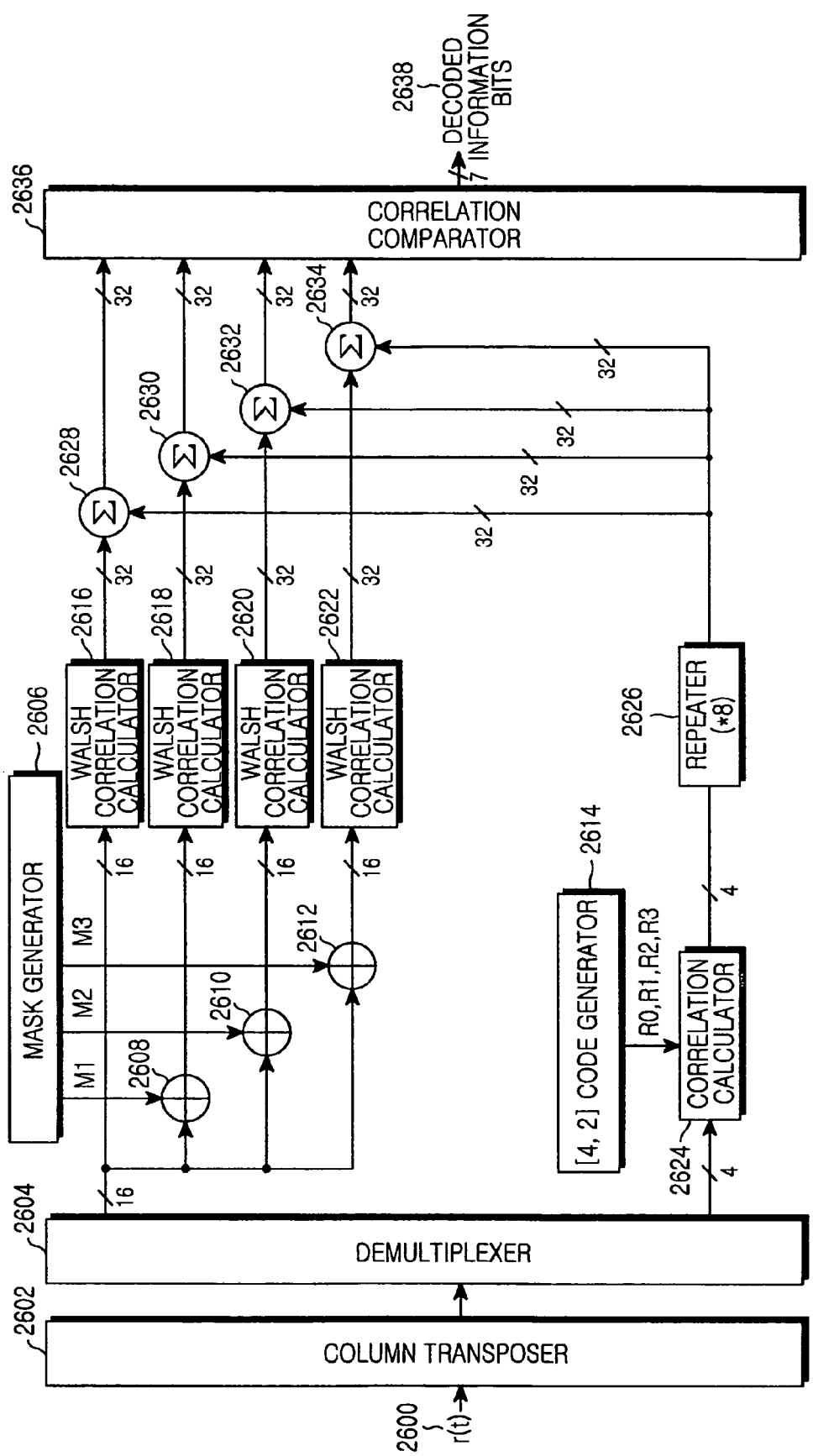
FIG. 26 illustrates a configuration of a [20, 7] decoder according to an embodiment of the present invention.

Exemplary Decoding of [20, 7] Unequal Protection Code in Accordance with an Embodiment of the Present Invention FIG. 26 illustrates a configuration of a [20, 7] decoder according to an embodiment of the present invention. The decoder of FIG. 26, which is an example of the channel decoders 316 and 314 shown in FIG. 3 and corresponds to the encoders of FIG. 21, decodes seven control information bits from the 20 encoded symbols.

Referring to FIG. 26, for the received signal r(t) 2600 including 20 encoded symbols, the column transposer 2602 moves the sixteenth symbol to the position of the first symbol, shifts each of the first to fifteenth symbols backward by one symbol position, and keeps the seventeenth to twentieth symbols at their original locations. The 20 column-transposed encoded symbols are divided into 16 higher symbols and eight lower symbols by the demultiplexer 2604. The 16 higher symbols are input to three adders 2608, 2610 and 2612 and the first Walsh correlation calculator 2616. The received signal r(t) 2600 is a signal having passed through a channel after being encoded by the [16, 7] code and the [4, 2] code in the channel encoder having the configuration as shown in FIG. 21.

The mask generator 2606 generates three mask sequences M1, M2 and M3 according to the [16, 7] code used in the channel encoder, and outputs them to the adders 2608, 2610 and 2612. The three mask sequences M1, M2 and M3 are three orderly arranged sequences except for the all-zero sequence from among four codewords generated by transposing the first and second codewords in Table 28 in the same manner as the column transposition rule used by the column transposer 2602, and then linearly combining the first and second codewords. That is,

M1="0111111000101011",

M2="0110001111110101", and

M3="0001110111011110".

The first adder 2608 adds the 16 higher symbols from the demultiplexer 2604 and the mask sequence M1 from the mask generator 2606 by modulo-2 addition and outputs the resultant symbols to the second Walsh correlation calculator 2618. The second adder 2610 adds the 16 higher symbols and the mask sequence M2 from the mask generator 2606 by modulo-2 addition and outputs the resultant symbols to the third Walsh correlation calculator 2620. The third adder 2612 adds the 16 higher symbols and the mask sequence M3 from the mask generator 2606 by modulo-2 addition and outputs the resultant symbols to the fourth Walsh correlation calculator 2622.

If the 16 higher symbols have been encoded by the combination of the basis mask sequences, one of the unmasked outputs of the adders 2608 to 2612 is expected to be a signal from which the mask sequence has been removed. The signal from which the mask sequence has been removed is a signal spread by a predetermined Walsh code.

The first Walsh correlation calculator 2616 correlates the 16 higher symbols from the demultiplexer 2604 with 32 bi-orthogonal Walsh codes and thereby outputs 32 correlation values to the first summer 2628. The second Walsh correlation calculator 2618 correlates the symbols from the first adder 2608 with the 32 bi-orthogonal Walsh codes and thereby outputs 32 correlation values to the second summer 2630. The third Walsh correlation calculator 2620 correlates the symbols from the second adder 2610 with the 32 bi-orthogonal Walsh codes and thereby outputs 32 correlation values to the third summer 2632. The fourth Walsh correlation calculator 2622 correlates the symbols from the third adder 2612 with the 32 bi-orthogonal Walsh codes and thereby outputs 32 correlation values to the fourth summer 2634.

In this manner, each of the Walsh correlation calculators 2616 to 2622 correlates 16 input symbols with 32 bi-orthogonal Walsh codes, and thereby outputs 32 correlation values to the corresponding summers 2628 to 2634. The 32 bi-orthogonal Walsh codes correspond to all Walsh codes which can be generated by combination of four basis Walsh codes having a length of 16 and the all-one sequence. FIG. 24 shows Walsh codes preferably used for the calculation of the correlation values in the Walsh correlation calculators 2616 to 2622. The Walsh correlation calculators 2616 to 2622 preferably use IFHT in order to achieve rapid calculation of correlation with the 32 Walsh codes.

The four lower symbols divided by the demultiplexer 2604 are input to the correlation calculator 2624. The [4, 2] code generator 2614 generates codewords R0, R1, R2 and R3 and outputs them to the correlation calculator 2624. The four codewords R0, R1, R2 and R3 are codewords of the [4, 2] code used in the channel encoder, which are generated by sequentially arranging four codewords formed through a linear combination of the two codewords of Table 29A. That is, R0=[0000], R1=[0001], R2=[1110], and R3=[1111].

The correlation calculator 2624 correlates the four lower symbols from the demultiplexer 2604 with each of the codewords R0, R1, R2 and R3 of the [4, 2] code, and outputs the calculated correlation value to the repeater 2626. The repeater 2626 sequentially repeats each of the correlation values corresponding to the codewords R0, R1, R2 and R3 eight times, and thereby outputs a total of 32 correlation values to the summers 2628 to 2634.

The first summer 2628 adds the 32 correlation values from the repeater 2626 to each of the 32 correlation values from the first Walsh correlation calculator 2616 and thereby outputs 32 added correlation values to the correlation comparator 2636. The second summer 2630 adds the 32 correlation values from the repeater 2626 to each of the 32 correlation values from the second Walsh correlation calculator 2618 and thereby outputs 32 added correlation values to the correlation comparator 2636. The third summer 2632 adds the 32 correlation values from the repeater 2626 to each of the 32 correlation values from the third Walsh correlation calculator 2620 and thereby outputs 32 added correlation values to the correlation comparator 2636. The fourth summer 2634 adds the 32 correlation values from the repeater 2626 to each of the 32 correlation values from the fourth Walsh correlation calculator 2622 and thereby outputs 32 added correlation values to the correlation comparator 2636. As a result, a total of 128 correlation values generated by the summers 2628 to 2634 are input to the correlation comparator 2636.

The correlation comparator 2636 compares the 128 correlation values input from the summers 2628 to 2634 and determines the maximum correlation value from among the 128 correlation values. When the maximum correlation value has been determined, the correlation comparator 2636 determines and outputs seven decoded information bits 2638 based on the [4, 2] code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M1 and the Walsh code corresponding to the maximum correlation value is W4, the decoded information bits are determined as "(index corresponding to M1)//(index corresponding to W4)".

For example, where the seven information bits $a_0$ to $a_6$ are '1011000', the channel encoder encodes the information bits into "Π(M1⊕W4)//R0" and then transmits the encoded information bits. In the encoded information bits, "Π" implies a reverse operation of the column transposer 2602, in which the first symbol is moved to the sixteenth symbol location and the second to sixteenth symbols are moved forward to the locations of the first to fifteenth symbols. In the channel decoder, the received signal r(t) 2600 encoded into "Π(M1⊕W4)//R0" is divided into an "M1⊕W4" related part and an "R0" related part by the demultiplexer 2604. Then, the "M1⊕W4" related part which includes the 16 higher symbols is added to the all mask sequences by modulo-2 addition, and the added values are correlated with the 32 bi-orthogonal Walsh codes, so that a total of 128 correlation values are generated.

Further, the "R0" related part which includes the four lower symbols is correlated with all codewords of the [4, 2] code, so that four correlation values are obtained. Then, the four correlation values are repeated in the repeater 2626 and are then added to the 128 correlation values according to a predetermined rule, so that 128 added correlation values are obtained. Then, it is confirmed that the received signal r(t) has been encoded by M1, W4 and R0, that is, by the Walsh code index, mask sequence index and [4, 2] code index corresponding to the maximum value among the 128 added correlation values. Upon confirming that the received signal r(t) has been encoded by M1, W4 and R0, the channel decoder combines '10' (the index corresponding to the M1) with '11000' (the index corresponding to the W4), thereby outputting '1011000' as the decoded information bits.

A reason why the information bit column is determined by summing the result of decoding the [16, 7] code and the result of decoding the [4, 2] code is in order to provide the higher error correcting capability to the seventh and sixth higher bits of the control information.

Figure 27:
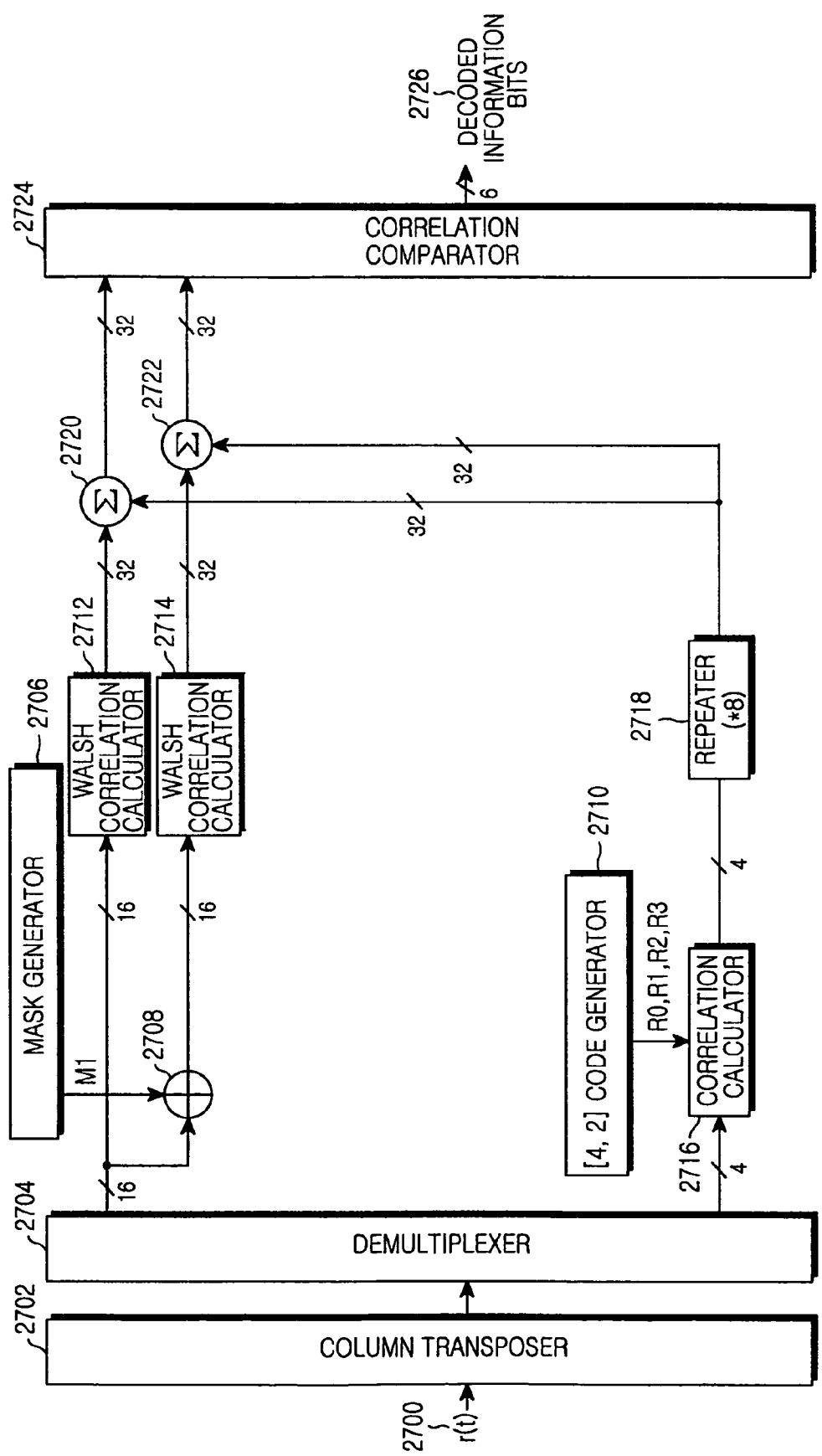
FIG. 27 illustrates a configuration of a [20, 6] decoder according to an embodiment of the present invention.

Exemplary Decoding of [20, 6] Unequal Protection Code in Accordance with an Embodiment of the Present Invention FIG. 27 illustrates a configuration of a [20, 6] decoder according to an embodiment of the present invention. The decoder of FIG. 27, which is an example of the channel decoders 316 and 314 shown in FIG. 3 and corresponds to the encoders of FIG. 22, restores six control information bits from the 20 encoded symbols.

Referring to FIG. 27, for the received signal r(t) 2700 including 20 encoded symbols, the column transposer 2702 moves the sixteenth symbol to the position of the first symbol, shifts each of the first to fifteenth symbols backward by one symbol, and keeps the seventeenth to twentieth symbols at their original locations. The 20 column-transposed encoded symbols are divided into 16 higher symbols and four lower symbols by the demultiplexer 2704. The 16 higher symbols are input to the adder 2708 and the first Walsh correlation calculator 2712. The received signal r(t) 2700 is a signal having passed through a channel after being encoded by the [16, 6] code and the [4, 2] code in the channel encoder having the configuration as shown in FIG. 22.

The mask generator 2706 generates one mask sequence M1 according to the [16, 6] code used in the channel encoder and outputs it to the adder 2708. The mask sequence M1 is the first codeword in Table 31, which has been column-transposed in the same manner as the column transposition rule used by the column transposer 2702. That is, M1="0110001111110101".

The adder 2708 adds the 16 higher symbols from the demultiplexer 2704 and the mask sequence M1 from the mask generator 2706 by modulo-2 addition and outputs the 16 generated symbols to the second Walsh correlation calculator 2714. If the 16 higher symbols have been encoded by the combination of the basis mask sequences, the unmasked output of the adder 2708 is expected to be a signal from which the mask sequence has been removed. The signal from which the mask sequence has been removed is a signal encoded by one of the 32 Walsh codes in FIG. 24.

The first Walsh correlation calculator 2712 correlates the 16 higher symbols from the demultiplexer 2704 with 32 bi-orthogonal Walsh codes and thereby outputs 32 correlation values to the first summer 2720. The second Walsh correlation calculator 2714 correlates the symbols from the adder 2708 with the 32 bi-orthogonal Walsh codes and thereby outputs 32 correlation values to the second summer 2722. In this way, each of the Walsh correlation calculators 2712 and 2714 correlates 16 input symbols with 32 bi-orthogonal Walsh codes and thereby outputs 32 correlation values to the corresponding summers 2720 and 2722. The Walsh correlation calculators 2712 and 2714 preferably use IFHT in order to achieve rapid calculation of correlation with the 32 Walsh codes.

The four lower symbols divided by the demultiplexer 2704 are input to the correlation calculator 2716. The [4, 2] code generator 2710 generates codewords R0, R1, R2 and R3 and outputs them to the correlation calculator 2716. The four codewords R0, R1, R2 and R3 are codewords of the [4, 2]

code used in the channel encoder, which are generated by sequentially arranging four codewords formed through a linear combination of the two codewords of Table 29A. That is, R0=[0000], R1=[0001], R2=[1110] and R3=[1111].

The correlation calculator 2716 correlates the four lower symbols from the demultiplexer 2704 with each of the codewords R0, R1, R2 and R3 of the [4, 2] code and outputs the calculated correlation value to the repeater 2718. The repeater 2718 sequentially repeats each of the correlation values corresponding to the codewords R0, R1, R2 and R3 eight times and thereby outputs a total of 32 correlation values to the summers 2720 and 2722.

The first summer 2720 adds the 32 correlation values from the repeater 2718 to the 32 correlation values from the first Walsh correlation calculator 2712 and thereby outputs 32 added correlation values to the correlation comparator 2724. The second summer 2722 adds the 32 correlation values from the repeater 2718 to the 32 correlation values from the second Walsh correlation calculator 2714 and thereby outputs 32 added correlation values to the correlation comparator 2724. As a result, a total of 64 correlation values generated by the summers 2720 and 2722 are input to the correlation comparator 2724.

The correlation comparator 2724 compares the 64 correlation values input from the summers 2720 and 2722 and determines the maximum correlation value from among the 64 correlation values. When the maximum correlation value has been determined, the correlation comparator 2724 determines and outputs six decoded information bits 2726 based on the [4, 2] code index, mask sequence index and Walsh code index corresponding to the determined maximum correlation value.

The decoded information bits can be obtained by combining the index of the Walsh code and the index of the mask sequence. That is, if the mask sequence corresponding to the maximum correlation value is M1 and the Walsh code corresponding to the maximum correlation value is W4, the decoded information bits are determined as "(index corresponding to M1)//(index corresponding to W4)".

For example, where the six information bits $a_0$ to $a_5$ are '111000', the channel encoder encodes the information bits into "Π(M1⊙W4)//R0" and then transmits the encoded information bits. In the encoded information bits, "Π" implies a reverse operation of the column transposer 2702, in which the first symbol is moved to the sixteenth symbol location and the second to sixteenth symbols are moved forward to the locations of the first to fifteenth symbols. In the channel decoder, the received signal r(t) 2700 encoded into "Π(M1⊙W4)//R0" is divided into an "M1⊙W4" related part and an "R0" related part by the demultiplexer 2704. Then, the "M1⊙W4" related part which includes the 16 higher symbols is added to the all mask sequences by modulo-2 addition, and the added values are correlated with the 32 bi-orthogonal Walsh codes, so that a total of 64 correlation values are generated.

Further, the "R0" related part which includes the four lower symbols is correlated with all codewords of the [4, 2] code, so that four correlation values are obtained. Then, the four correlation values are repeated in the repeater 2718 and are then added to the 64 correlation values according to a predetermined rule, so that 64 added correlation values are obtained. Then, it is confirmed that the received signal r(t) has been encoded by M1, W4 and R0, that is, by the Walsh code index, mask sequence index and [4, 2] code index corresponding to the maximum value among the 64 added correlation values. Upon confirming that the received signal r(t) has been encoded by M1, W4 and R0, the channel decoder combines '1' (the index corresponding to the M1) with '11000' (the index corresponding to the W4), thereby outputting '111000' as the decoded information bits.

As described above, embodiments of the present invention propose a detailed channel coding method for the E-DCH uplink control information and the scheduling information. Especially, embodiments of the present invention propose a method and an apparatus which can generate error correcting codes having a good minimum distance characteristic and which are capable of providing error correcting capability for particular higher bits. The error correcting codes proposed by embodiments of the present invention can use a soft decision decoder, can reduce the quantity of calculations for the decoding by using an IFHT decoder, and have a good minimum distance characteristic. Therefore, when errors of important data such as scheduling information are corrected by using the error correcting codes, the bit error rate or block error rate can be reduced and the reliability can be increased.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for encoding N bits of information for a packet data service in a mobile communication system supporting the packet data service, wherein N is a positive integer, the method comprising the steps of:

encoding the N bits of information by using a [32, N] second order Reed Muller code, if a [40, N] encoding is used;

encoding M bits of information requiring an enhanced error correcting capability from among the N bits of information by using a [8, M] unequal protection code, wherein M is a positive integer smaller than N; and concatenating symbols encoded by the [32, N] second order Reed Muller code with symbols encoded by the [8, M] unequal protection code, thereby outputting a [40, N] codeword comprising 40 encoded symbols, wherein the [32, N] second order Reed Muller code comprises an N number of [32, N] basis sequences from among seven basis sequences each having a length of 32, denoted by:

| | | | | | | | | | |
|---|---|---|---|---|---|---|---|---|---|
| 0 | 0 | 1 | 0 | 1 | 0 | 0 | 0 | 0 | 1 |
| 0 | 1 | 0 | 1 | 0 | 1 | 0 | 1 | 0 | 1 |
| 0 | 0 | 1 | 1 | 0 | 0 | 1 | 1 | 0 | 0 |
| 0 | 0 | 0 | 0 | 1 | 1 | 1 | 1 | 0 | 0 |
| 0 | 0 | 0 | 0 | 0 | 0 | 0 | 0 | 1 | 1 |
| 0 | 0 | 0 | 0 | 0 | 0 | 0 | 0 | 0 | 0 |
| 1 | 1 | 1 | 1 | 1 | 1 | 1 | 1 | 1 | 1 |

| | | | | | | | | | |
|---|---|---|---|---|---|---|---|---|---|
| 1 | 0 | 0 | 0 | 1 | 1 | 1 | 1 | 1 | 1 |
| 0 | 1 | 0 | 1 | 0 | 1 | 0 | 1 | 0 | 1 |
| 1 | 1 | 0 | 0 | 1 | 1 | 0 | 0 | 1 | 1 |
| 0 | 0 | 1 | 1 | 1 | 1 | 0 | 0 | 0 | 0 |
| 1 | 1 | 1 | 1 | 1 | 1 | 0 | 0 | 0 | 0 |
| 0 | 0 | 0 | 0 | 0 | 0 | 1 | 1 | 1 | 0 |
| 1 | 1 | 1 | 1 | 1 | 1 | 1 | 1 | 1 | 1 |

-continued $$\begin{matrix} 0 & 0 & 0 & 0 & 0 & 1 & 1 & 1 & 0 & 1 & 1 \\ 0 & 1 & 0 & 1 & 0 & 1 & 0 & 1 & 0 & 1 & 0 & 1 \\ 0 & 0 & 1 & 1 & 0 & 0 & 1 & 1 & 0 & 0 & 1 & 1 \\ 1 & 1 & 1 & 1 & 0 & 0 & 0 & 0 & 1 & 1 & 1 & 1 \\ 0 & 0 & 0 & 0 & 1 & 1 & 1 & 1 & 1 & 1 & 1 & 1 \\ 1 & 1 & 1 & 1 & 1 & 1 & 1 & 1 & 1 & 1 & 1 & 1 \\ 1 & 1 & 1 & 1 & 1 & 1 & 1 & 1 & 1 & 1 & 1 & 1. \end{matrix}$$

2. The method as claimed in claim 1, wherein, when M is 2, the [8, M] unequal protection code comprises [8, 2] basis sequences each having a length of 8, denoted by:

1 1 0 0 0 0 0 0

0 0 1 1 1 1 1 1.

3. The method as claimed in claim 1, wherein, when M is 2, the [8, M] unequal protection code comprises [8, 2] basis sequences each having a length of 8, denoted by:

0 0 0 0 0 0 0 0

1 1 1 1 1 1 1 1.

4. The method as claimed in claim 1, wherein, when M is 2, the [8, M] unequal protection code comprises [8, 2] basis sequences each having a length of 8, denoted by:

1 0 0 0 0 0 0 0

0 1 1 1 1 1 1 1.

5. The method as claimed in claim 1, wherein, when M is 2, the [8, M] unequal protection code comprises [8, 2] basis sequences each having a length of 8, denoted by:

1 1 1 0 0 0 0 0

0 0 0 1 1 1 1 1.

6. The method as claimed in claim 1, wherein, when M is 2, the [8, M] unequal protection code comprises [8, 2] basis sequences each having a length of 8, denoted by:

1 1 1 1 0 0 0 0

0 0 0 0 1 1 1 1.

7. The method as claimed in claim 1, wherein, when M is 3, the [8, M] unequal protection code comprises [8, 3] basis sequences each having a length of 8, denoted by:

1 0 0 0 0 0 0 0

0 1 0 0 0 0 0 0

0 0 1 1 1 1 1 1.

8. The method as claimed in claim 1, wherein, when M is 3, the [8, M] unequal protection code comprises [8, 3] basis sequences each having a length of 8, denoted by:

1 0 0 0 0 0 0 0

0 1 1 0 0 0 0 0

0 0 0 1 1 1 1 1.

9. The method as claimed in claim 1, wherein, when M is 4, the [8, M] unequal protection code comprises [8, 4] basis sequences each having a length of 8, denoted by:

1 0 0 0 0 0 0 0

0 1 0 0 0 0 0 0

0 0 1 0 0 0 0 0

0 0 0 1 1 1 1 1.

10. The method as claimed in claim 1, wherein, when M is 3, the [8, M] unequal protection code comprises [8, 3] basis sequences each having a length of 8, denoted by:

1 0 0 0 0 0 0 0

0 1 1 1 0 0 0 0

0 0 0 0 1 1 1 1.

11. The method as claimed in claim 1, wherein, when M is 3, the [8, M] unequal protection code comprises [8, 3] basis sequences each having a length of 8, denoted by:

1 1 0 0 0 0 0 0

0 0 1 1 0 0 0 0

0 0 0 0 1 1 1 1.

12. The method as claimed in claim 1, wherein, when M is 4, the [8, M] unequal protection code comprises [8, 4] basis sequences each having a length of 8, denoted by:

1 0 0 0 0 0 0 0

0 1 0 0 0 0 0 0

0 0 1 1 0 0 0 0

0 0 0 0 1 1 1 1.

13. The method as claimed in claim 1, wherein, when M is 5, the [8, M] unequal protection code comprises [8, 5] basis sequences each having a length of 8, denoted by:

1 0 0 0 0 0 0 0

0 1 0 0 0 0 0 0

0 0 1 0 0 0 0 0

0 0 0 1 0 0 0 0

0 0 0 0 1 1 1 1.

14. The method as claimed in claim 1, wherein the step of encoding by using the [32, N] second order Reed Muller code comprises the steps of:
 sequentially generating the N number of [32, N] basis sequences;
 multiplying the N bits of information by each bit of the [32, N] basis sequences; and
 summing products of the multiplication, thereby generating 32 encoded symbols.

15. The method as claimed in any one of claims 2 through 13, wherein the step of encoding by using the [8, M] unequal protection code comprises the steps of:
 sequentially generating each bit of the M number of [8, M] basis sequences;
 multiplying the M bits of information by said each bit of the [8, M] basis sequences; and
 summing products of the multiplication, thereby generating eight encoded symbols.

16. An apparatus for encoding N bits of information for a packet data service in a mobile communication system supporting the packet data service, wherein N is a positive integer, the apparatus comprising:
 a [32, N] second order Reed Muller encoder for encoding the N bits of information by using a [32, N] second order Reed Muller code, if a [40, N] encoding is used;
 a [8, M] unequal protection encoder for encoding M bits of information requiring an enhanced error correcting capability from among the N bits of information by using a [8, M] unequal protection code, wherein M is a positive integer smaller than N; and
 a multiplexer for concatenating symbols encoded by the [32, N] second order Reed Muller code with symbols encoded by the [8, M] unequal protection code, thereby outputting a [40, N] codeword comprising 40 encoded symbols,
 wherein the [32, N] second order Reed Muller code comprises an N number of [32, N] basis sequences from among seven basis sequences each having a length of 32, denoted by:

0 0 1 0 1 0 0 0 0 1 1 0 0 0 1 1 1 1 1 1 0 0 0 0 1 1 1 0 1 1 1

0 1 0 1 0 1 0 1 0 1 0 1 0 1 0 1 0 1 0 1 0 1 0 1 0 1 0 1 0 1 0 1

0 0 1 1 0 0 1 1 0 0 1 1 0 0 1 1 0 0 1 1 0 0 1 1 0 0 1 1 0 0 1 1

0 0 0 0 1 1 1 1 0 0 0 0 1 1 1 1 0 0 0 0 1 1 1 1 0 0 0 0 1 1 1 1

0 0 0 0 0 0 0 0 1 1 1 1 1 1 1 1 0 0 0 0 0 0 0 0 1 1 1 1 1 1 1 1

0 0 0 0 0 0 0 0 0 0 0 0 0 0 0 0 1 1 1 1 1 1 1 1 1 1 1 1 1 1 1 1

1 1 1 1 1 1 1 1 1 1 1 1 1 1 1 1 1 1 1 1 1 1 1 1 1 1 1 1 1 1 1 1.

17. The apparatus as claimed in claim 16, wherein, when M is 2, the [8, M] unequal protection code comprises [8, 2] basis sequences each having a length of 8, denoted by:

```
1 1 0 0 0 0 0 0
0 0 1 1 1 1 1 1.
```

18. The apparatus as claimed in claim 16, wherein, when M is 2, the [8, M] unequal protection code comprises [8, 2] basis sequences each having a length of 8, denoted by:

```
0 0 0 0 0 0 0 0
1 1 1 1 1 1 1 1.
```

19. The apparatus as claimed in claim 16, wherein, when M is 2, the [8, M] unequal protection code comprises [8, 2] basis sequences each having a length of 8, denoted by:

```
1 0 0 0 0 0 0 0
0 1 1 1 1 1 1 1.
```

20. The apparatus as claimed in claim 16, wherein, when M is 2, the [8, M] unequal protection code comprises [8, 2] basis sequences each having a length of 8, denoted by:

```
1 1 1 0 0 0 0 0
0 0 0 1 1 1 1 1.
```

21. The apparatus as claimed in claim 16, wherein, when M is 2, the [8, M] unequal protection code comprises [8, 2] basis sequences each having a length of 8, denoted by:

```
1 1  1 1 0 0 0 0
0 0  0 0 1 1 1 1.
```

22. The apparatus as claimed in claim 16, wherein, when M is 3, the [8, M] unequal protection code comprises [8, 3] basis sequences each having a length of 8, denoted by:

```
1 0 0 0 0 0 0 0
0 1 0 0 0 0 0 0
0 0 1 1 1 1 1 1.
```

23. The apparatus as claimed in claim 16, wherein, when M is 3, the [8, M] unequal protection code comprises [8, 3] basis sequences each having a length of 8, denoted by:

```
1 0  0 0 0  0 0 0
0 1  1 0 0  0 0 0
0 0  0 1 1  1 1 1.
```

24. The apparatus as claimed in claim 16, wherein, when M is 4, the [8, M] unequal protection code comprises [8, 4] basis sequences each having a length of 8, denoted by:

```
1 0 0 0 0 0 0 0
0 1 0 0 0 0 0 0
0 0 1 0 0 0 0 0
0 0 0 1 1 1 1 1.
```

25. The apparatus as claimed in claim 16, wherein, when M is 3, the [8, M] unequal protection code comprises [8, 3] basis sequences each having a length of 8, denoted by:

```
1 0 0 0 0 0 0 0
0 1 1 1 0 0 0 0
0 0 0 0 1 1 1 1.
```

26. The apparatus as claimed in claim 16, wherein, when M is 3, the [8, M] unequal protection code comprises [8, 3] basis sequences each having a length of 8, denoted by:

```
1 1 0 0 0 0 0 0
0 0 1 1 0 0 0 0
0 0 0 0 1 1 1 1.
```

27. The apparatus as claimed in claim 16, wherein, when M is 4, the [8, M] unequal protection code comprises [8, 4] basis sequences each having a length of 8, denoted by:

```
1 0 0 0 0 0 0 0
0 1 0 0 0 0 0 0
0 0 1 1 0 0 0 0
0 0 0 0 1 1 1 1.
```

28. The apparatus as claimed in claim 16, wherein, when M is 5, the [8, M] unequal protection code comprises [8, 5] basis sequences each having a length of 8, denoted by:

```
1 0 0 0 0 0 0 0

0 1 0 0 0 0 0 0

0 0 1 0 0 0 0 0

0 0 0 1 0 0 0 0

0 0 0 0 1 1 1 1.
```

29. The apparatus as claimed in claim 16, wherein the [32, N] second order Reed Muller encoder comprises:

a code generator for sequentially generating the N number of [32, N] basis sequences;

multipliers for multiplying the N bits of information by each bit of the [32, N] basis sequences; and a summer for summing products of the multiplication, thereby generating 32 encoded symbols.

30. The apparatus as claimed in any one of claims 17 through 28, wherein the [8, M] unequal protection encoder comprises:

a code generator for sequentially generating each bit of the M number of [8, M] basis sequences;

multipliers for multiplying the M bits of information by said each bit of the [8, M] basis sequences; and a summer for summing products of the multiplication, thereby generating eight encoded symbols.

\* \* \* \* \*